(12) United States Patent
Delmonico et al.

(10) Patent No.: US 11,285,392 B1
(45) Date of Patent: Mar. 29, 2022

(54) SYSTEMS AND METHODS FOR MACHINE LEARNING-BASED EMERGENCY EGRESS AND ADVISEMENT

(71) Applicant: LGHorizon, LLC, Denver, CO (US)

(72) Inventors: Bill Delmonico, Burnsville, MN (US); Joseph Schmitt, Princeton, MN (US)

(73) Assignee: LGHorizon, LLC, Denver, CO (US)

( * ) Notice: Subject to any disclaimer, the term of this patent is extended or adjusted under 35 U.S.C. 154(b) by 0 days.

(21) Appl. No.: 17/352,968

(22) Filed: Jun. 21, 2021

Related U.S. Application Data

(60) Provisional application No. 63/155,219, filed on Mar. 1, 2021.

(51) Int. Cl.
| | |
|---|---|
| *A63F 13/5378* | (2014.01) |
| *A63F 13/65* | (2014.01) |
| *G06N 20/00* | (2019.01) |
| *G06F 3/0482* | (2013.01) |
| *H04L 67/52* | (2022.01) |
| *G06F 16/23* | (2019.01) |
| *G06F 16/245* | (2019.01) |

(52) U.S. Cl.
CPC .......... *A63F 13/5378* (2014.09); *A63F 13/65* (2014.09); *G06F 3/0482* (2013.01); *G06F 16/2379* (2019.01); *G06F 16/245* (2019.01); *H04L 67/18* (2013.01); *G06N 20/00* (2019.01)

(58) Field of Classification Search
CPC ...... A63F 13/5378; A63F 13/65; G06N 20/00
See application file for complete search history.

(56) References Cited

U.S. PATENT DOCUMENTS

| | | | | |
|---|---|---|---|---|
| 2008/0062167 | A1* | 3/2008 | Boggs | G06T 19/00 345/419 |
| 2011/0066374 | A1* | 3/2011 | Hartman | G01C 21/10 701/533 |
| 2019/0237083 | A1* | 8/2019 | Allen | G09B 5/00 |

\* cited by examiner

*Primary Examiner* — James S. McClellan
(74) *Attorney, Agent, or Firm* — Fish & Richardson P.C.

(57) ABSTRACT

The disclosed systems and methods provide for generating real-time egress plans for users in a building, based on the users' current locations. As the users' current locations change, egress plans associated with the users can be dynamically modified in real-time. The egress plans can also be generated, modified, and/or trained based on inputted information about the user. The disclosed technology can include a mobile application for presenting, in a centralized interface, information about user-specific egress plans, training the user for different emergency scenarios, improving or changing features in the building to improve safety, and user profiles. The mobile application can include training simulation games to help prepare the users to safely egress during an emergency. The disclosed technology can also predict building component and structure emergency risk levels. The disclosed technology can also designate zones in the building based on possible egress routes.

17 Claims, 28 Drawing Sheets

Egress Plans 102

Sort By: Emergency Type 120 | User 122

Egress Plan 124A: from Master Bedroom

| Edit Plan 126A | View Plan 128A | Suggested Improvements 130A | Train with the Plan 132A |

Egress Plan 124B: from Second Floor Hallway

| Edit Plan 126B | View Plan 128B | Suggested Improvements 130B | Train with the Plan 132B |

. . .

Egress Plan 124N: from Kitchen

| Edit Plan 126N | View Plan 128N | Suggested Improvements 130N | Train with the Plan 132N |

FIG. 2B

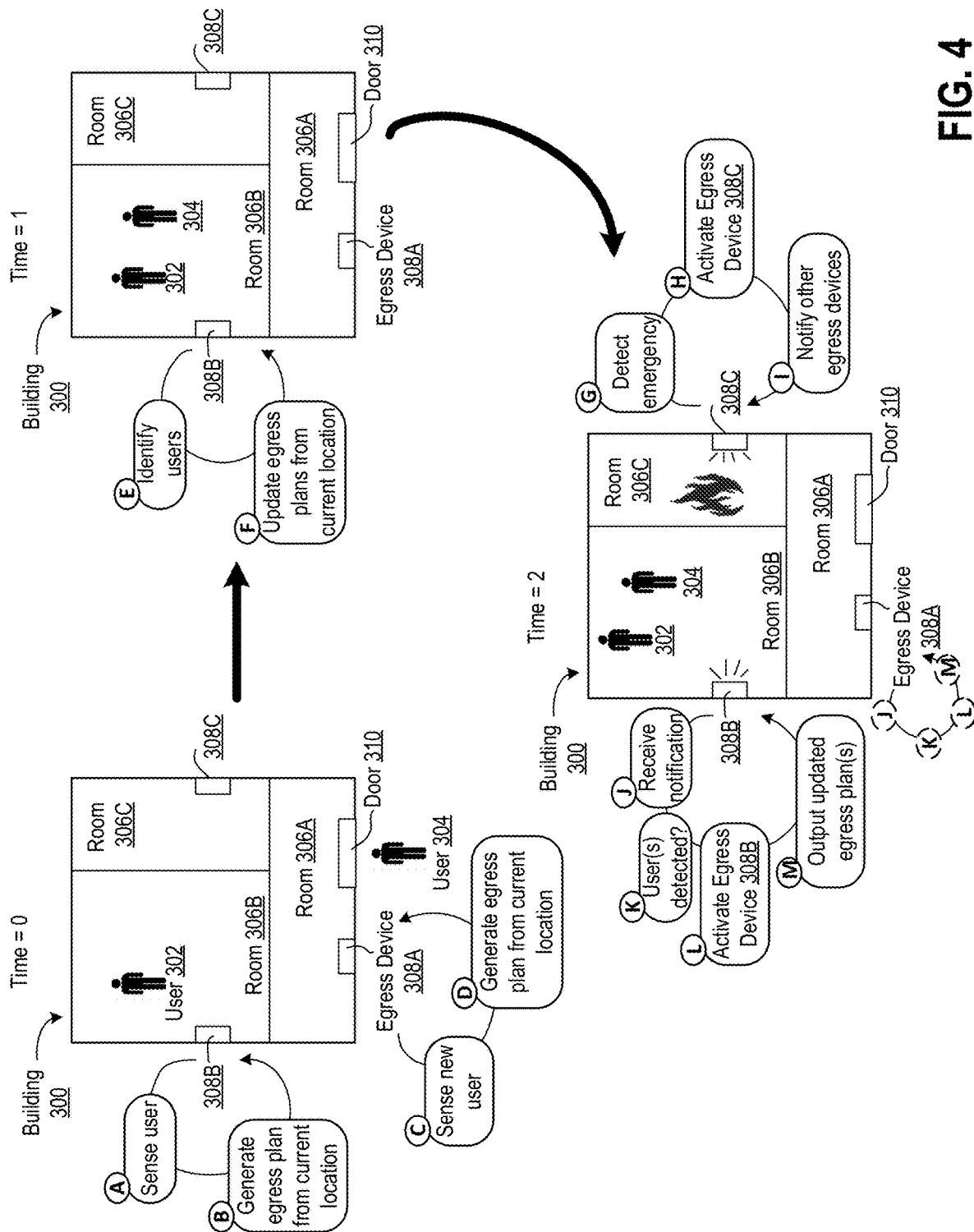

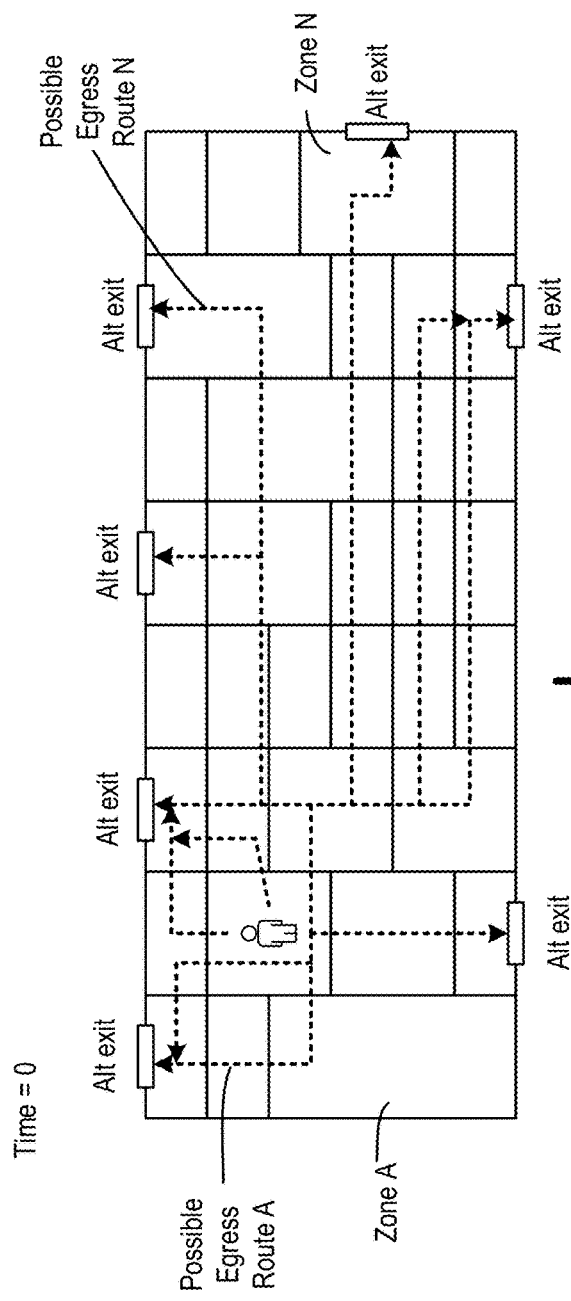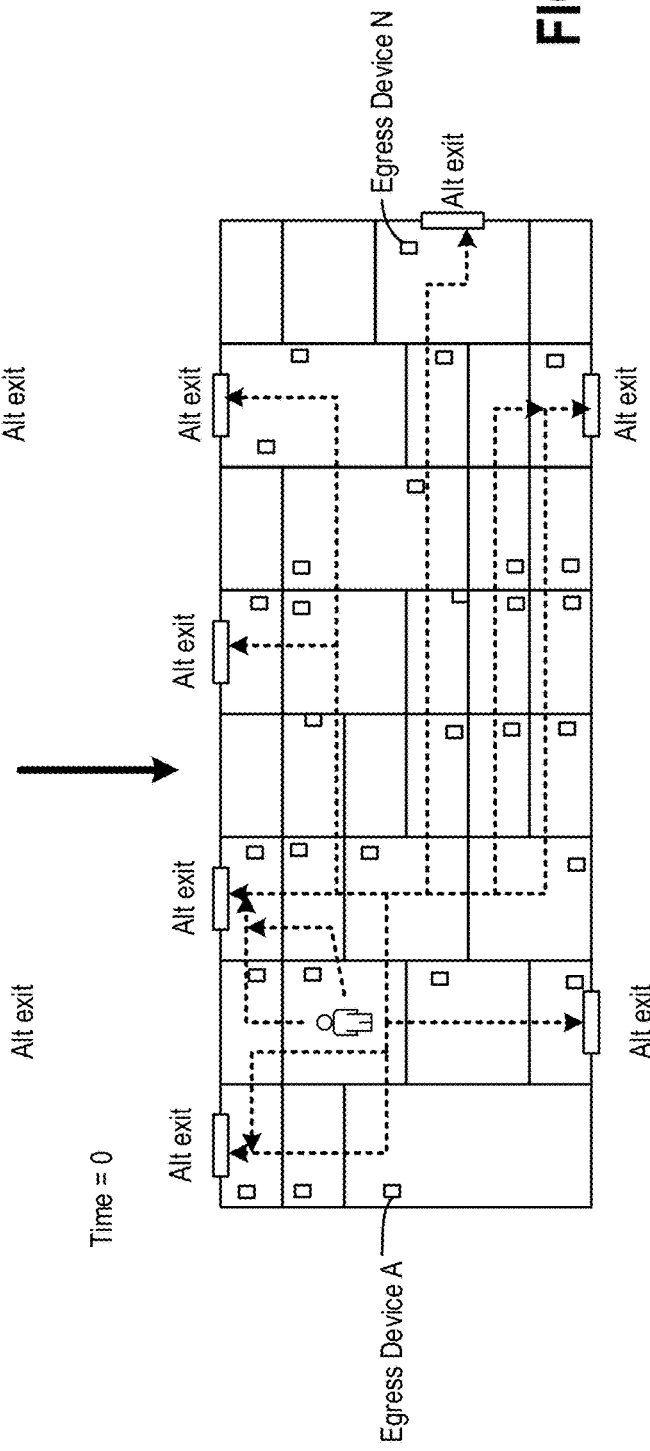
FIG. 9C
FIG. 9D

SYSTEMS AND METHODS FOR MACHINE LEARNING-BASED EMERGENCY EGRESS AND ADVISEMENT

CROSS-REFERENCE TO RELATED APPLICATIONS

This application claims the benefit of U.S. Provisional Application Ser. No. 63/155,219, filed Mar. 1, 2021. The disclosure of the prior application is considered part of (and is incorporated by reference in) the disclosure of this application.

TECHNICAL FIELD

This document describes devices, systems, and methods related to predicting and training on emergency scenarios in buildings.

BACKGROUND

Emergencies can occur in buildings at unexpected times. The emergencies can include fires, gas leaks, carbon monoxide, or other situations that can compromise not only a structure and components of a building but also safety and wellbeing of users inside the building. Users may not come up with emergency response plans before such emergencies occur. In some cases, users may be temporary visitors or customers. Such users may not know a floorplan of the building, safe exits out of the building, whether components in the building are up to date, whether the building is structurally sound, or whether the building is at risk of experiencing an emergency. In some cases, users can be full-time residents or frequent visitors, however they may not be aware of conditions in the building that can cause an emergency to occur. Therefore, users may not be prepared should an emergency arise in the building while the users are present.

Building management, engineers, and architects may also be unaware of conditions in the building that can comprise safety and wellbeing of users. Structural faults can go unnoticed, thereby increasing a risk of an emergency occurring in the building. Components in the building, such as carbon monoxide detectors, can become old and outdated. Such changes that are made over time to the building can increase a risk of emergencies occurring in the building.

Should an emergency occur, the users inside the building can be surprised and disoriented. The users can become confused, not knowing how to safely exit the building to avoid the emergency. Sometimes during emergencies, such as fires, emergency advisement devices may malfunction, not work, or otherwise become immobilized as a result of the emergency. When this happens, the users may not receive guidance directing them to exit the building safely and quickly. As a result, the user's lives, mental wellbeing, and physical wellbeing can be put at risk.

SUMMARY

The document generally relates to systems and methods for predicting and training on emergency scenarios in buildings. Buildings, such as residential homes, commercial buildings, apartment buildings, high rises, and any other type of building can be prone to a variety of different emergency situations. Preparing for different emergency scenarios can not only improve building layout and design but also improve safety and wellbeing of building users.

The disclosed technology can provide for generating egress plans for users in a building. The egress plans can be generated in real-time, based on a current location of a user in the building. As the real-time current location of the user changes, egress plans associated with the user can be dynamically modified in real-time. The egress plans can be generated based on sensed real-time information about the user. The egress plans can also be generated, modified, and/or trained based on inputted information about the user. The disclosed technology can include a mobile application for presenting, in a centralized interface, information about user-specific egress plans, training the user for different emergency scenarios, improving or changing features in the building to improve safety, and user profiles.

During a real-time emergency, the disclosed technology can provide egress instructions to the users inside the building. The egress instructions can be presented at user devices, for example via the mobile application. In some implementations, when the egress instructions are outputted at the user devices, one or more features of the user devices can be temporarily deactivated. Some of the features can include calling a person, opening another application, closing the mobile application described herein, sending a text message, and/or shutting off the user device. By temporarily deactivating such features, the users can focus on following the egress instructions and safely exiting the building. Once the users are identified as being outside of the building, the features of the user devices can be reactivated. As a result, the users can resume using functionality of their user devices.

Egress instructions can also be outputted by egress advisement devices positioned throughout the building. For example, egress advisement devices can be placed in zones within the building. The zones can be defined in various ways and may not be bound by physically separated spaces, such as rooms, halls, aisles, or other suitable space segments in a building. In some implementations, a space in a building or a portion of the building can be segmented into multiple zones such that two or more of such zones in combination can define one or more egress paths from given user locations in the space. In some implementations, the zones can be defined to include windows, doors, and/or egress advisement devices so that such windows, doors, and/or egress advisement devices can be effectively used by escape routes or operated to help the users as they follow the egress routes defined by a combination of multiple zones during emergency. Some rooms, halls, aisles, or other suitable space segments can have multiple zones, in some implementations. Moreover, some zones can encompass multiple rooms and/or portions of different rooms. Some zones can overlap with each other in some implementations.

The egress advisement devices in each of the zones can communicate with each other to determine which of the devices are activated and which of the devices are deactivated. The disclosed technology can provide for generating and/or outputting egress plans based on devices that are activated. In other words, egress plans can be generated that follow or use the activated egress advisement devices. Additionally, egress plans can be outputted at devices that are activated. Moreover, using predictive analytics, the disclosed technology can determine where the emergency may spread. The disclosed technology can then provide for activating certain devices in some zones and/or deactivating certain devices in other zones based on the predicted spread of the emergency. The egress plans can then be dynamically modified in real-time based on real-time indications of the emergency as it spreads in the building as well as the predicted spread of the emergency.

Using predictive analytics, artificial intelligence, and/or machine learning, the disclosed technology can provide for improved generation of egress plans, simulated emergency games, and building improvement suggestions. For example, machine learning training models can be generated for the building and/or users within the building. The models can be trained on information received about the building and/or the users. The models can also be trained on how the users perform during the simulated emergency games. The models can be applied by the disclosed technology to predict whether the building is susceptible to different types of emergencies, how the users may respond to such emergencies, and how the users may egress from the building during such emergencies. The models can also be applied by the disclosed technology to determine a lifespan of components of the building and to suggest improvements that can be made to the building in order to reduce an emergency risk level. For example, the disclosed technology can predict a lifespan of components or a structure of the building. The disclosed technology can also predict an emergency risk level for the building. Based on the emergency risk level and predicted lifespans, the disclosed technology can suggest improvements to components, the building structure, furniture layout, room layout, etc. Such improvements can be implemented in order to lower the emergency risk level, prevent or mitigate potential emergencies from occurring in the building, and/or to better prepare users to safely egress from the building in the event that an emergency occurs in the building.

Particular embodiments described herein include systems and methods for training users how to egress a building. The system can include a user computing device configured to present, at a graphical user interface (GUI) display, an egress safety application having selectable features. One of the selectable features can be a training simulation game that simulates an emergency in the building. The system can also include an egress computing system in communication with the user computing device. The egress computing system can be configured to receive, from the user computing device, (i) a first user input indicating user selection of the training simulation game at the GUI display and (ii) an identifier associated with the user computing device, retrieve, from a database, user information that corresponds to the identifier associated with the user computing device, receive, from at least one of the user computing device and sensors positioned throughout the building and proximate a location of a user of the user computing device, a current location of the user in the building, receive, from the sensors, building information, generate, based on the building information, a virtual floorplan of the building, simulate, in the virtual floorplan of the building, an emergency, and generate, based on the simulated emergency and the user information, an egress plan for the user to egress in the virtual floorplan from the current location of the user. The egress computing system can also be configured to present, at the GUI display, (i) the current location of the user in the virtual floorplan and (ii) instructions associated with the generated egress plan, start, in response to receiving the second user input, a timer, receive, from the user computing device, a second user input indicating movement of the user in the virtual floorplan, and determine, based on the second user input and the timer, user performance metrics. The egress computing system can further be configured to train, based on the user performance metrics, a machine learning model associated with the user, determine, using the trained machine learning model, a second simulated emergency for the user, determine, using the trained machine learning model, suggestions to improve an ability of the user to egress from the building during a real-time emergency, and output, at the GUI display, the user performance metrics, a selectable option to begin the second simulated emergency, and the suggestions to improve the ability of the user to egress from the building during the real-time emergency.

In some implementations, the disclosed systems and methods can optionally include one or more following features. Determining user performance metrics can include determining an overall time that it took the user to complete the simulated emergency, determining an average heartrate of the user during the overall time, determining a quantity of mistakes that the user made during the overall time, and determining a difficulty level of the simulated emergency. The egress computing system can be configured to determine the average heartrate of the user based on indications of a heartbeat of the user that are received from at least one of the user computing device and biometric sensors worn by the user while the user completes the simulated emergency. The egress computing system can also be configured to correlate, using the trained machine learning model associated with the user, (i) the overall time that it took the user to complete the simulated emergency with (ii) a projected time it would take the user to egress during a real-time emergency in the building, wherein the real-time emergency is the same as the simulated emergency, determine, based on correlating (i) with (ii), suggestions to improve a speed at which the user egresses from the building during the real-time emergency, and output, at the GUI display, the suggestions to improve the speed at which the user egresses from the building during the real-time emergency. The egress computing system can also continuously receive, from the user computing device, third user input indicating movement of the user in the virtual floorplan, and stop, based on the third user input and in response to determining that the user is no longer moving in the virtual floorplan, the timer.

Particular embodiments described herein can also include a system for determining egress plans in real-time, the system including a plurality of egress devices positioned throughout a building, the plurality of egress devices having a plurality of sensors. Each of the plurality of egress devices can be configured to determine a first location of a first user in the building, generate, based on the first location of the first user, a first egress plan that can be used by the first user to egress from the first location out of the building during an emergency, receive, from another of the plurality of egress devices, an indication that the first user has moved to a second location in the building, update, based on the indication that the first user has moved to the second location in the building, the first egress plan to be used by the first user to egress from the second location out of the building during the emergency, receive, from another of the plurality of egress devices, an indication that a second user has entered the building at a third location, generate, based on the third location of the second user, a second egress plan that can be used by the second user to egress from the third location out of the building during the emergency, detect an emergency in the building, identify a fourth location of the first user and a fifth location of the second user relative to a location of the detected emergency, update, based on the fourth and fifth locations, the first and second egress plans to be used by the first and second users to egress from the fourth and fifth locations, respectively, and transmit, to one or more of the plurality of egress devices proximate to the fourth and fifth locations of the first and second users, an indication of the detected emergency and the updated first and second egress plans, wherein the one or more of the plurality of egress devices are configured to output the updated first and second egress plans to guide the first and second users to egress from the fourth and fifth locations out the building, respectively.

In some implementations, the systems and methods can optionally include one or more of the following features. Each of the plurality of egress devices can also identify when at least one of the first and second users exits the building, and remove, from temporary storage at the egress device, the egress plan associated with the at least one of the first and second users that exits the building. Each of the plurality of egress devices can identify that at least one of the first and second users is a full-time resident of the building, and store, in a database, the egress plan associated with the at least one of the first and second users that is the full-time resident. Each of the plurality of egress devices can also train a machine learning model associated with the at least one of the first and second users that is the full-time resident, and determine, using the trained machine learning model, one or more improved egress plans for the at least one of the first and second users that is the full-time resident. Each of the plurality of egress devices can also be configured to identify first and second user computing devices associated with the first and second users, respectively, transmit, to the first and second user computing devices, the updated first and second egress plans, respectively, deactivate, based on receiving indication that the first and second user computing devices are outputting the updated first and second egress plans respectively, features of the first and second user computing devices, wherein the features include at least one of (i) canceling the output of the updated first and second egress plans respectively, (ii) making a phone call, (iii) sending a text message, (iv) opening a mobile application, and (v) turning off the user computing devices, instruct the first and second user computing devices to transmit a notification to emergency response personnel, wherein the notification includes information about the detected emergency, and re-activate, in response to determining that the first and second users are outside of the building, the features of the first and second user computing devices.

Particular embodiments described herein can further include systems and methods for assessing emergency risk of building components. The system can include a plurality of sensors positioned throughout a building, the plurality of sensors configured to sense real-time changes to an environment inside the building, and an egress computing system configured to communicate with the plurality of sensors. The egress computing system can receive, from the plurality of sensors, indications of (i) the sensed real-time changes to the environment and (ii) users that are present in the environment, predict, based on the received indications, emergency scenarios in the building, retrieve, from a database, user information associated with the users that are present in the environment, predict, based on the user information, user egress in the predicted emergency scenarios, identify, based on the predicted user egress, one or more suggested improvements that can be made to the environment to improve the predicted user egress, train, based on the predicted emergency scenarios and the predicted user egress, a machine learning model associated with each of the users that are present in the environment, determine, for each of the users and using the trained machine learning model, projected user egress from the environment when the one or more suggested improvements are applied to the environment, and output, based on determining for each of the users that the projected user egress is better than the predicted user egress by a threshold range, the one or more suggested improvements that can be made to the environment.

In some implementations, the system and method can optionally include one or more of the following features. The sensed real-time changes in the environment can include at least one of new users entering the building, movement of furniture, construction in the building, changing a floorplan of the building, adding furniture, modifying safety guidance devices in the building, and changing safety guidance devices in the building. The egress computing system can be further configured to determine whether a structure of the building is faulty based on comparing historic changes to the environment to the sensed real-time changes to the environment. The egress computing system can also predict a lifespan of at least one of (i) the structure of the building and (ii) one or more components in the building based on comparing historic changes to the environment to the sensed real-time changes to the environment, predict an emergency risk level for the building based on (i) the lifespan of at least one of the structure of the building and the one or more components in the building and (ii) the sensed real-time changes to the environment, and output, based on determining that the emergency risk level exceeds a threshold range, the emergency risk level.

Particular embodiments described herein can also include a system and method for generating egress routes based on zones in a building, the system having a plurality of egress advisement devices positioned throughout the building, the plurality of egress advisement devices configured to communicate with each other, and an egress computing system configured to communicate with the plurality of egress advisement devices. The egress computing system can, before an emergency, define zones in the building, determine possible egress routes from each of the zones in the building, and determine placement of the plurality of egress advisement devices along the possible egress routes. The egress computing system can also detect an emergency from one or more of the plurality of egress advisement devices, designate one or more of the defined zones as emergency zones, wherein the emergency zones include the one or more of the plurality of egress advisement devices that detected the emergency, identify non-emergency zones of the defined zones, wherein the non-emergency zones do not include the emergency zones, generate egress routes based on the non-emergency zones and the detected emergency, and transmit, to the one or more of the plurality of egress advisement devices in the non-emergency zones, the generated egress routes, wherein the one or more of the plurality of egress advisement devices in the non-emergency zones are configured to output the generated egress routes to guide users to exit the building by avoiding the emergency zones in the building.

In some implementations, the system and method can optionally include one or more of the following features. The egress computing system can also predict a spread of the detected emergency, update, in response to determining that the emergency is predicted to spread into one or more non-emergency zones in the building, the generated egress routes, wherein the updated egress routes guide users to exit the building by avoiding the emergency zones in the building and the non-emergency zones where the emergency is predicted to spread, and transmit, to the one or more of the plurality of egress advisement devices in the non-emergency zones, the updated egress routes. One or more of the plurality of egress advisement devices in the emergency zones can be configured to output alerts that instruct users to stay out of the emergency zones in the building. One or more of the plurality of egress advisement devices in the emergency zones can also detect presence of users in the emergency zones, and output, in response to detecting the users in the emergency zones, guidance that instructs the users to exit the emergency zones and return to the egress routes in the non-emergency zones.

The devices, system, and techniques described herein may provide one or more of the following advantages. For example, the disclosed technology can provide for predicting how users may react during an emergency and preparing the users to respond calmly, quickly, and safely to a real-time emergency. The disclosed technology can provide for an emergency simulation game that can be used to prepare a user for responding to a real-time emergency. The game, presented at a user device, can simulate an emergency and instruct the user to exit a virtual version of the building from their current real-time location in the building. The game can present the user with an egress plan and measure how the user performs. Based on the user performance, the disclosed technology can predict how the user may respond to a real-time emergency. Using such predictions, the disclosed technology can determine suggestions to assist the user in better preparing for a real-time emergency. The disclosed technology can also provide improved simulation games that can focus on weaknesses in egressing that the user exhibited when playing the emergency simulation game. The simulation games can also be engaging and interactive, thereby hooking the user to play the games and, in so doing, prepare for real-time emergencies that may occur. As a result, the user can become more comfortable and better prepared with responding to different emergencies by playing the simulated games.

As another example, the disclosed technology can provide for egress advisement devices to communicate with each other so that they can continuously operate during an emergency. As a result, if one device goes down during the emergency, the other devices can continue to communicate with each other about real-time changes in the building and/or sensed emergency conditions. Therefore, the devices can continue to generate egress plans, update the egress plans, output the egress plans to instruct users how to exit the building, and track real-time changes with the emergency.

The disclosed technology can also provide for constructing safer buildings, maintaining components and structures of existing buildings, and updating building environments to mitigate or reduce risk of an emergency. Using a plurality of sensors positioned throughout the building to identify changes to the building environment, the disclosed technology can determine whether such changes impacts safety of users within the building. The disclosed technology can also use predictive analytics and machine learning models to assess an emergency risk level in the building and to identify impacts that changes to the building environment may have on the ability of users to safely and quickly egress during an emergency. The disclosed technology can then determine suggestions for improving the building (e.g., updating components or structure of the building, installing updates in egress advisement devices, moving furniture, etc.) and present such suggestions to users. Therefore, the building environment can be continuously monitored and improved to improve safety of users in the building and lower an emergency risk for the building.

As another example, the disclosed technology can provide for predicting how changes in the building environment may impact safe and quick egress from the building. Using such predictions, the disclosed technology can create suggestions for changing furniture layouts and/or user room assignments. For example, the disclosed technology can receive an indication from sensors positioned within the building that a couch was moved to a new location. The new location may now obstruct a predetermined egress route. The disclosed technology can determine that the predetermined egress route is still an optimal egress route out of the building for one or more users. So, the disclosed technology can notify one or more users that the couch should be moved from the new location. The disclosed technology can also suggest where to move the couch so that it does not block any predetermined egress routes. In so doing, the disclosed technology can provide for organization and layout of rooms and furniture in a building that can improve users' ability to safely and quickly egress from the building during an emergency.

As yet another example, the disclosed technology can provide for using machine learning training models to more accurately predict how users may respond to an emergency, what emergencies may occur in the building, and whether generated egress plans may be effective during the emergency. Using such models can mitigate or avoid potential errors that may arise in planning how to respond to different types of emergencies. The disclosed technology can also provide for continuous and dynamic modifications to egress plans based on real-time data (e.g., sensed real-time changes in the environment, changes in user profiles or other user-related information and characteristics, user performance in emergency simulation games, etc.) that the models can be trained on.

As another example, the disclosed technology can assist users to quickly and calmly exit the building during an emergency. Once the emergency is detected, user devices can receive egress instructions and present such instructions to the users. Features on the user devices (e.g., calling, texting, shutting off the device, closing an application) can be temporarily deactivated. As a result, the user may not exit out of the egress instructions. The users also may not be distracted by features on their user devices. Instead, the users can focus on safely, calmly, and quickly exiting the building. Once the users are outside of the building, the features on the user devices can be reactivated. The disclosed technology can also provide for instructing the user devices to automatically notify emergency response that there is an emergency at the building. Contacting emergency response can be one less thing that the users may have to worry about while exiting the building.

The details of one or more implementations are set forth in the accompanying drawings and the description below. Other features and advantages will be apparent from the description and drawings, and from the claims.

BRIEF DESCRIPTION OF THE DRAWINGS

FIG. 2B is a GUI display of egress plans for the building.

FIG. 4 is a conceptual diagram of real-time egress plan generation in a building.

FIGS. 9C-D depict installation of egress devices in zones in the building as described in reference to FIGS. 9A-B.

Like reference symbols in the various drawings indicate like elements.

DETAILED DESCRIPTION OF ILLUSTRATIVE EMBODIMENTS

Figure 1:
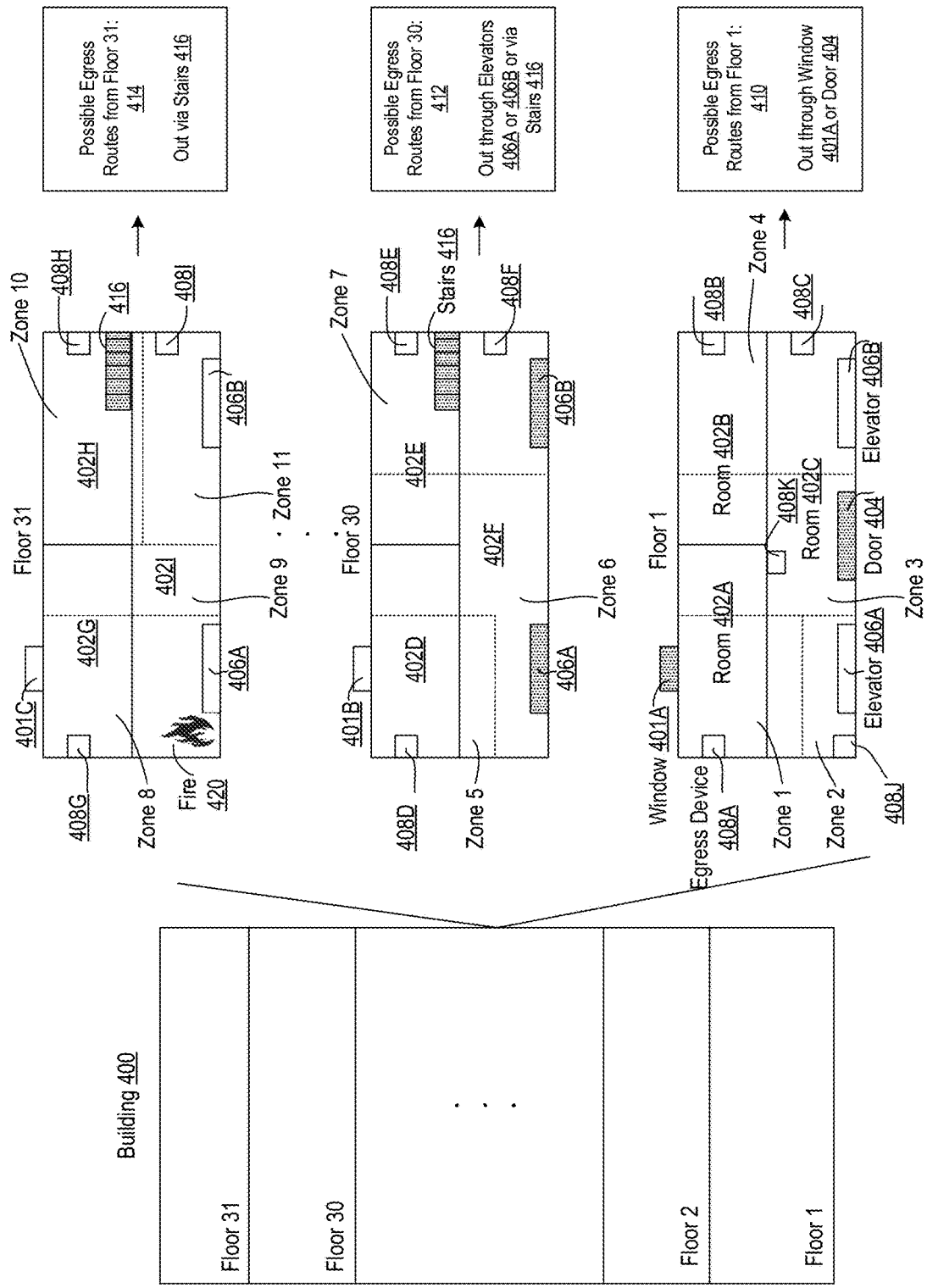
FIG. 1 is a conceptual diagram of a building having different egress routes per floor.

This document generally relates to systems and methods for predicting and training on emergency scenarios in buildings. The disclosed technology can provide for determining whether generated egress plans need to be updated based on changes to an environment in a building. The changes to the environment can include changing furniture layout, construction in the building, new users entering the building, updates to egress advisement devices, structural changes in the building, and/or other changes associated with components in the building. The disclosed technology can provide, using predictive analytics, artificial intelligence (AI), and/or machine learning (ML), suggestions about improvements to furniture layout, user room assignment, upgrading or updating components in the building, and/or making structural changes to the building. In other words, the disclosed technology can provide for monitoring originally generated egress plans and determining whether such originally generated plans are still optimal.

The disclosed technology can also provide a mobile application to users in the building. The mobile application can present information to the users about egress plans for the building and suggestions for improvements to the building. The application can present each user with customized egress plans. The application can also receive input from the users, such as updates or changes to user information. The application can also provide suggestions to the users to modify egress plans, safety features, and furniture layout in the building.

For example, the application can provide suggestions for constructing safer buildings. The disclosed technology can receive information about a current structure of the building to assess an emergency risk level associated with the building and whether improvement should be made to the structure to mitigate or avoid emergencies. The information can include maintenance records, construction records, and/or renovation records. The information can indicate when the structure was last inspected, what maintenance was performed on the structure, what materials comprise the structure, and what materials were used in maintenance performed on the structure. The information can also include indications of any damage to the structure, such as termites or aging of structural components.

The information described above can be provided by a user, such as inputted into a computing system or a mobile application. The user can be a homeowner, resident, landlord, tenant, construction worker, maintenance worker, or any other relevant stakeholder involved in building maintenance and upkeep. The information can also be automatically provided to the computing system whenever maintenance or checks are performed on the building structure. For example, electronic maintenance records can be stored in a database accessible by the computing system when the computing system assesses an emergency risk level for the building. Maintenance and other records can also be scanned by the user and then automatically uploaded to the database or transmitted to the computing system for further analysis.

In yet other implementations, the information can be identified by sensors and/or other devices in the building and transmitted to the computing system for further processing. For example, sensors can be positioned within the walls of the building to periodically scan a structure within the walls. The scanned data (e.g., image data, video data, 3D point clouds, LIDAR, etc.) can be transmitted to the computing system. The computing system can then process the data (e.g., image analysis) to identify potential structural damage. In some implementations, the computing system can use image mapping techniques to generate 3D point clouds of the building. Using the 3D point clouds, the computing system can identify faults in the building structure and potential damage. The computing system can also use the 3D point clouds to train on for subsequent image analysis and structural integrity identification and risk assessment.

The computing system can be trained to identify structural damage in image data. The computing system can be trained on existing images of structural damage. One or more different training models can also be used to train the computing system to identify signs of different types of structural damage that may occur in the building. The training models can be specific to a particular building. The training models can be specific to different types of structural components. The training models can also be specific to different types of buildings. An appropriate training model can then be applied for a particular application. Moreover, the user can capture image or video data of the building and upload that to the database and/or computing system. The computing system can perform image analysis techniques described herein to identify damage in the images and/or video data.

In some implementations, if the computing system determines that there is no present emergency risk associated with the building's structure, the computing system can use predictive analytics to determine if and when the emergency risk may become more prevalent. The computing system can be trained to identify lifespans of different structural components. The computing system can also be trained to identify different types of damage or risks that may occur to different structural components in a building. Based on the training and predictive analytics, the computing system can predict when the structural components may need to be updated and/or what emergency risks may result from continued degradation of the structural components. Assessments performed using the disclosed technology can be presented to the users in the mobile application. The application can also provide visuals and virtual floorplans to the users so that they can visualize and practice the generated egress plans.

The disclosed technology can also provide for training the users to prepare them for egressing from the building during an emergency. For example, the disclosed application can provide emergency simulation games to the users. The game can be customized based on each user's profile (e.g., user information) and current location in the building. The disclosed technology can use ML training models to assess how each user performs in the simulated emergency games. Based on such assessments, the disclosed technology can learn about how each user may respond to a real-time emergency. The disclosed technology can then develop improved and/or more complex simulated emergencies that are personalized for each of the users. The users can therefore become more prepared to respond quickly, calmly, and safely to real-time emergencies.

In some implementations, the disclosed technology can provide for outputting egress instructions to the users. The output can be provided via egress advisement devices positioned within the building and proximate to locations of the users and/or zones in the building where the emergency is not detected. The output can also be provided via user computing devices (e.g., through the mobile application described herein). In implementations where the instructions are provided via the user computing devices, the user computing devices can be instructed to temporarily deactivate or lock features of the user computing devices. As a result, the users may not become distracted by such features while trying to egress the building during the emergency. The users can remain focused on following the instructions to quickly and safely egress from the building. Once the users are detected as being outside of the building or some distance away from the emergency, the features of the user computing devices can be unlocked or re-activated. As a result, the users can then perform activities with their user computing devices, such as calling, texting, opening and closing applications, and turning off their devices. In some implementations, the user computing devices can also be configured to automatically transmit a notification to emergency personnel (e.g., dial 911) about the emergency.

The disclosed technology can also provide for dynamically creating and updating egress plans in real-time. For example, sensors positioned throughout the building can track or sense presence of users. The disclosed technology can then generate egress plans for the sensed users based on their current locations in the building. These egress plans can be stored in temporary storage or memory (e.g., at each of the egress advisement devices, at one of the egress advisement devices, at a central egress computing system). As their locations change (e.g., the sensors sense presence of the users in different zones or rooms in the building), the disclosed technology can dynamically update or modify the egress plans originally generated for such users. In some implementations, when users are sensed as leaving the building, the egress plans generated for such users can be removed or deleted from temporary storage.

Using the disclosed technology, the building can be separated into different zones. A zone can encompass multiple rooms, portions of multiple rooms, or portions or a portion of a room. In some implementations, therefore, a room can have multiple zones. Each zone can have sensors and/or egress advisement devices. The egress advisement devices can communicate with each other in all of the zones to identify where users are located, where an emergency exists in the building, and where the emergency may spread. Each of the egress advisement devices can determine which of the devices are turned on/activated and which are turned off/deactivated. Activated devices may have sensed the emergency. Thus, the egress advisement devices can generate egress plans, in real-time, that incorporate the deactivated devices. As a result, the generated egress plans can avoid the zones having the activated devices, which indicates that such zones are emergency zones. The disclosed technology can also use predictive analytics, AI, and/or ML to predict where the emergency may spread such that the generated egress plans can avoid zones where the emergency is predicted to spread. The disclosed technology can be retrofitted to existing egress devices in the building.

The egress advisement devices and/or sensors described herein can be communicatively connected to each other in a mesh framework. In some implementations, the devices may not communicate directly with a central system. This framework can be advantageous in the event that the central system goes down during an emergency. For example, if the central system (or an egress advisement device that is configured to be a central monitoring system) is engulfed in flames during the emergency, the egress advisement devices can still communicate with each other about sensed changes in the environment (e.g., movement of users, spread or progression of the emergency, etc.). Therefore, the egress advisement devices can generate egress plans in real-time, update egress plans based on changes in the environment, and output instructions to users proximate to the devices to safely and quickly egress from the building.

Now referring to the figures, FIG. 1 is a conceptual diagram of a building 400 having different egress routes per floor. As described herein, each floor in the building 400 can have different floorplans, layouts, furniture layouts, components, structures, and users. Each floor in the building 400 can therefore have different designated zones and placement and locations of egress advisement devices and/or sensors (e.g., fire alarms, carbon monoxide detectors, fire detectors, cameras, temperature sensors, humidity sensors, smoke detectors, motion sensors, user sensors, etc.). The different zones and placement of egress advisement devices and/or sensors can also result in each floor of the building 400 having different possible or predicted egress routes to exit the building 400.

The building 400 includes 31 floors. The building 400 can be any one of a residential home, an apartment building, a high rise, a commercial building, or any other building or structure having permanent, frequent, or temporary users entering and exiting. The building 400 can also have additional or fewer floors than depicted in FIG. 1. In the example building 400, floor 1 has rooms 402A-C. A window 410A is in room 402A. Elevators 406A-B and door 404 are located in room 402C. The rooms 402A-C can have additional windows and doors, but for simplicity, they are not depicted in FIG. 1.

Floor 1 has 4 designated zones. As described throughout this disclosure, each building and/or floor of a building can have a different number of zones that can be designated based on room, location of egress devices, location of alternative or possible exits, etc. On floor 1, zone 1 encompasses a majority of room 402A, the window 401A (a possible exit during an emergency), and a small portion of room 402C adjacent to the majority of room 402A. Zone 2 encompasses a portion of room 402C that includes the elevator 406A. Zone 3 encompasses portions of each room 402A-C and the door 404 (a possible exit). Zone 4 encompasses a portion of room 402B and the elevator 406B. Each of the zones on floor 1 also include at least one egress device. For example, zone 1 includes egress device 408A, which is located in room 402A and can provide emergency guidance or instructions to users in the room 402A. Zone 2 includes egress device 408J, next to the elevator 406A. Zone 3 includes egress device 408K, which is located in room 402C. Zone 4 includes egress device 408B in room 402B, which can also be instructed to provide emergency guidance to users in the room 402B, and egress device 408C in room 402C. Any of the egress devices 408A-C, J-K can include sensors to sense changes in the environment, emergencies, and receive user information. The egress devices 408A-C, J-K can communicate with each other to determine where an emergency starts and is predicted to spread and how users should egress from the building 400.

Similarly, floor 30 has 3 designated zones. Zone 5 encompasses a portion of room 402D having a window 401B (a possible exit during an emergency) and a portion of room 402F. Zone 6 encompasses a portion of each room 402D, 402E, and 402F, which includes the elevator 406A, a possible exit during an emergency. Zone 7 encompasses a portion of room 402E having stairs 416 (a possible exit) and a portion of room 402F having the elevator 406B (another possible exit). In this example, floor 30 includes an egress device 408D in room 402D and zone 1, an egress device 408E in room 402E and zone 7, and an egress device 408F in room 402F in zone 7. Here, there may be no egress devices in zone 6. However, egress devices such as 408F can sense conditions in portions of zone 6 that encompass room 402F, device 408D can sense conditions in portions of zone 6 that encompass room 402D, and device 408E can sense conditions in portions of zone 6 that encompass room 402E.

In some implementations, as shown with floor 30, the devices 408D-F may already be installed in the building 400. Zones 5-7 may be determined and identified at a later time and therefore may or may not be determined based on location of pre-installed devices 408D-F. In such scenarios, the disclosed technology can be retrofitted onto existing emergency advisement and egress systems, which can be less costly to implement. In some implementations, as shown with floor 1, the zones 1-4 can be determined before the devices 408A-C, J-K are installed. Therefore, once the zones 1-4 are determined, the devices 408A-C, J-K can be installed such that each zone has at least one egress device. In such scenarios, the disclosed technology can be added to the building 400.

Still referring to FIG. 1, floor 31 has 4 zones. Zone 8 encompasses portions of rooms 402G and 402I, which includes window 401C and the elevator 406A. Zone 9 encompasses portions of rooms 402G and 402H and does not include any possible exits. Zone 10 encompasses the entirety of room 402H, which includes the stairs 416 (a possible exit) and a portion of room 402I. Zone 11 encompasses a portion of room 402I, which includes the elevator 406B. Zone 8 includes an egress device 408G positioned in room 402G. Zone 10 includes egress device 408H positioned in room 402H. Zone 11 includes egress device 408I positioned in room 402I.

In the example building 400, a fire 420 has started on floor 31. Sensors positioned proximate to a location of the fire 420 and/or the egress device 408I can sense or otherwise detect the emergency. One or more of the devices 408G-I can predict the spread of the fire 420, identify locations of users on floor 31, determine egress plans for such users that avoid areas where the fire 420 is located, has spread, and/or is predicted to spread, and output such egress plans to the users. The devices 408G-I can then communicate with the devices 408A-F, J-K in the building 400, notifying such devices about information related to the detected fire 420. The devices 408A-F, J-K can similarly determine and output egress plans for users located on each of the floors in the building 400.

Possible egress routes from floor 31 414 can include exiting via the stairs 416. Since the fire 420 started near the elevator 406A, one or more of the devices 408G-I can determine that exiting by the elevator 406A and/or the elevator 406B may not be optimal or safest for users on floor 31. Thus, the stairs 416 are highlighted on floor 31. In some implementations, the device 408H can emit a light or other signal that can direct users to the stairs 416. For example, the device 408H can emit a green light directed towards the stairs 416.

Possible egress routes from floor 30 412 can include exiting through the elevators 406A or 406B or via the stairs 416. Therefore, the elevators 406A-B and the stairs 416 are highlighted on floor 30. As described above, egress devices proximate to each of these possible exits can emit signals (e.g., visual, audio) indicating to users that they can or should take these exits. The devices 408D-F can determine that since the fire 420 is on floor 31 and is likely to spread very slowly or not spread at all to floor 31, users on floor 30 can exit through any of the possible exits, except for the window 401B. In some implementations, the devices 408D-F can receive the list of egress routes 414 from the devices 408G-I on floor 31. The devices 408D-F can then update the list of egress routes 412 for floor 30 so as to avoid the egress routes 414. This can be advantageous to prevent congestion along the egress routes 414. Therefore, users on floor 30 can safely egress and avoid the fire 420 without being delayed or prevented from doing so by users on lower floors.

Possible egress routes from floor 1 410 can include exiting through the window 401A or the door 404, both of which are highlighted. Because floor 1 can be on street or ground level, exiting through the window 401A can be a safe option for users. Moreover, since floor 1 can be street or ground level, the elevators 406A-B may not have to be used by users on floor 1. Therefore, the elevators 406A-B can remain available for egress by users on floors above floor 1.

In some implementations, the devices 408G-I, 408D-F, and 408A-C, J-K can determine possible egress routes at different times since detection of the emergency. For example, the devices 408G-I can determine egress routes at a first time, immediately following detection of the emergency. This way, users closest to the fire 420 can have more time to safely and quickly egress from the building 400. In some implementations, the devices 408A-C, J-K can determine egress routes and instruct users to exit the building 400 at a later time. This is because it can take the users less time to egress from floor 1 than it would take users to egress from any of the floors above the building. Staggering egress plan generation and outputting for the building 400 can be advantageous to ensure that possible egress routes do not become congested and to ensure that all users can safely and quickly egress from the emergency. In some implementations, users having disabilities or other health or safety concerns can receive egress instructions before other users, regardless of proximity of the user to the emergency. Moreover, as described herein, the possible egress routes 410, 412, and 414 can dynamically change in real-time based on sensed conditions in the environment, such as spread of the fire 420 and/or movement of users along any of the routes 410, 412, and 414 on any of the floors in the building 400.

Figure 2A:
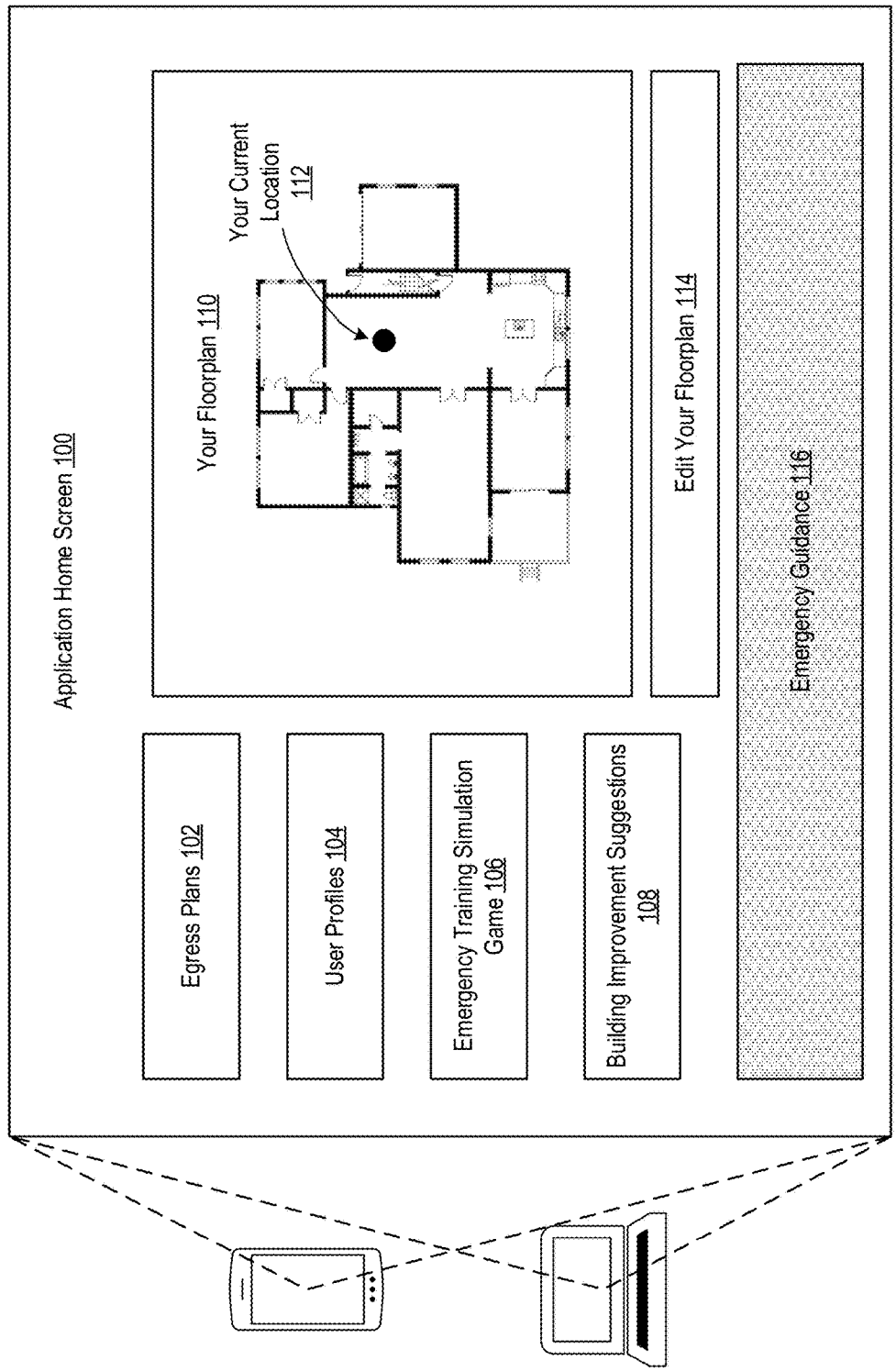
FIG. 2A is a graphical user interface (GUI) display of an egress safety application as described herein.

FIG. 2A is a graphical user interface (GUI) display of an egress safety application 101 as described herein. The application 101 can be presented at user computing devices, including but not limited to mobile devices such as cell phones, tablets, laptops, computers, smart devices, and/or wearables. The application 101 can be downloaded onto a user computing device. The application 101 can also be accessible from a web browser.

The application 101 can include a home screen 100. From the home screen 100, a user can select a plurality of options related to egress planning, egress training or practice, user information, and building information. An example home screen 100 is depicted in FIG. 2A. The home screen 100 can include selectable options (e.g., buttons) for egress plans 102 (e.g., refer to FIG. 2B), user profiles 104 (e.g., refer to FIG. 2C), emergency training simulation game 106 (e.g., refer to FIGS. 2D-F), and building improvement suggestions 108 (e.g., refer to FIG. 2G).

The home screen 100 can also include a depiction of the user's floorplan 110 with the user's current location 112 identified in the floorplan 110. The floorplan 110 can be determined by one or more egress devices positioned throughout a building where the user is located. The floorplan 110 can also be determined by a central egress computing system in communication with egress devices and/or sensors positioned throughout the building. Moreover, the user's current location 112 can be determined based on egress devices and/or sensors in the building detecting motion of the user. The current location 112 can also be identified based on GPS or other location-based signals detected by the user's computing device. In some implementations, the current location 112 can also be determined based on analyzing images or videos that are captured inside the building and comparing identified locations of the user in those images or videos. The home screen 100 can also include a selectable option to edit your floorplan 114. By selecting this option, the user can modify a layout of the building (e.g., if the user renovated the building and the floorplan 110 does not yet reflect those renovations), update their current location (e.g., location-based tracking was turned off or power/connectivity was lost and the floorplan 110 does not reflect an accurate current location of the user), and/or update or change placement of furniture or other items in the floorplan 110.

The home screen 100 may also include an emergency guidance 116 option. The emergency guidance 116 may be greyed-out, as depicted, which indicates that the user may not be able to select emergency guidance 116 at a present time. The emergency guidance 116 may become selectable upon detection of an emergency in the building where the user is located. In some implementations, the emergency guidance 116 can be automatically launched upon detection of the emergency. In some implementations, the user can be notified of the detected emergency and then the user can select the emergency guidance 116 option. As described herein, when the emergency guidance 116 is launched, features of the user computing device, such as calling and texting, can be temporarily deactivated or locked. In other words, the user may not be able to exit out of or close the emergency guidance 116. This can be advantageous to help the user focus on safely and quickly egressing. Once the user is detected to be outside of the building or away from the emergency, the emergency guidance 116 can close and the features of the user computing device can be unlocked or reactivated.

FIG. 2B is a GUI display of egress plans 102 for the building. The user can access the egress plans 102 from the home screen 100 in FIG. 2A. The egress plans 102 screen can depict different possible egress plans or routes that were determined for the building, emergency type, and/or user. The user can sort the egress plans based on one or more filters including an emergency type 120 filter and a user 122 filter. For example, as described herein, the egress devices and/or the central egress computing system can determine different possible egress routes for different types of emergencies, such as fires, gas leaks, etc. Different possible egress routes an also be determined for different users in the building, depending on particular information about each of the users. Thus, the user can view egress routes for other users in the building as well as egress routes that were determined for the particular user.

In this example egress plans 102 screen, egress plan 124A, 124B, and 124N have been generated. Plan 124A provides guidance for the user from a master bedroom in the building. Plan 124B provides guidance for the user from a second floor hallway in the building. Plan 124C provides guidance for the user from a kitchen in the building. In some implementations, additional or fewer plans can be generated. For example, an egress plan can provide guidance from a current location of the user in the building. The egress plans can provide guidance from a most frequented room of the user in the building. The egress plans can also provide guidance from zones in the building that may or may not be specific to any particular rooms in the building.

One or more selectable options can be presented for each of the egress plans 124A-N. For example, the user can choose to edit plan 126A-N, view plan 128A-N, view suggested improvements 130A-N, and train with the plan 132A-N. By selecting edit plan 126A-N, the user can modify the corresponding egress plan 124A-N based on the user's preferences. When the user modifies the egress plan 124A-N, the central egress computing system and/or the egress devices can train on and learn, using AI and/or ML, from the user modifications. Therefore, the central egress computing system and/or the egress devices can generate more accurate and preferred egress plans for the user.

By selecting view plan 128A-N, the user can view (in the same screen, in a different screen, or in a pop-up window, etc.) the floorplan 110 with the corresponding egress plan 124A-N highlighted. For example, if the user selected view plan 128A for the egress plan 124A from the master bedroom, the floorplan 110 can be marked or annotated with an arrow depicting movement of the user from the master bedroom, through one or more other rooms or zones in the building, and out through an exit in the building. In this view, the user can also see projected information about how the user would egress during the emergency. For example, the user can see a projected amount of time that it would take the user to move along the highlighted egress plan 124A. As the central egress computing system and/or the egress devices learn more about the user (e.g., through user performance in the emergency simulation game, updates to the user profile, sensed information or motion detection of the user in the building, etc.), the projected amount of time and other projected egress information can be dynamically modified and presented to the user.

Similarly, by selecting edit plan 126A-N, the user can view the floorplan 110 with the corresponding egress plan highlighted. The user can then choose to drag, delete, click, or reposition the highlighted egress plan in the floorplan 110.

By selecting suggested improvements 130A-N, the user can view suggestions for safer and quicker egress that the central egress computing system and/or the egress devices generated for the user. For example, the suggestions can include sleeping with the master bedroom door unlocked so that the user may not have to fumble with unlocking the door should an emergency occur during the night. As another example, the suggestions can include moving a chair or other piece of furniture such that the user may not trip over that furniture while egressing during an emergency. In some implementations, the suggestions can provide the user with tips about how to act during an emergency. For example, the suggestions can remind the user to crawl when there is fire and smoke, to put dampened towels or other fabric under doors, and to remain calm throughout the emergency.

Figure 2C:
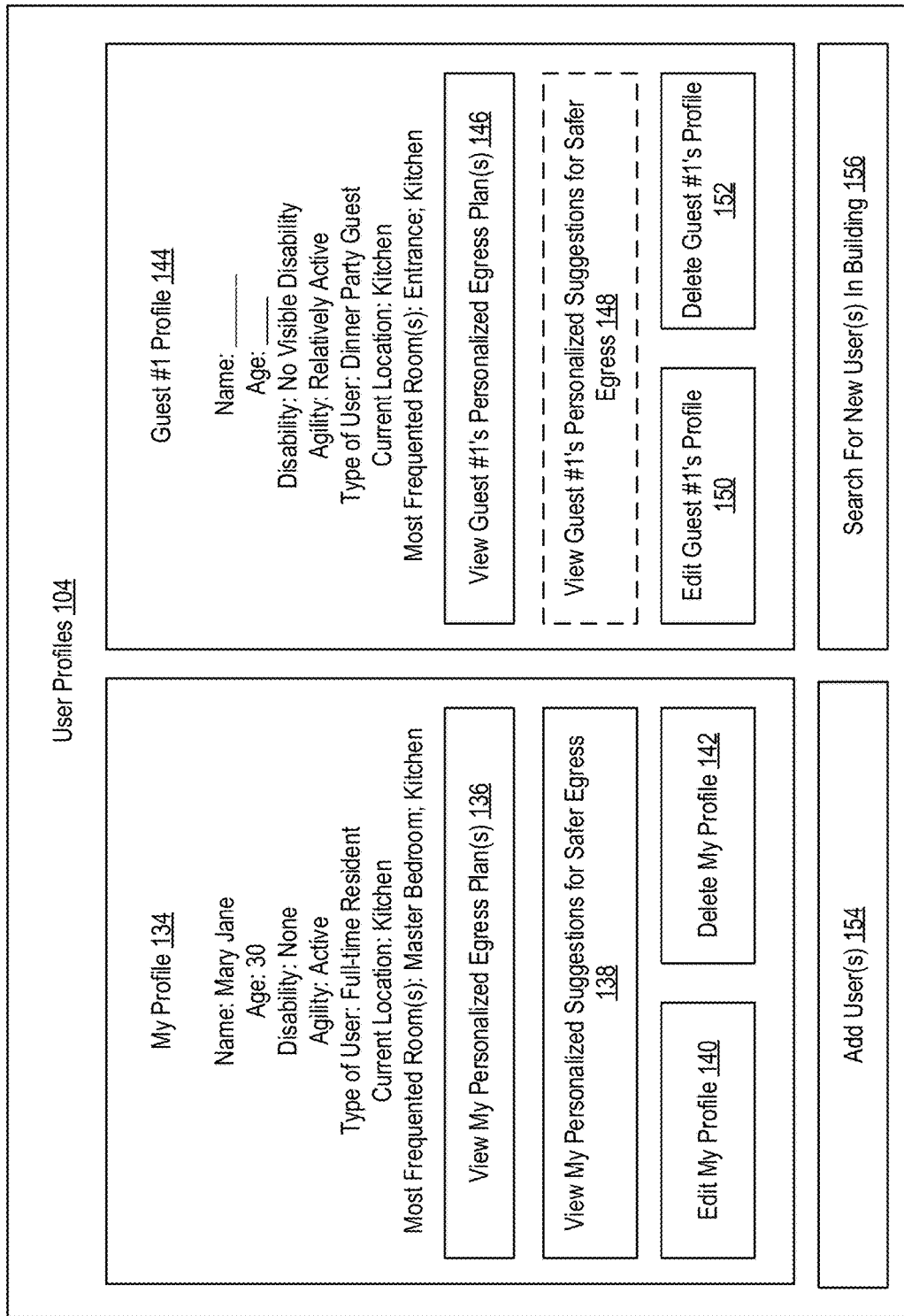
FIG. 2C is a GUI display of user profiles in the building.
Figure 2D:
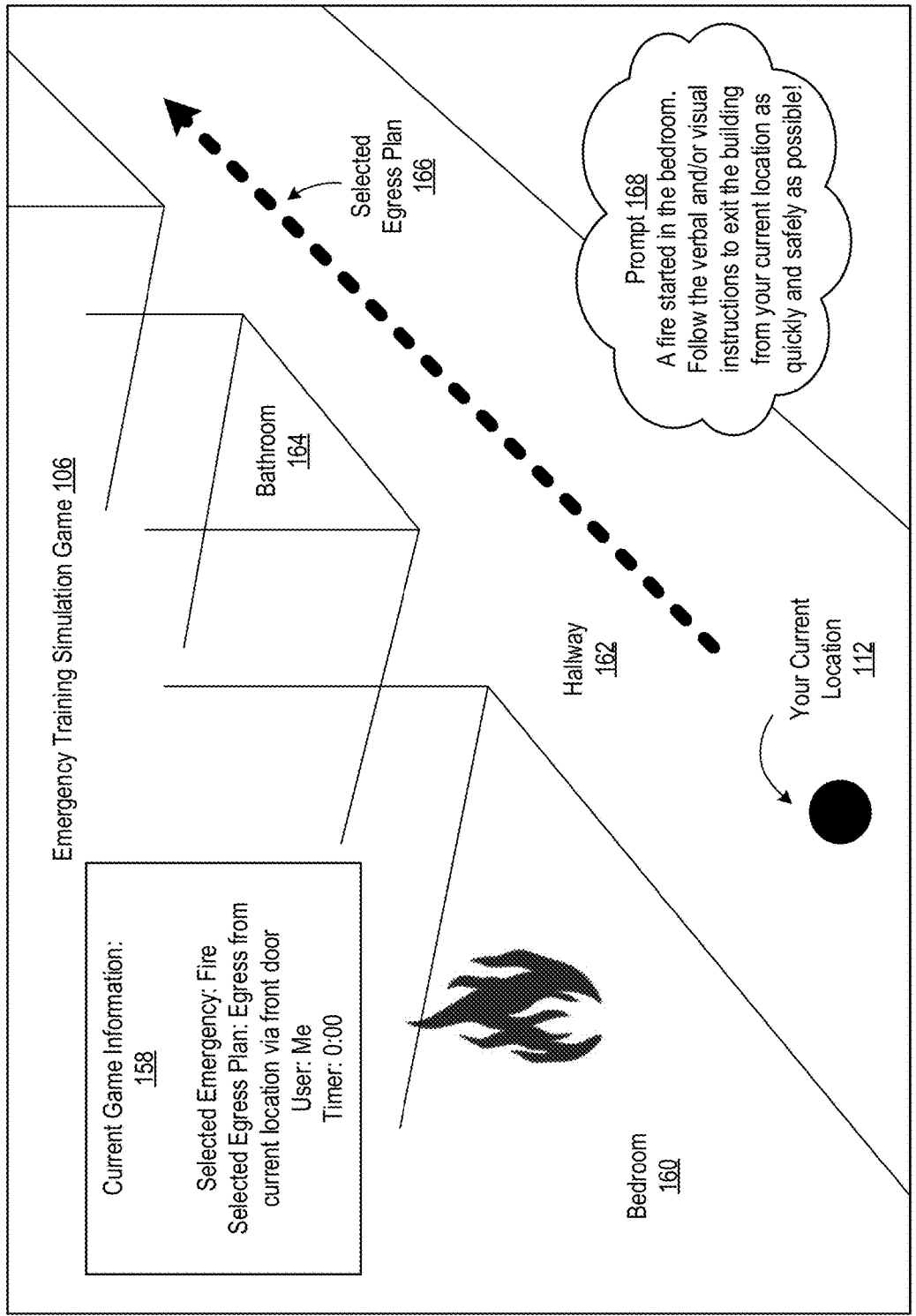
FIG. 2D-F are GUI displays of an emergency training simulation game for a user in the building.
Figure 2E:
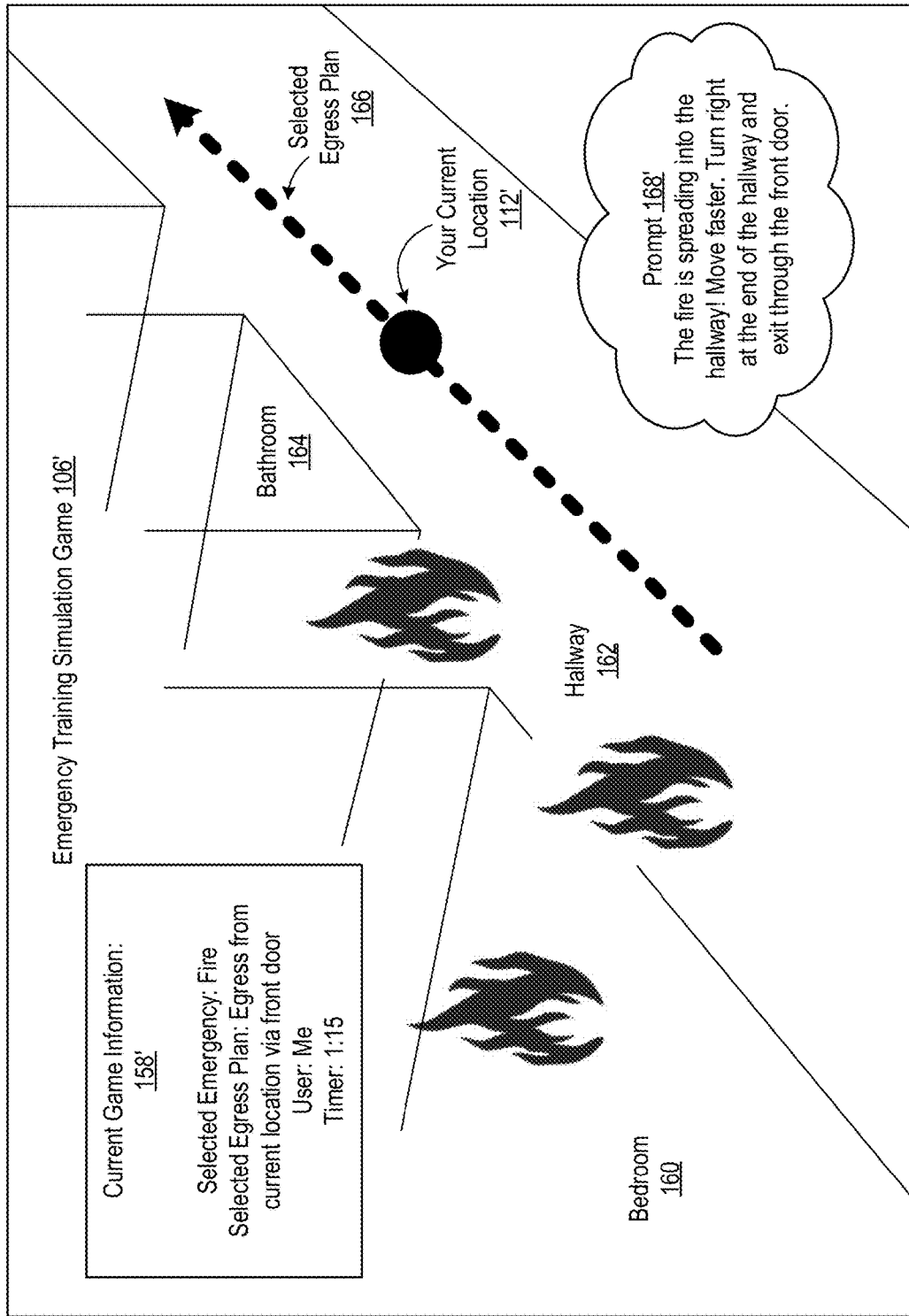
Figure 2F:
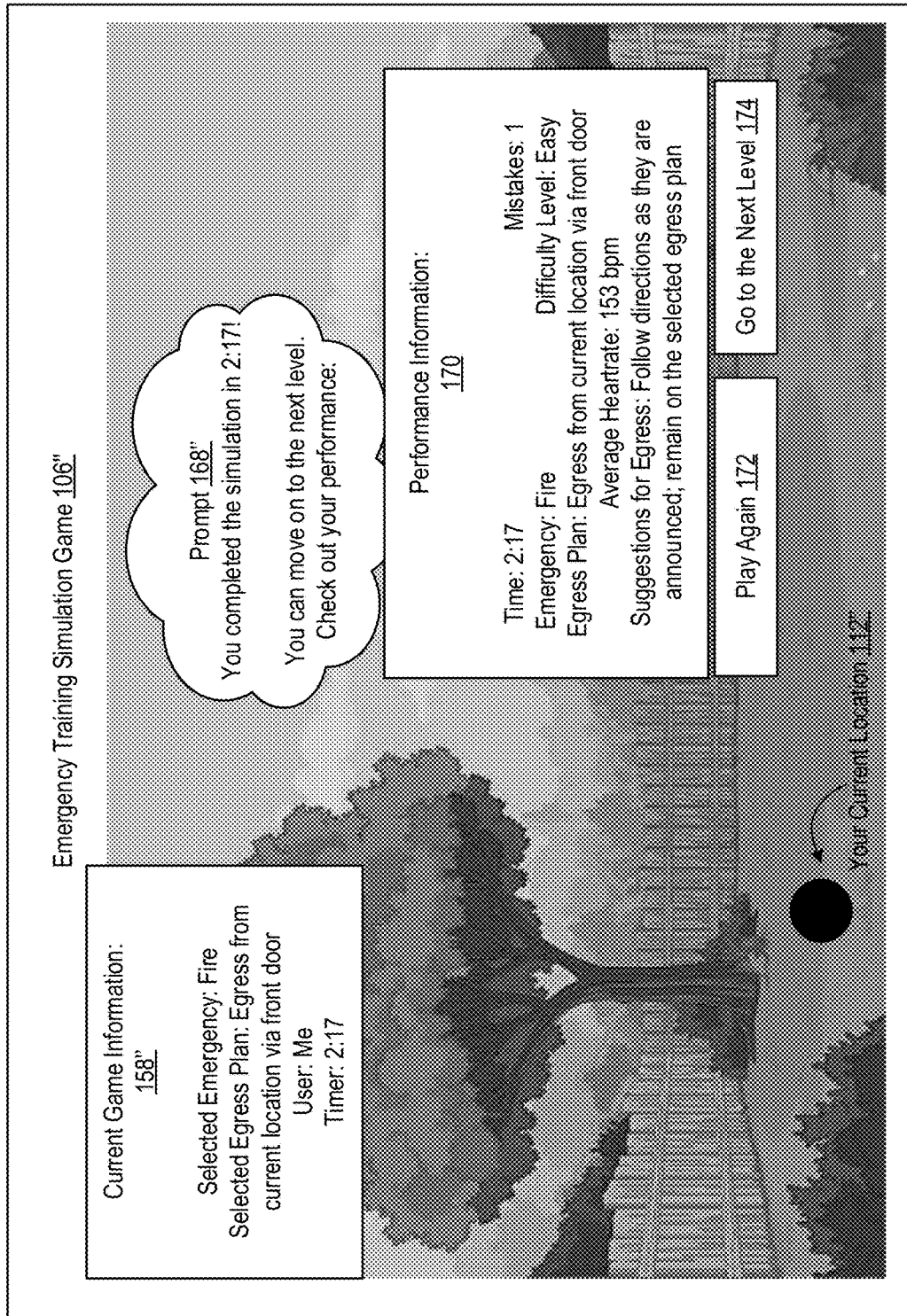

By selecting train with the plan 132A-N, the user can be directed to the emergency training simulation game 106, as described in reference to FIGS. 2D-F. For example, if the user selects train with the plan 132B for the egress plan 124B from the second floor hallway, then the emergency training simulation game 106 can be set up for the particular user and starting in the second floor hallway. The egress plan 124B, which the user can view via the view plan 128B option, can now be used to instruct the user how to complete the emergency training simulation game 106. In other words, the egress plan 124B can be outputted to the user in the game 106 so that the user can virtually practice following the instructions and egressing from the second floor hallway during the emergency in the virtual environment of the game 106.

FIG. 2C is a GUI display of user profiles 104 in the building. The user can access the user profiles 104 from the home screen 100 in FIG. 2A. The user can view their profile 134 as well as profiles of other users in the building. In this example, the user can also view Guest #1 profile 144. In some implementations, the user profiles 104 screen can be populated with multiple profiles based on devices in the building sensing presence of new users. Therefore, for each new user, a new profile can be generated. The profiles can be temporarily generated and based on how long the users remain in the building, the profiles can be stored. In other words, the more frequent the users, the more permanent their profiles. When infrequent or temporary users leave the building, their profiles can be deleted or removed from temporary storage. The profiles can also be dynamically modified in real-time based on sensed conditions in the building. For example, real-time location information of each of the users can be tracked by sensors and/or egress devices in the building and/or user computing devices that are carried by or worn by the users. The central egress computing system and/or egress devices can also learn, using AI and/or ML, about the users to more accurately determine and/or predict user information.

The profiles can include information such as name, age, disability, agility level, type of user, current location, and most frequented room(s). The profiles can also include selectable options to view personalized egress plan(s), personalized suggestions for safer egress, edit the profiles, and delete the profiles. Moreover, the user can select options such as add user(s) 154 and search for new user(s) in the building 156. By selecting add user(s) 154, the user can manually create a profile for a new user in the building. The user can choose to fill in some information and the central egress computing system and/or the egress devices can be trained to learn about the new user and fill in other information in the new user profile. By selecting search for new user(s) in the building 156, the sensors and/or egress devices can be instructed to capture information about the building. For example, one or more sensors near an entrance to the building can be instructed to capture image date of the entrance. The images can be analyzed by the central egress computing system to determine whether new faces/users are identified in the images. If new users are identified, then the computing system can create profiles for each of the new identified users. The computing system, sensors, and/or egress devices can then be trained on, using AI and/or ML, the new identified user images to track the new users through the building and collect more information about the users to build out their corresponding profiles. In some implementations, components in the building can be instructed to automatically scan the building for new users at predetermined times. The components in the building can also be instructed to continuously scan the building for new users.

In the example user profiles 104 screen in FIG. 2C, the user profile 134 is populated with information about the user. As shown, the user's name is Mary Jane, she is 30, has no disabilities, is active, is a full-time resident of the building, is currently located in the kitchen of the building, and spends the most amount of time in the master bedroom and the kitchen. Using such information, the central egress computing system and/or the egress devices can generate optimal egress plans for the user. For example, since the user is active and does not have any disabilities, egress plans can be generated that may require the user to take a longer route to exit the building in comparison to users that may not be as active or may have a disability. Since the user's most frequented rooms are the master bedroom and the kitchen, it can be more likely that the user will be in one of those rooms at a time that an emergency occurs. Therefore, more egress plans can be generated for the most frequented rooms. Additionally, when the user plays the emergency simulation game 106, the game 106 can focus on more scenarios where the user exits the most frequented rooms. Therefore, the user can become more comfortable and used to egressing from these rooms.

The user Mary Jane can also view her personalized egress plan(s) 136. For example, by selecting option 136, the user can be directed to the egress plans 102 screen. The option 136 can therefore present the user with egress plans that were generated specifically for that user. The user can select any of the personalized egress plans to practice and/or review them. The user can also view their personalized suggestions for safer egress 138. The suggestions can include information about how quickly the user is expected to egress from different rooms or zones in the building. This information can be based on the central egress computing system and/or the egress devices training and learning on data about the user (e.g., movement of the user that is detected in the building, user performance in the emergency simulation game 106, etc.). The suggestions can be dynamically updated in real-time based on data or information that is received, detected, predicted, and/or determined about the user. The suggestions for safer egress 138 may include general tips to help the user egress from the building in the event of an emergency.

The user Mary Jane can also edit her profile 140. The user can input information in the profile 134 that can be used by the central egress computing system and/or the egress devices to better predict user activity during an emergency and generate optimal egress plans for the user. The user can also delete their profile 142. Deleting the profile 142 can result in the central egress computing system and/or the egress devices erasing any learned data, models, predicted activity, and/or generated egress routes for the user Mary Jane. In some implementations, deleting the profile 142 can include removing the profile 134 from temporary storage/volatile memory/RAM and maintaining a version of the profile 134 in a remote data store (e.g., cloud storage). The version in the remote data store can be used for training the central egress computing system and/or the egress devices to improve generation and prediction of emergencies and egress plans.

The user can also view Guest #1 profile 144. In this example, Guest #1 can be a visitor to the building, such as a dinner guest or friend of the user Mary Jane. One or more of the central egress computing system, the egress devices, and/or sensors positioned within the building can sense or detect that a new user has entered the building. As a result, a profile can be generated for that user. The devices and/or sensors in the building can sense the new user in a variety of ways. For example, the devices can receive images of known users in the building. The images can be stored in a database that is in communication with the devices. The devices can capture images of the new user and compare those images to the images of known users. Using image analysis techniques (e.g., facial recognition), the devices can determine whether the images of the new users match images of known users. If there is a match (e.g., facial recognition), then the devices can determine that the new user is in fact one of the known users for the building. The devices can then access information about the known users to update egress plans for the known users based on their current movements in the building. If, on the other hand, there is not a match, then the devices can determine that the new user is in fact a new user to the building.

As another example, the user can provide a notification or input to the devices indicating that guests or new users will be entering the building. The notification or input can indicate a time period during which the guests or new users will be entering and remaining in the building. The notification or input can be provided at the mobile application described herein. Upon receiving this notification or input, the devices can be configured to automatically and actively scan an entrance to the building to identify new users as they enter the building. The devices can monitor the entrance to the building for the time period identified in the notification or input. Once the time period ends, the devices can stop scanning the entrance to the building to stop scanning for new users or guests.

Once the new user is identified and a profile is created for that user, the devices can continue to monitor the new user to generate egress plans for that user. As the new user continues to move around the building, any one of the devices mentioned above can detect motion or actions of the new user to determine characteristics about that user that can be used to generate corresponding egress plans. Thus, the devices can learn and train on data received about the user to predict how the new user may respond during an emergency and generate optimal egress plans for the new user.

As shown in the example Guest #1 profile 144, the name and age of the new user are unknown. This is information that can be inputted by the user Mary Jane and/or the new user by selecting the Edit Guest #1's Profile 150. This is information that devices such as the central egress computing system and/or the egress devices may not be able to detect from sensing the new user moving around the building in real-time. The profile 144 also indicates that no visible disabilities are identified. For example, the egress devices can be trained to identify equipment that may be used by users with disabilities, such as crutches, wheel chairs, and canes. The egress devices can be configured to capture images and/or videos of the new users and, using image processing techniques and analysis, determine whether such equipment are identified. If such equipment is identified, the Guest #1 profile 144 can be updated to reflect that there is some visible disability. Similarly, the egress devices can be trained to identify an agility level of the new user. For example, using similar image processing techniques and motion detection, the egress devices can determine how quickly the new user moves around the house, whether the user has a limp, etc. The egress devices can also correlate detected movements of the new user with classifications that can be associated with different types of disabilities and/or agility levels. The techniques described herein can also be performed by the central egress computing system described herein or another similar computing system.

The profile 144 also indicates that the new user is currently located in the kitchen. The most frequented room(s) of the new user include an entrance and the kitchen. This information can be detected by the egress devices and/or sensors positioned throughout the building. Such devices can detect the new user's motions. To determine the most frequented room(s), the central egress computing system and/or the egress devices can be configured to maintain a count of how many times the user enters each of the rooms in the building. The computing system and/or the devices can then start a timer every time the user enters each of the rooms in the building. The timer can be automatically stopped once the computing system and/or the devices detect that the user left the room. Then, the computing system and/or the devices can determine which of the rooms had counts exceeding a threshold value and, of those rooms, which rooms the user spent the most amount of time in.

The user (either Mary Jane or the new user) can view Guest #1's personalized egress plans 146. The user (either Mary Jane or the new user) can also optionally view Guest #1's personalized suggestions for safer egress 148. The option 148 may not be immediately selectable for the new user. For example, if the central egress computing system and/or the egress devices do not have enough information about the new user (e.g., a confirmed disability, a type of user), the computing system and/or the egress devices may not be able to provide many suggestions for the new user. However, over time, as the computing system and/or the egress devices train on data received about the new user, suggestions can be generated and viewable by selecting the option 148.

Like the user profile 134, in the profile 144, Guest #1's profile can be edited by selecting option 150. Guest #1's profile can also be deleted by selecting option 152.

FIG. 2D-F are GUI displays of an emergency training simulation game 106 for a user in the building. The user can access the game 106 from the home screen 100 in FIG. 2A, as described herein. The user can also access the game 106 from the egress plans 102 screen in FIG. 2B. The central egress computing system can generate the game 106 based on a current location 112 of the user in the building. An emergency in the game 106 can be simulated to mimic a real emergency that can occur in the building. The game 106 can also be generated for the user based on information about the user, such as the user's age, disability, agility level, etc. The central egress computing system can train on data received about the user to learn how the user may respond to any type of emergency. The central egress computing system can then generate the game 106 to simulate any one of those identified emergencies and present the game 106 to the user in the interface depicted in FIGS. 2D-F.

Based on how the user performs in the game 106, the central egress computing system can determine how the user would perform during a real-time emergency like the one simulated in the game 106. The computing system can also determine what suggestions to provide to the user for safer egress. The computing system can also train to generate more advanced or different difficulty levels of simulations to present to the user in subsequent games 106. For example, if the user quickly completes a first simulated emergency game 106, the central egress computing system can learn that the user is comfortable in such an emergency and therefore the user should go through a more challenging simulated emergency. The computing system can generate a second simulated emergency game 106 that can be more complex and/or challenging than the first simulated emergency game 106. In so doing, the emergency simulation game 106 can be used to train the user and prepare the user to become comfortable in safely and quickly egressing from the building during a real-time emergency.

In some implementations, the game 106 can be played using alternate reality (AR) and/or virtual reality (VR) technology (e.g., headsets, glasses, etc.). The user can "step into" the virtual, simulated representation of the building in the game 106. The user can then move around in this virtual, simulated representation of the building as if the user is physically present in the virtual, simulated representation of the building. In some implementations, the user can control an avatar in the virtual, simulated representation of the building. The avatar can represent the user.

Referring to FIG. 2D, at time 0:00, the current location 112 of the user is depicted in the game 106 in hallway 162. The current location 112 can be an actual current location of the user in the building. Therefore, the game 106 can simulate an emergency relative to the actual current location of the user in the building. In some implementations, the current location 112 can be a location different from the actual current location of the user in the building. For example, the current location 112 can be a most frequented room of the user (e.g., the master bedroom) but at the time that that the user is playing the game 106, the actual current location of the user is in the living room of the building.

In the example game 106, the current location 112 of the user is in the hallway 162. A fire can be simulated in bedroom 160. Current game information 158 can also be presented to the user in the game 106. The current game information 158 can indicate what type of emergency is being simulated, what egress plan the user must complete to complete the game 106, which user is playing the game 106, and a timer indicating how long it takes the user to complete the game 106.

Selected egress plan 166 overlays the hallway 162 where the user is currently located. The plan 166 indicates which direction the user must go in in order to escape the fire and complete the game 106. The plan 166 can be presented to the user in a number of different ways in order to mimic or replicate how the plan 166 would be presented to the user during a real-time emergency. For example, if egress devices in the building are configured to emit light signals that illuminate an egress plan for the user, then in the game 106, the selected egress plan 166 can be depicted by emitting light signals in the hallway 162. As another example, if egress devices in the building are configured to emit audio signals instructing the user on how to exit, then in the game 106, the selected egress plan 166 can be verbally communicated to the user. In other words, the user's computing device can output audio instructions for the selected egress plan 166.

As yet another example, if the user receives egress instructions as visual prompts at the user's computing device, then prompt 168 can be depicted in the game 106 to output instructions to the user to read during the game 106. In FIG. 2D, the prompt 168 notifies the user that "A fire started in the bedroom. Follow the verbal and/or visual instructions to exit the building from your current location as quickly and safely as possible!" The prompt 168 can be updated in real-time and based on user performance in the game 106.

In some implementations, the central egress computing system can learn and train, using ML, on data about the user to determine how much information the user should be given in the prompt 168. For example, if the user quickly completes the game 106 with minimal or no mistakes, then the computing system can determine that the user does not need step-by-step detailed instructions to egress the building. On the other hand, if the user completes the game 106 more slowly and makes mistakes, the computing system can learn that the user needs more detailed step-by-step instructions in order to improve the user's ability to quickly and safely egress. Therefore, the computing system can develop more personalized prompts for the user. Such prompts can be saved and/or used by the computing system in generating egress plans for the user that can be used during a real-time emergency. For example, during the real-time emergency, the user can receive the same prompts or instructions that the user received during the game 106. Receiving the same prompts or instructions can be beneficial to make the user more comfortable, calm, and relaxed when exiting the building.

To move within the game 106, the user can move from the current location 112 using gaming techniques, such as swiping or sliding a finger up, down, left, and right on a touchscreen, selecting keys on a keyboard, maneuvering, hovering, and clicking with a mouse, making movements while using AR/VR devices, tilting the user computing device in different directions, maneuvering a joystick, or using other similar gaming devices and techniques.

FIG. 2E depicts an updated view of the game 106' after some time has passed. The current game information 158' is updated to reflect a change in time. Here, the user has already spent 1:15 in the simulated emergency, moving from the current location 112 to the updated current location 112' along the selected egress plan 166. As shown, in this simulated emergency, the fire has spread from the bedroom 160 into the hallway 162. The prompt 168' is updated to say, "The fire is spreading into the hallway! Move faster. Turn right at the end of the hallway and exit through the front door." As mentioned above, the prompts can dynamically change as the user plays the game 106 and moves therein. Here, the central egress computing system can determine that the user is moving too slowly along the egress plan 166, so the prompt 168' reflects an urgency for the user to pick up their pace.

FIG. 2F depicts an updated view of the game 106" once the user completed the egress plan by exiting the building. The current location 112" is depicted as being outside of the building. The current game information 158" is updated to reflect that it took the user 2:17 to exit the building from the current location 112 in FIG. 2D. The prompt 168" is also updated to say, "You completed the simulation in 2:17! You can move on to the next level. Check out your performance:."

A new pop-up window can appear in the game 106" that outputs performance information 170. The performance information 170 can indicate how long it took the user to complete the simulated emergency, how many mistakes the user made while playing the game 106, what type of emergency was simulated, a difficulty level of the game 106, an average heartrate of the user while playing the game 106, and suggestions for improving egress during a real-time emergency.

In some implementations, the central egress computing system can translate the time it took the user to complete the game 106 into an actual projected time that it would take the user to exit the building during a real-time emergency. The computing system can then determine suggestions for egress and other information that can be used to improve generated egress plans and/or predicting how the user would respond to a real-time emergency. The average heartrate can be determined based on receiving sensed heartrate values of the user while the user is playing the game. The sensed heartrate values can be received from sensors in the user computing device and/or sensors that are worn by the user (e.g., biometric sensors, wearable devices, smart watches, smart bracelets or rings, heartrate monitors, etc.). The average heartrate can be used by the computing system to determine a difficulty level of the game 106 as well as the selected egress plan. The average heartrate can also be used to determine how comfortable the user is in egressing from the building using the selected egress plan. Based on such determinations, the computing system can learn how the user may respond to a real-time emergency so that the computing system can develop more personalized emergency simulation games 106, egress plans, and egress instructions for the user.

As depicted in the game 106", the user can select an option to play again 172. By selecting the option 172, the user can play through the same simulated emergency. In some implementations, the same prompts 168 can be presented to the user. In some implementations, different prompts 168 can be presented to the user based on what the central egress computing system learned about the user's performance the first time that the user played the simulated emergency. The central egress computing system can train on the user's performance during the second time through the simulated emergency a second time to further improve subsequent simulated emergency levels, generated egress plans, and egress instructions for the user.

The user can also select an option to go to the next level 174. When the user selects the option 174, the computing system can present the user with another simulated emergency. This new simulated emergency can be more difficult than the first simulated emergency. This new simulated emergency can also be generated by the computing system based on the user's performance during the first simulated emergency and predicted/projected performance in subsequent simulated emergencies.

Figure 2G:
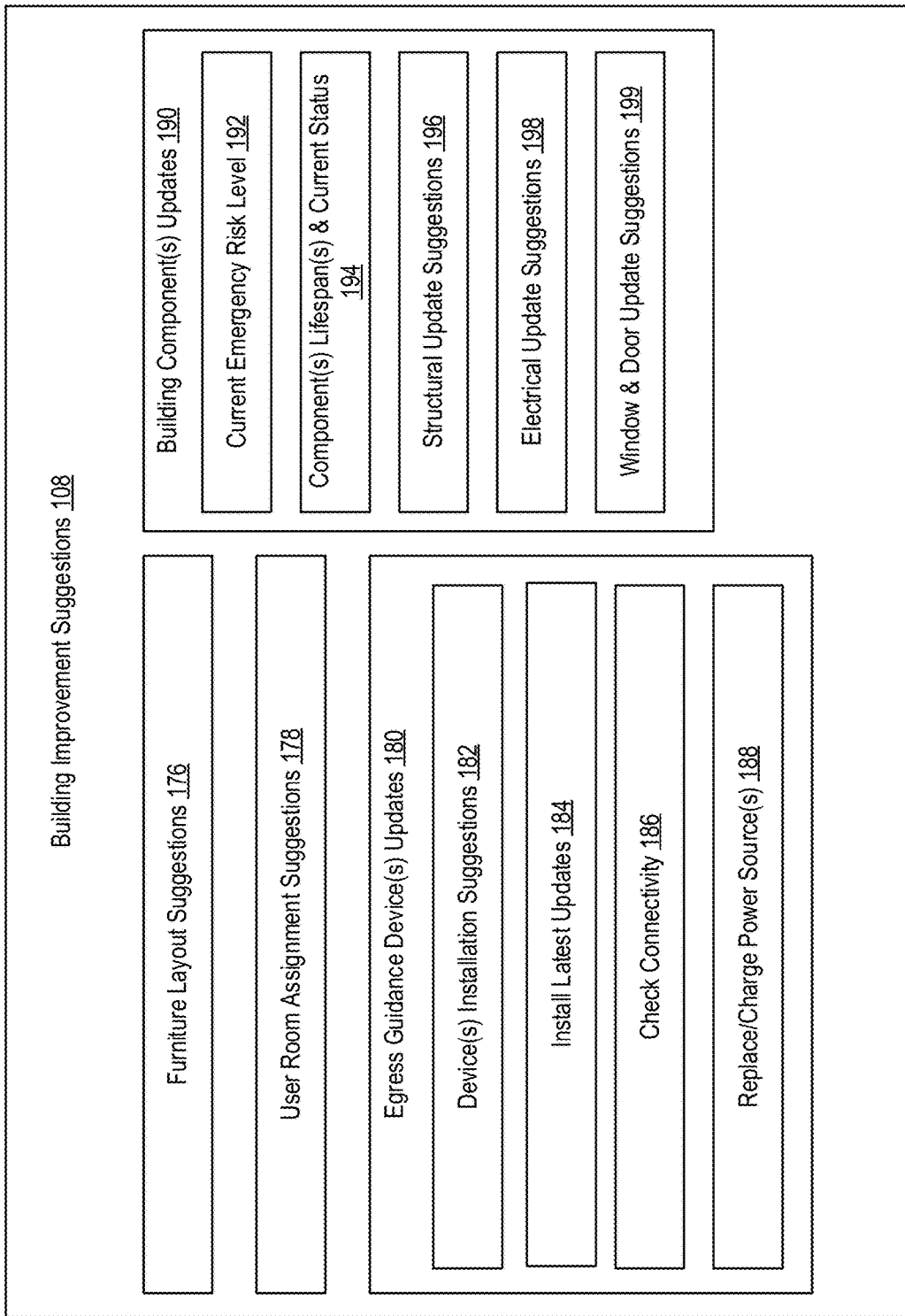
FIG. 2G is a GUI display of building improvement suggestions for the building.

FIG. 2G is a GUI display of building improvement suggestions 108 for the building. The user can access the building improvement suggestions 108 from the home screen 100 in FIG. 2A. The user can also access the suggestions 108 from the egress plans 102, as described in FIG. 2B.

The building improvement suggestions 108 screen can present information to the user that can be used to improve safety as well as lifespans and integrity of building components and structure. The suggestions 108 screen can include a number of selectable options that can be selected by the user. Each of the selectable options can open a new interface and/or a pop-up window. In some implementations, instead of selectable options or in combination with selectable options, the improvement suggestions can be presented to the user on the improvements 108 screen. The user can then scroll through and/or sort through the improvement suggestions presented directly on the screen.

The building improvement suggestions 108 can include furniture layout suggestions 176, user room assignment suggestions 178, egress guidance device(s) updates 180, and building component(s) updates 190. The central egress computing system can determine what improvements to suggest for the building using the techniques described herein (e.g., refer to FIG. 8).

The furniture layout suggestions 176 can include recommendations about where to place furniture such that the furniture does not block or obstruct generated egress plans. In some implementations, when the user moves furniture in the building, sensors and/or egress devices located in the building can detect such movements. The detected movement can be transmitted to the central egress computing system, which can determine whether egress plans can be updated to accommodate for the moved furniture and/or whether the furniture should be moved to other locations that do not obstruct existing egress plans.

The user room assignment suggestions 178 can provide suggestions about which rooms can be optimal for different users. For example, if a user in the building has a disability, it can be preferred to move that user to a room (e.g., apartment unit, bedroom, office, etc.) that is closer to exits out of the building. Therefore, the central egress computing system can provide suggestions 178 to move the user to the room closer to exit(s) out of the building. In some implementations, the computing system can generate a suggestion to move the user to any room that is closer to an exit out of the building. In some implementations, the computing system can generate a suggestion to move the user to a particular room closest to a particular exit out of the building. Similarly, if the user has an infant, the computing system can suggest to move the infant's nursery next to the user's bedroom and along an egress route out of the building. Therefore, in the event of a real-time emergency, the user can pick up the infant on the way of exiting the building, which can make it easier and faster for the user and the infant to safely egress from the building.

The egress guidance device(s) updates 180 can include different information, such as device(s) installation suggestions 182, install latest updates 184, check connectivity 186, and replace/charge power source(s) 188. The updates 180 can provide information to the user that can be helpful to ensure that the egress devices in the building are up-to-date and properly functioning.

The device(s) installation suggestions 182 can provide suggestions about where egress devices can be installed in the building. For example, the central egress computing system can identify which rooms and/or zones in the building do not currently have one or more egress devices. The computing system can then determine whether egress devices should be installed there, and if so, present such a suggestion to the user in the suggestions 182. As another example, the central egress computing system can identify and suggest which rooms and/or zones in the building should have additional egress devices installed therein. As yet another example, the computing system can identify and suggest which egress devices to upgrade and/or which models of egress devices should be installed in the building.

The install latest updates 184 can be selected by the user to install any updates to firmware, software, or processing performed by the egress devices, the central egress computing system, and/or sensors positioned throughout the building. In some implementations, the updates can be automatically installed on the devices described herein. Installing the latest updates can be beneficial to ensure that all of the devices in the building are operating effectively, efficiently, and using most recent information, training models, predictive analytics, algorithms, and data. Installing the latest updates can also be beneficial to ensure compatibility between different types of devices in the building, such as egress devices previously installed in the building, new egress devices recently installed in the building, new and old sensors, etc. As a result, the devices in the building can communicate effectively with each other and transmit information and data without facing obstacles related to incompatible data types.

The check connectivity 186 option can allow the user to test whether egress devices and/or sensors in the building are turned on and/or in communication with each other. For example, a notification can be transmitted to each of the devices and/or sensors in the building. If the devices and/or sensors receive the notification, a read receipt or similar read/timestamp can be transmitted back to the user computing device and/or the central egress computing system confirming that the devices and/or sensors are connected and in communication with each other. Checking the connectivity can be beneficial to ensure that the devices and/or sensors are properly functioning and able to communicate with each other (e.g., wired and/or wirelessly). This can be beneficial in the event that the central egress computing system or any one or more of the egress devices are taken down (e.g., disconnected) from the other devices and/or sensors.

The replace/charge power source(s) 188 can provide the user with indications when one or more of the egress devices and/or sensors may require a change in or charge of their corresponding power source(s). This information 188 can be beneficial so that the user can be aware when devices are running low on battery. Therefore, the user can replace or charge batteries of devices to ensure that such devices are operating normally in the event of a real-time emergency.

The building component(s) updates 190 can include information such as current emergency risk level 192, component(s) lifespan(s) & current status 194, structural update suggestions 196, electrical update suggestions 198, and window & door update suggestions 199. The central egress computing system can assess the current emergency risk level 192 of the building. The risk level can be based on a number of factors, including the computing system's assessment of the components and structure of the building. The computing system can determine whether the building is more prone to an emergency (e.g., fire, gas leak, etc.) based on maintenance that has been performed on the building or maintenance that has been neglected. The computing system can also determine whether the building is more prone to an emergency based on how old the building, how old the structure and other components are, and construction, updates, and/or renovation to the building. The computing system can also predict how the emergency risk level may change over time based on what improvements are made to the building and its components or structure or what improvements are not made.

The current emergency risk level 192 can be modified in real-time based on sensed conditions in the building (e.g., environment). As an example, if the building had a fire that caused structural damage, the structural damage can be assessed by the computing system. The computing system can assess structural damage using any one or more of the AI, ML modeling, and/or predictive analytics techniques described throughout this disclosure. As a non-limiting example, the computing system can receive images of the building structure. Using those images, the computing system can generate a 3D point cloud of the building. The computing system can then identify damage in the 3D point cloud, a gravity of the damage, and also a confidence value associated with the identified damage. The computing system can adjust the current emergency risk level based on the assessment of the structural damage. In this example, when structural damage results from the fire, the current emergency risk level 192 likely can increase. This is because the structure of the building has been compromised, thereby making the building more vulnerable to other emergencies or disastrous situations.

The component(s) lifespan(s) & current status 194 can indicate an age of components in the building. Example components can include but are not limited to sprinkler systems, fire detectors, smoke detectors, carbon monoxide detectors, security systems, electrical wiring, plumbing, and other electrical or mechanical devices that can be used in the building. The computing system can determine how long certain components can last before they should be replaced. The lifespan of components can differ based on the quality of the components, how they were installed, when they were installed, whether they malfunctioned at any time since installation, whether they have been modified or updated since installation, whether they have been compromised or affected by any emergencies that have occurred in the building, whether the components comply with safety, fire, and/or electrical compliance standards, whether the components are not compatible with other components in the building (e.g., sensors, egress devices, etc.), etc. The current status of the components can indicate whether the components are reaching the end of their lifespan, whether a warranty is ending or has ended for the components, whether routine maintenance and/or updates should be performed on the components, etc.

The structural update suggestions 196 can provide recommendations to the user, builders, home developers, or other relevant stakeholders about how the structure of the building can be improved to make the building safer and less prone to emergencies. The suggestions 196 can be generated by the central egress computing system and based on information such as real-time sensed conditions in the building, the current emergency risk level 192, and/or the component(s) lifespan(s) & current status 194.

The electrical update suggestions 198 can similarly provide recommendations to the user, builders, home developers, or other relevant stakeholders about how electrical components and wiring in the building can be improved to make the building safer and less prone to emergencies. The suggestions 198 can be generated by the central egress computing system and based on information such as real-time sensed conditions in the building, the current emergency risk level 192, and/or the component(s) lifespan(s) & current status 194.

The window & door update suggestions 199 can similarly provide recommendations to the user, builders, home developers, or other relevant stakeholders about how windows and/or doors in the building can be improved to make the building safer and less prone to emergencies. The suggestions 199 can be generated by the central egress computing system and based on information such as real-time sensed conditions in the building, the current emergency risk level 192, and/or the component(s) lifespan(s) & current status 194. As an example, the suggestions 199 can recommend doors and/or windows that are easier to open to allow for quicker egress during an emergency. The suggestions 199 can also recommend doors that can be more resistant to fire and/or doors that can act as some sort of deterrent or barrier to a spreading fire, spreading smoke, or other gases. The suggestions 199 can also recommend which doors and/or windows should be replaced in the building.

Figure 3:
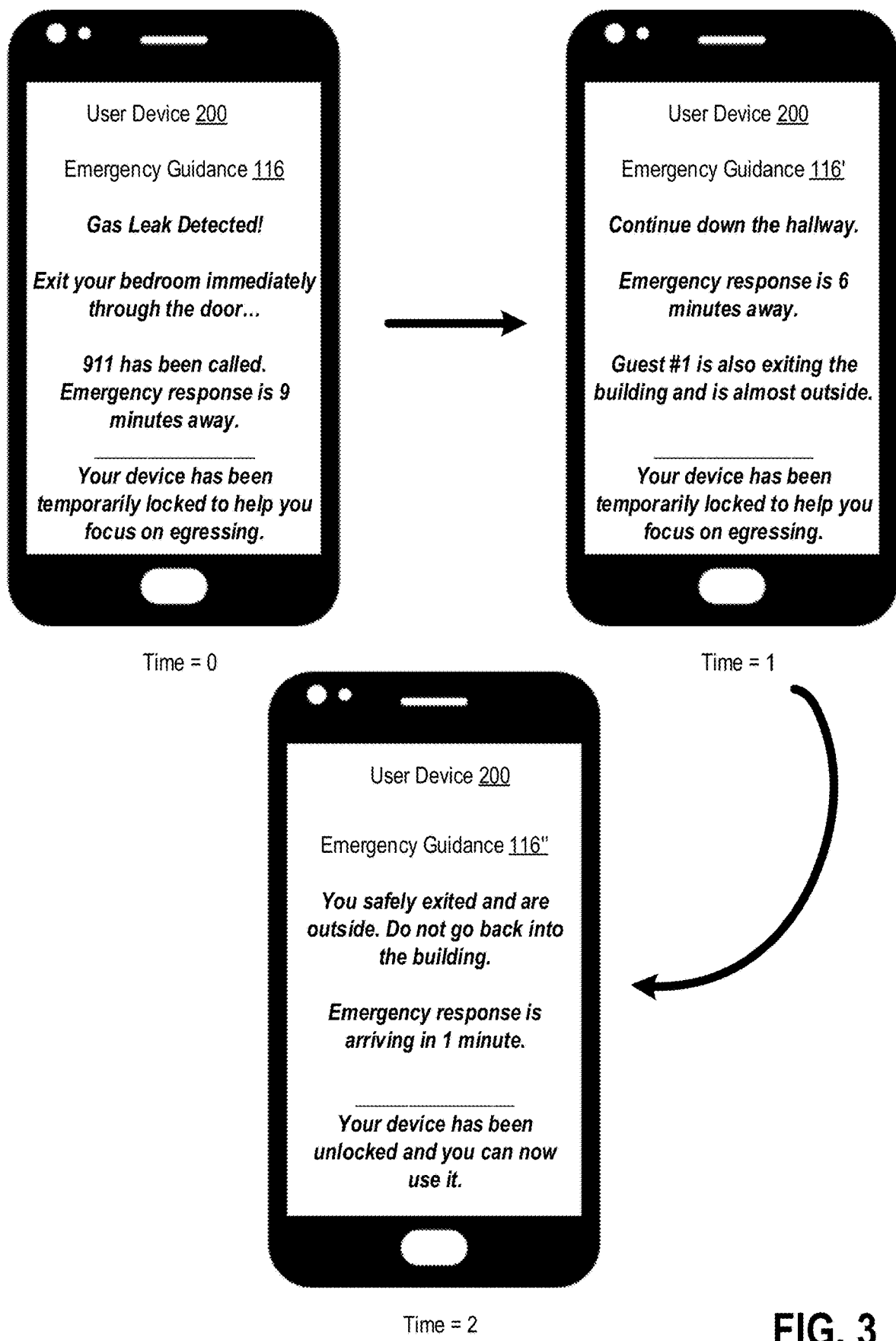
FIG. 3 is a GUI display of emergency guidance during an emergency in the building.

FIG. 3 is a GUI display of emergency guidance 116 during an emergency in the building. As described throughout this disclosure, when an emergency is detected in the building, a user device 200 can output egress instructions to the user. The output can be the emergency guidance 116 in the mobile application 101 (e.g., refer to FIG. 2A). Moreover, as described herein, when the emergency guidance 116 launches on the user device 200, features of the user device 200 can be temporarily locked or deactivated. In other words, the user may not be able to leave a screen depicting the emergency guidance 116. The user may not be able to close out of the application 101, shut down the user device 200, make a phone call, send a text, or open other applications on the device 200. As a result, the user can focus on following the instructions to safely egress during the emergency.

At time=0, the emergency can be detected in the building. The emergency guidance 116 can be automatically launched on a display of the user device 200. The example guidance 116 can say, "Gas leak detected! Exit your bedroom immediately through the door . . . . 911 has been called. Emergency response is 9 minutes away. Your device has been temporarily locked to help you focus on egressing." The guidance 116 can include short and concise sentences so that the user does not have to spend time reading the guidance 116 instead of egressing. The guidance 116 can indicate that the emergency has been detected. The guidance 116 can provide the user with step-by-step instructions to egress from the user's current location. As described herein, the central egress computing system can determine how much information to provide to the user in the instructions based on the user profile, how the user performed in the emergency simulation games 106, and how the system predicts that the user will respond to the particular detected emergency. The guidance 116 can also indicate that emergency personnel have been notified about the emergency. Therefore, the user does not have to worry about calling 911 and reporting the emergency. The user can focus on quickly, safely, and calmly exiting the building. Moreover, the guidance 116 can remind the user that their device 200 is temporarily locked while the user is exiting the building.

At time=1, the emergency guidance 116' can be updated based on sensed, real-time conditions in the building. For example, the guidance 116' can indicate new egress instructions and/or updates about other users in the building and emergency personnel. The guidance 116' can be dynamically modified in real-time based on movement detected in the building by sensors and/or egress devices positioned therein. The guidance 116' can also be dynamically modified in real-time based on location information and other information received from the user device 200. In the example in FIG. 3, at time=1, the emergency guidance 116' says, "Continue down the hallway. Emergency response is 6 minutes away. Guest #1 is also exiting the building and is almost outside." The guidance 116' can also continue to remind the user that their device 200 is temporarily locked.

Modifications to the guidance 116, 116' can be continuously made whenever changes to the environment or changes in the user movement are detected. As a result, the user can receive a continuous stream of instructions and updates at their device 200 as they are moving in the building. In some implementations, since the central egress computing system can be trained on information and data about the user, the computing system can predict how quickly the user will complete certain steps in the egress guidance 116 and the computing system can predict where the user will be in the building at a certain time. The computing system can then provide instructions and/or updates to the user in advance of, or before, the user reaches certain locations or points in the building or along the egress route. In such situations, the user can receive dynamic advisement associated with future instructions while the user is completing instructions associated with a current location of the user.

Still referring to FIG. 3, at time=2, the emergency guidance 116" can be updated based on sensed, real-time conditions in the building and/or location information associated with the user and the user device 200. For example, the guidance 116" can be updated to reflect a current location of the user and updates on other users in the house and the emergency personnel.

In this example, at time=2, the guidance 116" says, "You safely exited and are outside. Do not go back into the building. Emergency response is arriving in 1 minute. Your device has been unlocked and you can now use it." The user has safely exited the building. The central egress computing system can determine how far away the user is from the building. If the distance between a current location of the user and the building exceeds a threshold range, the computing system can determine that the user is safe. The computing system can also determine that the user can now use the device 200. In other words, the user can close out of the egress guidance 116", close out of the application 101, make a phone call, send a text message, use other applications, and/or shut off the device 200.

In some implementations, the central egress computing system can continue to train on data received about the user while the user was following the egress guidance 116, 116' and 116" during the emergency. The computing system can, subsequently, update the user profile, modify egress plans for the user, generate suggestions to help the user in safely egressing during potential future emergencies, and/or generate simulation games that are based on the user performance during the real-time emergency. The computing system can continuously improve its algorithms, methods, and techniques to better predict and address emergency situations in the building.

FIG. 4 is a conceptual diagram of real-time egress plan generation in a building 300. The example building 300 includes rooms 306A-C. Room 306A has egress device 308A, room 306B has egress device 308B, and room 306C has egress device 308C. Moreover, room 306A has a door 310, which can be an entrance to the building 300.

At time=0, user 302 is currently in room 306B. User 304 is entering the building 300 via the door 310. The egress device 308B senses presence of the user 302 (A). As described throughout sensors, such as motion detection sensors, can identify movement indicative of the user 302. The egress device 308B can also include cameras or other imaging devices that can be configured to capture image and/or video data of the room 306B. The egress device 308B can perform image analysis techniques to identify the user 302. In some implementations, the egress device 308B can be in communication with camera or other imaging devices that are already configured in the building. The egress device 308B can also be in communication with other sensors (e.g., temperature, humidity, motion detection, smoke, fire, etc.) that are already configured in the building 300.

At time=0, the egress device 308B can generate egress plan(s) from a current location of the user 302 (B). Thus, once the device 308B recognizes that the user 302 is present, the device 308B can dynamically generate, in real-time, an egress plan for the user 302 from the room 306B. In the event of an emergency, the egress plan can be outputted to the user 302 to guide the user 302 out of the building 300.

At time=0, the egress device 308A can detect the new user 304 (C). The device 308A can receive signals from devices outside of the building 300. For example, if the building 300 has smart security technology to monitor or track users who approach the building 300, the device 308A can receive signals from that smart security technology indicating presence of the user 304. The device 308A can also be in communication with other devices and/or sensors near the door 310 and entrance to the building 300 to identify the presence of the user 304. In some implementations, the device 308A may detect the presence of the user 304 once the user 304 enters through the door 310 and is in the room 306A. Regardless of whether the device 308A detects the user 304 while the user 304 is outside the building 300, entering the building 300 through the door 310, or already inside the room 306A, the device 308A can generate egress plan(s) for the user 304 from the user 304's current location (D).

At time=1, the user 304 has moved from the room 306A into the room 306B. The egress device 308B in room 306B can identify that both the users 302 and 304 are currently present in the room 306B (E). The egress device 308B can then update the egress plans for each of the users 302 and 304 from their current locations in the room 306B (F). In this example, since the user 302 has not moved from the room 306B, egress plans associated with that user may not have to be updated. With regards to the user 304, the egress device 308B can receive the egress plans that were generated for the user 304 by the egress device 308A. The egress device 308B can then update the received egress plans based on the user 304's current location in the room 306B.

At time=2, the users 302 and 304 are still in the room 306B. A fire has begun in the room 306C. The egress device 308C can detect the emergency (G). The egress device 308C can then activate (H). For example, the egress device 308C can emit sounds, visuals, and/or light signals that can indicate that the emergency was detected. The egress device 308C can also notify other egress devices in the building 300 (e.g., the devices 308A and 308B) about the emergency.

Each of the devices 308A and 308B can receive the notification from the egress device 308C (J). The egress device 308B can determine whether users are detected in the room 306B (K). Upon detecting presence of the users 302 and 304, the egress device 308B can activate (L). Activating the egress device 308B can include emitting sounds, visuals, and/or light signals that indicate an emergency was detected in the building 300 and the users must exit immediately. The egress device 308B can also output the updated egress plans for the users 302 and 304 (M). In this example, since both the users 302 and 304 are in the same room 306B, the egress device 308B can output one egress plan that both the users 302 and 304 can use to egress from the room 306B.

As shown in FIG. 4, the egress device 308A can also optionally receive the notification (J), detect whether users are present (K), activate the device 308A (L), and/or output egress plans (M). One or more of the items J-M may not be performed by the egress device 308A depending on whether users are in fact detected in the room 306A. For example, in some implementations, the egress device 308C may only notify egress devices where users are presently detected (I). As another example, in some implementations, the egress device 308A may receive the notification (J), but upon determining that no users are detected in the room 306(A), the device 308A can remain deactivated. In some implementations, the device 308A can then activate (K) once, for example, the users 302 and 304 follow the egress plan and move room 306B into the room 306A to exit the building 300 through the door 310. Then, the device 308A can output instructions in the egress plan that direct the users from the room 306A out through the door 310.

Still referring to FIG. 4, each of the devices 308A-C can simultaneously detect users and generate egress plans for each of the detected users in real time. The devices 308A-C can also share or transmit the generated egress plans with each of the devices 308A-C. Thus, when a user moves from one location to the next, an egress device proximate to the new location of the user can update the received egress pan(s) for that user to reflect an egress route from the new location of the user. Therefore, each egress device may not have to generate new egress plans every time that the user moves from one location to the next in the building. This can be advantageous to reduce processing power required at the egress devices to generate egress plans because only the egress devices necessary to inform the user nearby can operate to generate and/or update egress plans for the user. As a result, the egress devices can more quickly update egress plans using the available computing power at the egress devices. This can also be advantageous to reduce an amount of temporary storage/memory/RAM at each of the egress devices that may be used to temporarily store egress plans. For example, when the user is detected to have moved from a first room to a second room, an egress device in the first room can transmit the egress plan(s) generated for that user to an egress device in the second room. The egress device in the first room can therefore free up temporary storage/memory/RAM because that device is no longer storing the egress plan(s) for that user. That egress device can now have storage space available to generate and temporarily store new egress plans.

In some implementations, the egress devices described herein can provide a security feature for buildings. The devices can be configured to identify whether a user enters the building through an appropriate entrance, such as a door. If the user enters through the door, the egress devices can determine that the user is likely an authorized users, even if the user remains only temporarily inside the building. If, on the other hand, the egress devices identify that the user is entering the building through a window, then the devices can determine that the user is likely an unauthorized user, such as a burglar. Upon making such a determination, the devices can automatically transmit a notification to users inside the building and/or emergency personnel.

For example, the egress devices can transmit a text message or other notification to devices of one or more users in the building, notifying the users that there likely is a burglar entering the building. The text message or other notification can also provide suggestions for how the users in the building can and/or should respond to the burglar (e.g., how to exit the building, how to stop the burglar, etc.). A notification can also be sent to a local police station or other burglar watch services near the building. In some implementations, the egress devices can also emit sounds and/or light signals near a window or other entrance where the unauthorized user was detected. This can be done to scare the burglar or otherwise dissuade them from entering the building.

In some implementations, users of the building can provide information to the egress devices about who are considered authorized users in the building. For example, the users can upload images of authorized users in the user profiles. The egress devices can be trained on, using AI and/or ML modeling, such images so that the devices can identify authorized and unauthorized users. Therefore, if an unauthorized user is detected inside or around the building, whether or not the unauthorized user enters the building through an entrance such as a window, the egress devices can perform the security feature(s) described above.

The security feature described above can be advantageous to protect the building, users within the building, and personal property of the users inside the building. This security feature can also be advantageous to protect the building when users of the building are not present (e.g., the users go away on vacation or leave for the day to go to work).

Figure 5A:
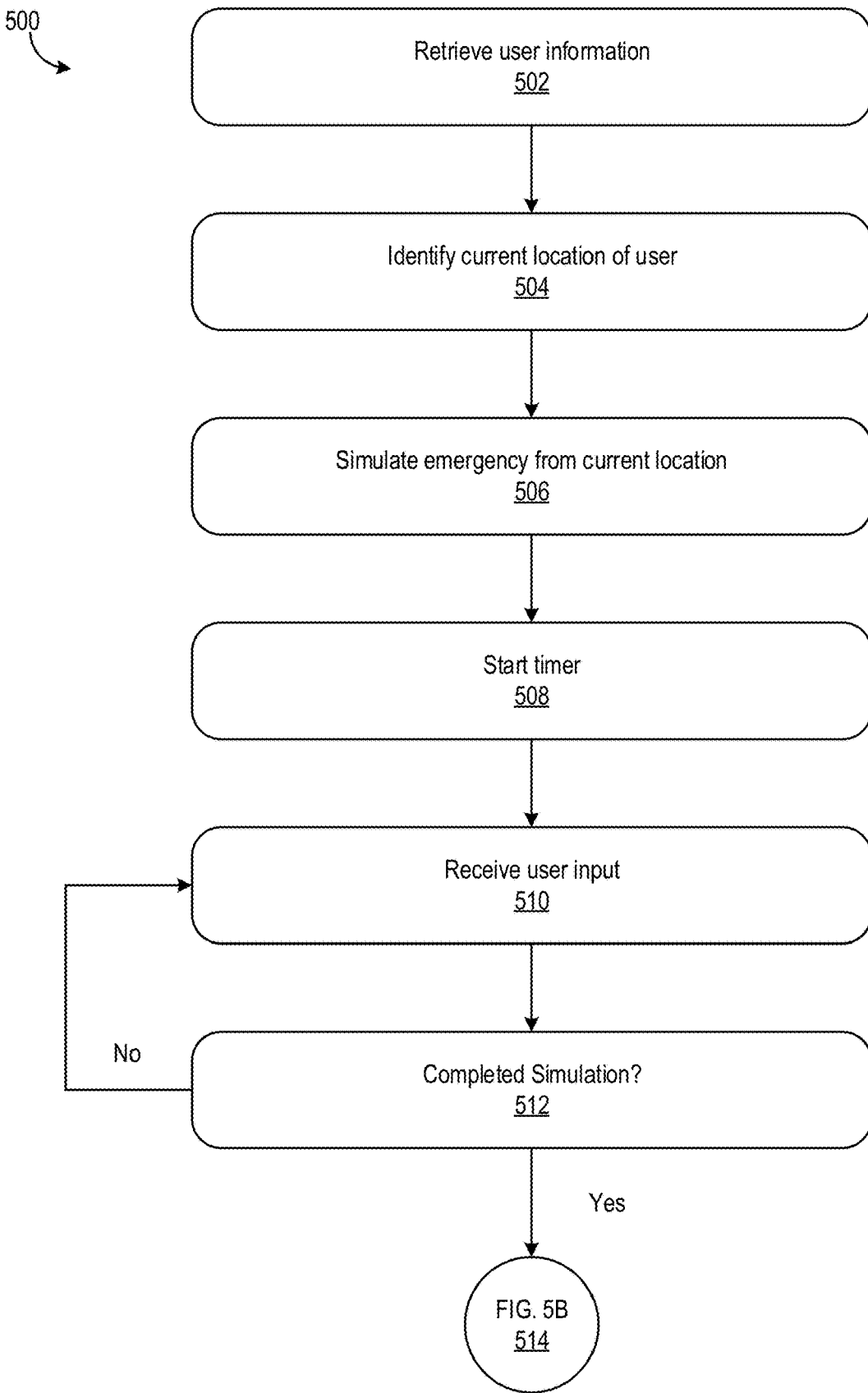
FIGS. 5A-B is a flowchart of a process for generating the emergency training simulation game of FIGS. 2D-F.
Figure 5B:
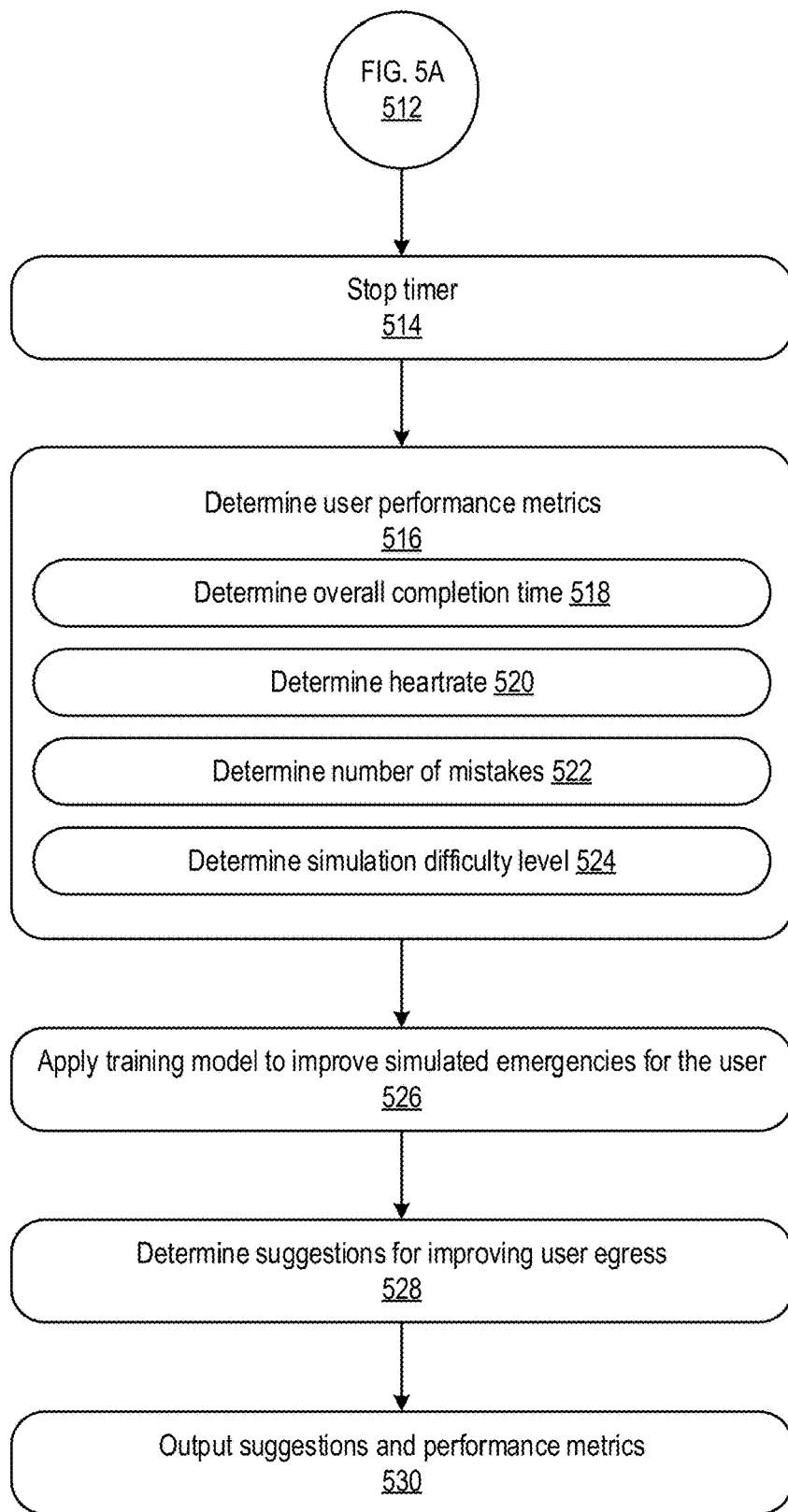

FIGS. 5A-B is a flowchart of a process 500 for generating the emergency training simulation game 106 of FIGS. 2D-F. The process 500 can be performed by a central egress computing system as described herein. One or more blocks in the process 500 can also be performed by any one or more of the egress devices, user computing device, or other computing systems described herein. For simplicity and by way of example, the process 500 is described as being performed by the central egress computing system.

Referring to the process 500 in both FIGS. 5A-B, the central egress computing system can retrieve user information in 502. The user information can include a user profile, as described herein, and/or sensed information about the user in the building. The computing system can identify a current location of the user in 504. The computing system can, for example, receive location, motion detection, or other sensed information about the user from sensors and/or egress devices positioned throughout the building. Using the user information and the current location of the user, the computing system can simulate an emergency from the current location in 506. Simulating the emergency can include generating a 3D version of the building and the current location of the user and presenting this version of the building to the user at the user's computing device.

Once the emergency is simulated and presented to the user at the user computing device, the computing system can start a timer in 508. The timer can run for as long as it takes the user to complete the simulated emergency/complete the game 106. In some implementations, the timer can count down. In other words, the computing system can predict how long it should take the user to complete the simulation. The timer can then be set to the predicted amount of time to complete the simulation and when the timer starts in 508, the time can be counted down to 0:00. The timer can stop once the simulation game ends. In some implementations, the timer can continue to run even when the user pauses to think about how to egress or the user is trying to avoid a certain situation or the user is waiting for rescue. The timer can also continue while the user stops to think about a next move.

The computing system can receive user input in 510. The user input can represent the user moving through the simulated 3D version of the building at the user computing device. For example, as described above, the user input can include slide or swipe movements on a touchscreen, pressing of keys on a keyboard, movement of a joystick, motion using AR/VR devices, etc.

The computing system can determine whether the user completed the simulation in 512. Making this determination can include translating the received user input into performance data about the user. For example, the computing system can translate the user input into corresponding movements in the 3D version of the building. The computing system can then determine where in the 3D version of the building the user is moving and/or currently located, whether the user movements correspond to or align with egress instructions that are presented to the user in the simulation, and whether the user moved from inside the 3D version of the building to an area outside of the 3D version of the building (which can indicate that the user completed the simulation and egressed from the 3D version of the building). The computing system can also determine that the user completed the simulation based on the user reaching a desired exit, achieving one or more present missions or goals in the game, and/or simply running out of time (e.g., failing a goal of the game).

If the computing system determines that the user has not completed the simulation in 512, the computing system can return to block 510 and continue to receive user input until the user completes the simulation. In fact, the computing system can continuously receive user input (510) as the user plays the game.

In some implementations, the computing system can dynamically change the simulated emergency based on the received user input. For example, if the computing system determines that the user is completing the simulation in less time than the computing system predicted it would take the user, the computing system can determine that the simulation is too easy. The computing system can dynamically update the simulation by adding one or more obstacles in the 3D version of the building along the egress route of the user and/or cause the simulated emergency to spread faster and closer towards the user in the 3D version of the building. Such dynamic changes can be presented to the user at the user computing device while the user is playing the game. The computing system can continue to receive user input in 510 and then determine whether the user has completed the simulation in 512.

If the computing system determines that the user completed the simulation in 512, then the computing system can stop the timer in 514. Stopping the timer can indicate that the user finished playing the game. Where the timer is a countdown timer/clock, the timer can be automatically stopped in 514, even if the user has not completed the simulation (512). This can indicate that the user did not complete the simulation and was too slow in egressing from the 3D version of the building.

The computing system can determine user performance metrics in 516. In some implementations, the computing system can determine these metrics while the user is playing the simulation game. In some implementations, the computing system can determine these metrics after the user completes the simulation game. The computing system can determine an overall completion time in 518. If the overall completion time exceeds a threshold range, the computing system can determine that the user needs more practice and/or is not comfortable with egressing during the simulated emergency. If the overall completion time is less than the threshold range, the computing system can determine that the user is comfortable with egressing. As a result, the computing system can generate more complex simulated emergency scenarios. The computing system can also create shorter timeframes or countdowns for the user to complete subsequent simulated emergencies. The threshold range can be a prediction made by the computing system indicating how long the computing system expects the user to take to complete the simulated emergency. The threshold range can be determined by converting or translating a predicted amount of time that it would take the user in real life to egress during a real-time emergency into a simulated gaming environment time period.

The computing system can also determine an average heartrate of the user during the simulation in 520. As described above, the computing system can receive biometric data from one or more sensors (e.g., wearable devices, the user computing device, biometric sensors, etc.) while the user is playing the game. The computing system can determine the user's average heartrate. The computing system can also classify the user's heartrate using a classification scheme with AI and/or ML algorithms, techniques, and/or methods. The computing system can associate the user's average heartrate with a comfort level or ease in ability of the user to complete the simulation. For example, if the average heartrate is above a threshold range that the computing system predicted the user's heartrate should be in, the computing system can determine that the user performed poorly in the simulated emergency. The computing system can determine that the user is uncomfortable with the egress instructions or otherwise needs more practice in the same or similar emergency simulations. As another example, if the average heartrate is below the threshold range, the computing system can determine that the user was comfortable in the simulated emergency and that the simulated emergency was not challenging. As a result, the computing system can generate more complex and/or challenging emergency simulations for subsequent games.

The computing system can determine a number of mistakes that the user made in 522. For example, the computing system can compare received user input to the egress instructions that were presented to the user during the game. If the user input does not correspond with the egress instructions, then the computing system can determine that the user made a mistake. The computing system can create a count or tally of how many times the received user input deviated from the egress instructions. If, for example, the mistakes count exceeds a threshold range, the computing system can determine that the user needs more practice and/or does not follow instructions well. The computing system can determine what modifications can be made to the instructions so that the user can more easily follow the instructions. If the mistakes count is below the threshold range, then the computing system can determine that the user is good at following instructions and subsequent egress instructions may not have to be changed or modified.

The computing system can also determine a simulation difficulty level in 524. The difficulty level can be determined based on analyzing, combining, and/or aggregating the determinations made in 516-522. Based on the determined simulation difficulty, the computing system can predict how the user would perform during a real-time emergency like the simulated emergency. The computing system can also determine what adjustments to make to subsequent simulated emergencies that the user may play. For example, if the difficulty level is low or easy, the computing system can generate more complex and challenging simulations for subsequent games. If the difficulty is high or hard, the computing system can generate less complex or challenging simulations. However, in some implementations, if the difficulty level is high but the user performed well (e.g., the user's average heartrate was low, the user made a minimal number of mistakes or no mistakes, the user's overall completion time was low, etc.), then the computing system can continue to generate similarly difficult simulations and/or more difficult simulations.

Moreover, the determinations made in 518-524 can be combined and/or aggregated by the computing system to determine an overall performance of the user (516).

The computing system can feed the performance metrics into an ML training model for the user in 526. Using the training model, the computing system can improve emergencies that it simulates for the particular user, as described herein.

The computing system can also determine suggestions for improving user egress in 528. The suggestions can include tips for completing the simulation games, such as following instructions, taking deep breaths, and/or remaining calm. The suggestions can also include tips for responding to an emergency in real life, in real-time. The suggestions can be specific to real-time emergencies that are similar to the simulated emergency in the game. The suggestions can also be more generalized and relating to different types of real-time emergencies.

The computing system can output, at the user computing device, the suggestions and performance metrics in 530. As described above, the user can then choose to play the same simulation again and/or play another simulation, both of which can result in the process 500 being repeated. Although not depicted, the computing system can also store the suggestions and performance metrics in a remote data store. The suggestions and performance metrics can then be used as historic data inputs into the training model for the user. Therefore, the computing system can continuously learn on the user's performance in the simulated games over time to generate improved egress plans, suggestions, and simulated emergencies for the particular user.

Figure 6A:
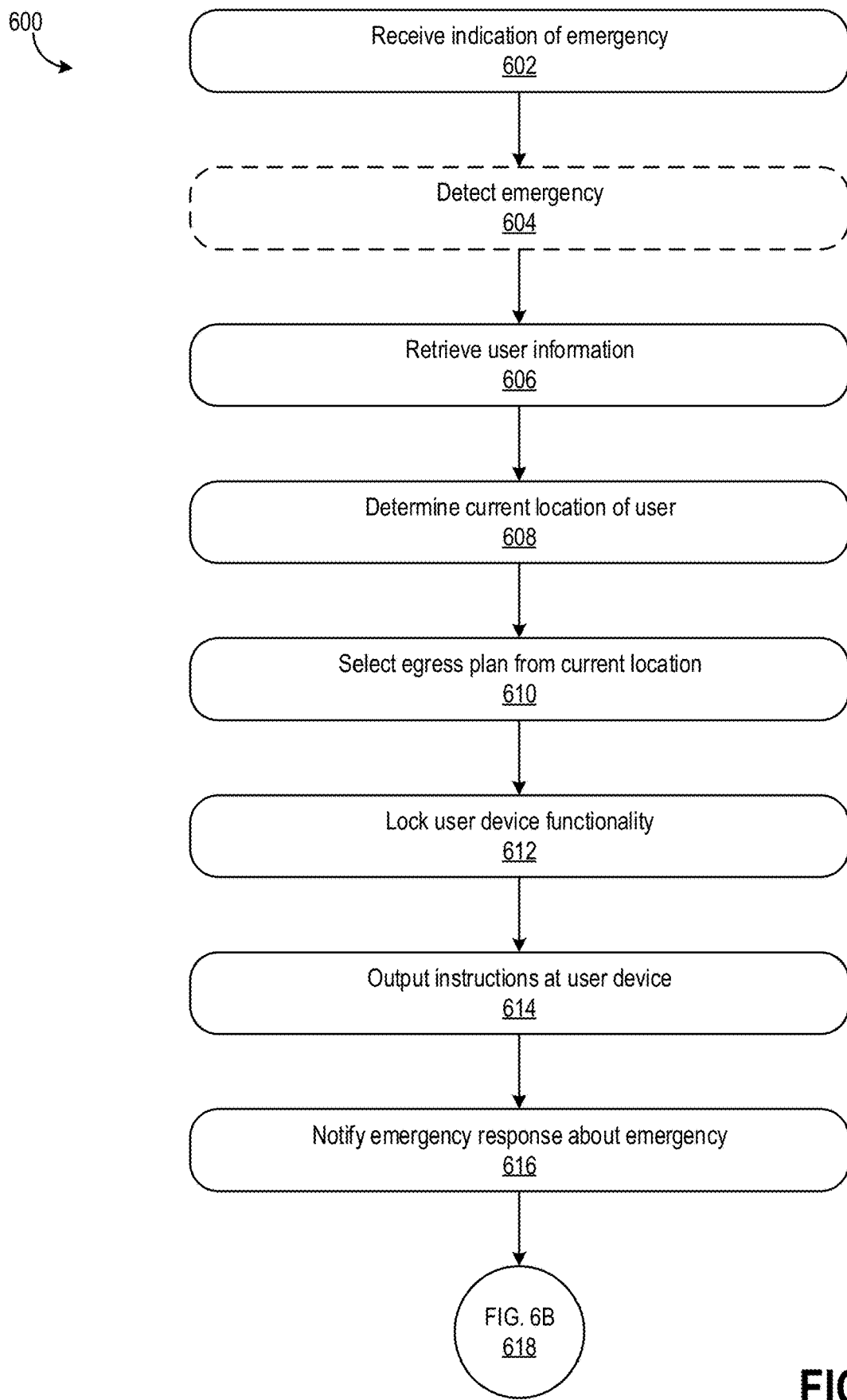
FIGS. 6A-B is a flowchart of a process for providing emergency guidance to a user computing device during a real-time emergency.
Figure 6B:
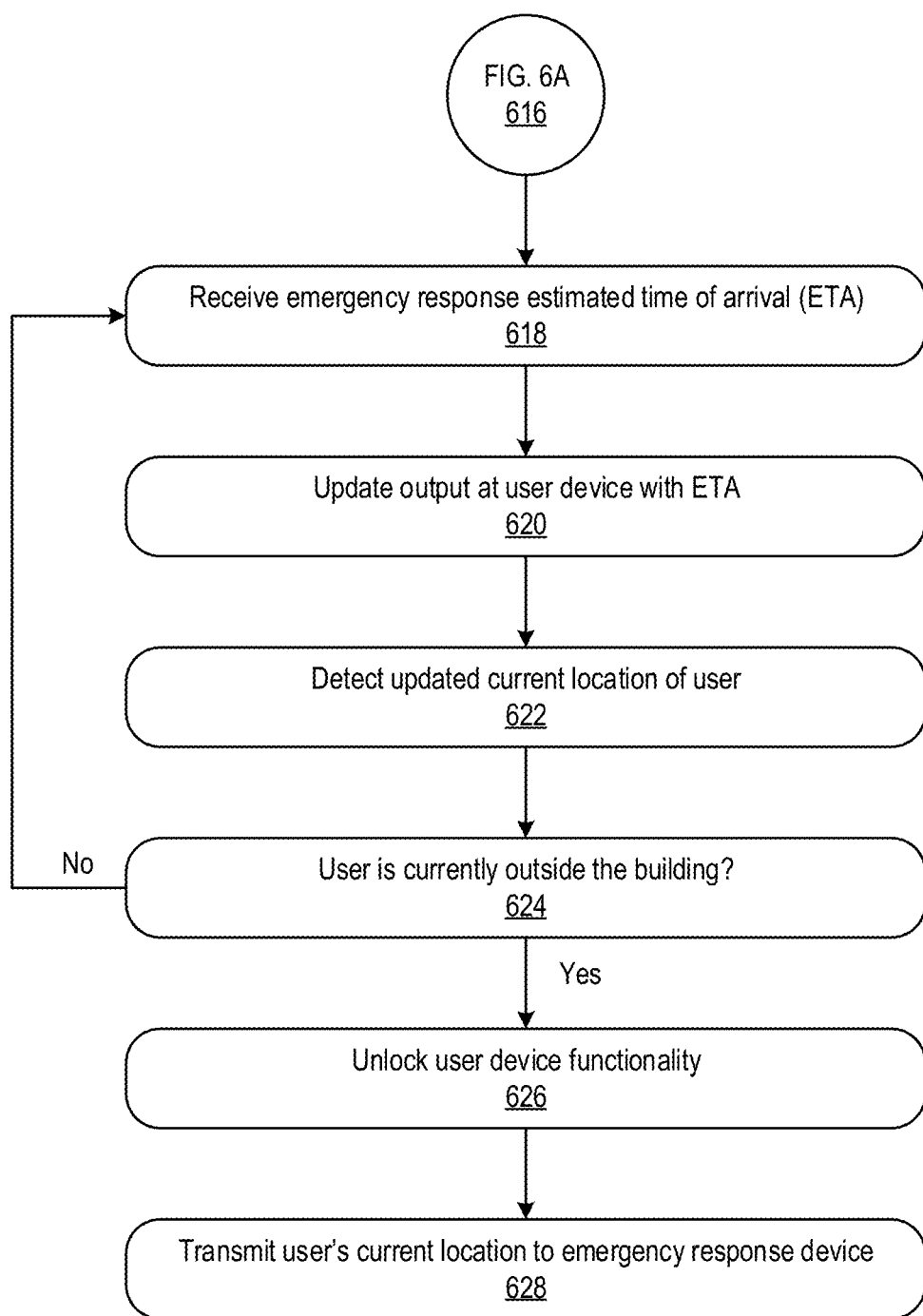

FIGS. 6A-B is a flowchart of a process 600 for providing emergency guidance to a user computing device during a real-time emergency. The process 600 can be performed by a central egress computing system as described herein. One or more blocks in the process 600 can also be performed by any one or more of the egress devices, user computing device, or other computing systems described herein. For simplicity and by way of example, the process 600 is described as being performed by the central egress computing system.

Referring to the process 600 in both FIGS. 6A-B, the central egress computing system can receive an indication of an emergency in 602. As mentioned throughout this disclosure, the indication of the emergency can be received from one or more sensors or egress devices that are positioned throughout the building. The indication of the emergency can include information about a location of the emergency and a type of emergency.

The computing system can optionally detect the emergency in 604. For example, if the computing system is one of the egress devices in the building, then the computing system can identify that the emergency occurred in the building. As another example, the computing system can receive information such as image and/or video data from sensors and/or egress devices in the building and perform image analysis techniques to determine whether an emergency (e.g., fire) is present in the building. Thus, the sensors and/or the egress devices in the building may not automatically detect that an emergency exists. Instead, the sensors and/or egress devices can transmit information/data to the computing system which the computing system can use to determine whether in fact there is an emergency in the building. In some implementations, the computing system can perform block 604 before 602. In some implementations, the computing system can perform block 604 instead of block 602.

The computing system can retrieve user information in 606. As described above, the user information can be profiles associated with users in the building. The user information can also include motion detection information or other sensed information about the user in the building.

The computing system can determine a current location of the user in 608. As described throughout, the computing system can receive motion detection information or other data from the sensors and/or egress devices in the building. This information can indicate movement and/or location of the user. The computing system can use this information to identify which room or zone the user is currently located in relative to a location of the detected emergency. In some implementations, block 608 can be performed before block 606. For example, the computing system can first determine where the user or user(s) are located in the building. Then, the computing system can retrieve user information for only the user(s) detected in the building. This can be advantageous to more efficiently use computing and processing power at the computing system. The computing system can more quickly identify users in the building and information associated with such users.

The computing system can select an egress plan from the current location in 610. For example, the computing system can access egress plans that were generated by the egress devices (or the central egress computing system) for each of the identified users or user in the building. The computing system can then select one of those egress plans that begins in the identified current location of the users or user. In some implementations, the computing system can also generate an egress plan in real-time from the identified current location and based on the current location of the user and information associated with the user.

The computing system can also lock functionality of the user's computing device in 612. Once the egress plan is selected or generated for the user, the computing system can temporarily deactivate features on the user's computing device. As described herein, this can include preventing the user computing device from making phone calls, sending texts, shutting off, opening different mobile applications, and/or exiting out of or closing egress guidance.

The computing system can output egress instructions at the user computing device in 614. The egress instructions can be presented to the user in such a way that the user cannot turn off the egress instructions. As a result, the user can be required to focus on the egress instructions and following the instructions to safely egress from the user's current location.

The computing system can notify emergency response about the emergency in 616. The computing system can send a notification about the emergency and the current location of the user to devices of the emergency response. The notification can include a type of emergency, where the emergency is located in the building, and a predicted spread of the emergency. The notification can also include predicted damage to components or structure of the building, predicted entrances and exits in the building that can be used by the emergency response team, selected egress plan(s) for the users in the building, and predicted amounts of time that it may take each of the users to exit from the building.

The computing system can instruct one or more of the egress devices within the building to send the notification to the emergency response. In some implementations, the computing system can also instruct the user's computing device to send the notification.

Sometimes, block 616 can be performed simultaneously with 612 and/or 614. In some implementations, block 616 can be performed before one or more other blocks. For example, the computing system can notify the emergency response as soon as the emergency is detected in 602 and/or 604.

The computing system can receive an emergency response estimated time of arrival (ETA) in 618. Once the emergency response receives the notification from the computing system in 618, the emergency response can determine how long it may take them to arrive at the building. This ETA can be transmitted to the computing system, the user's computing device, and one or more of the egress devices in the building. The ETA can be updated in real-time based on location information that can be transmitted from the device(s) of the emergency response to the computing system.

In some implementations, the device(s) of the emergency response team can transmit a notification receipt to the computing system. The notification receipt can indicate that the emergency response team are preparing to leave and/or are en route to the building. The computing system can receive additional information from the device(s) of the emergency response, such as current location information. Using the additional information, the computing system can determine the ETA of the emergency response team.

The computing system can update output at the user computing device with the emergency response ETA in 620. For example, the egress instructions can include the emergency response ETA. The ETA can be dynamically updated in real-time and presented to the user at the user computing device. In some implementations, the computing system can update the output at the user computing device to indicate that the emergency response has been notified and that they are on their way. The computing system may then provide no more additional updates about the emergency response ETA.

The computing system can also detect an updated current location of the user in 622. The computing system can receive real-time motion detection information from the sensors and/or egress devices inside the building. Using this information, the computing system can determine where the user is located relative to the emergency, how much the user has moved from their prior location, and whether the user may require different egress instructions. The computing system can also continuously monitor movement of the user to better provide step-by-step egress guidance and/or updates to the emergency response.

The computing system can determine whether the user is currently outside the building in 624. For example, the computing system can determine whether the current location of the user (622) is located outside of the building. The computing system can also determine whether the current location is a certain distance away from the building. If the user is not outside the building, then blocks 618-624 can be repeated until the user is detected to be outside the building. As mentioned above, the computing system can optionally dynamically modify the egress instructions presented to the user based on the current location of the user.

If the user is determined to be outside the building, then the computing system can unlock functionality on the user computing device in 626. In other words, the user is temporarily safe from the emergency in the building. Egress instructions may no longer be presented at the user computing device. The user can now use the features of their device, such as making a phone call, sending a text message, opening other mobile applications, etc.

The computing system can also transmit the user's current location to device(s) of the emergency response in 628. Therefore, the emergency response can be notified that the user is outside of the building. The emergency response may not have to enter the building to rescue or assist the user. In some implementations, the computing system can also transmit the user's current location to the device(s) of the emergency response throughout the process 600. For example, every time that the computing system detects a new location of the user, the computing system can transmit that location information to the device(s) of the emergency response. As a result, the emergency response can continuously monitor movement of the user(s) in real-time. This information can be beneficial to assist emergency response in planning how to assist the user(s) to egress from the building.

Figure 7A:
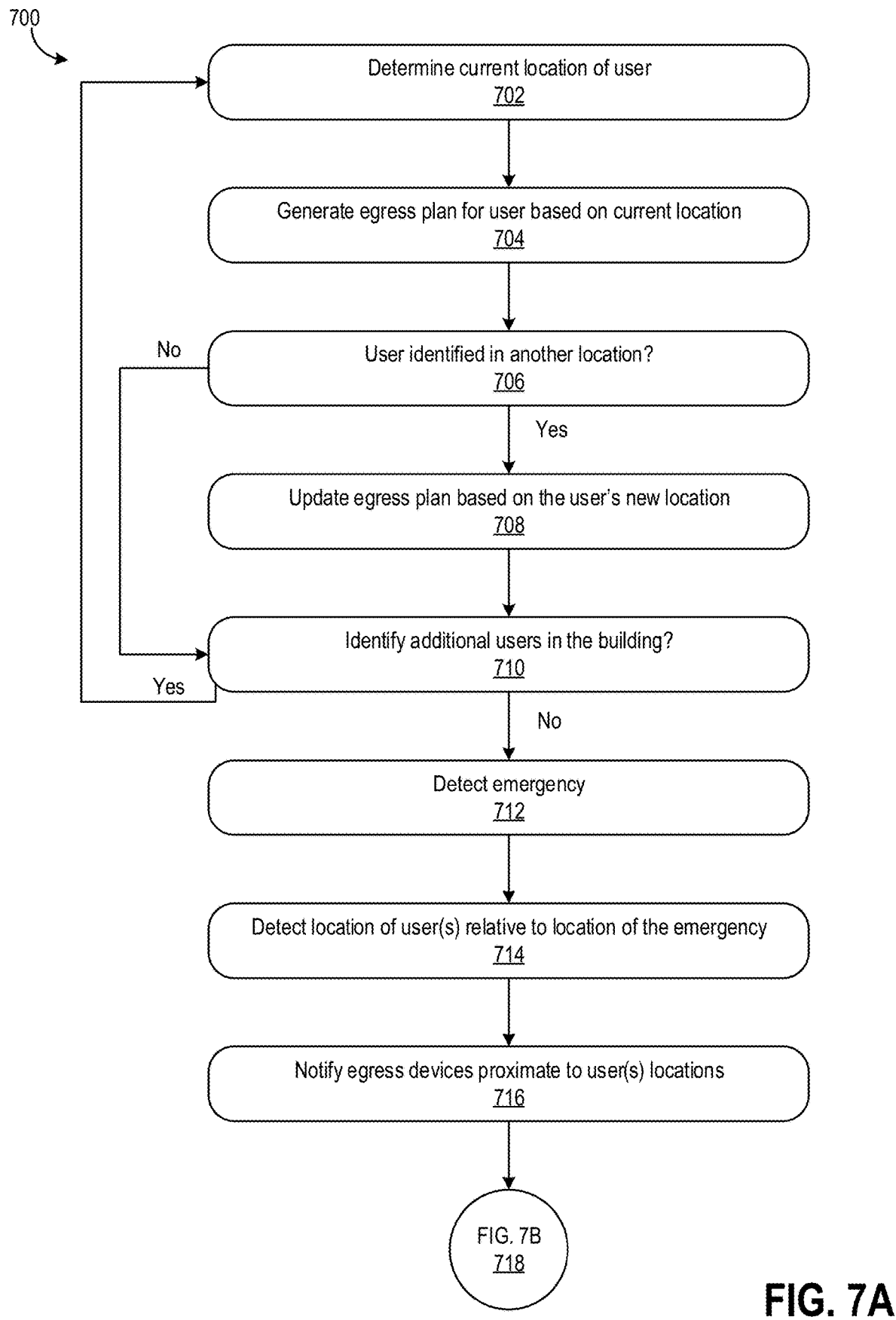
FIGS. 7A-B is a flowchart of a process for generating real-time egress plans, as described in reference to FIG. 4.
Figure 7B:
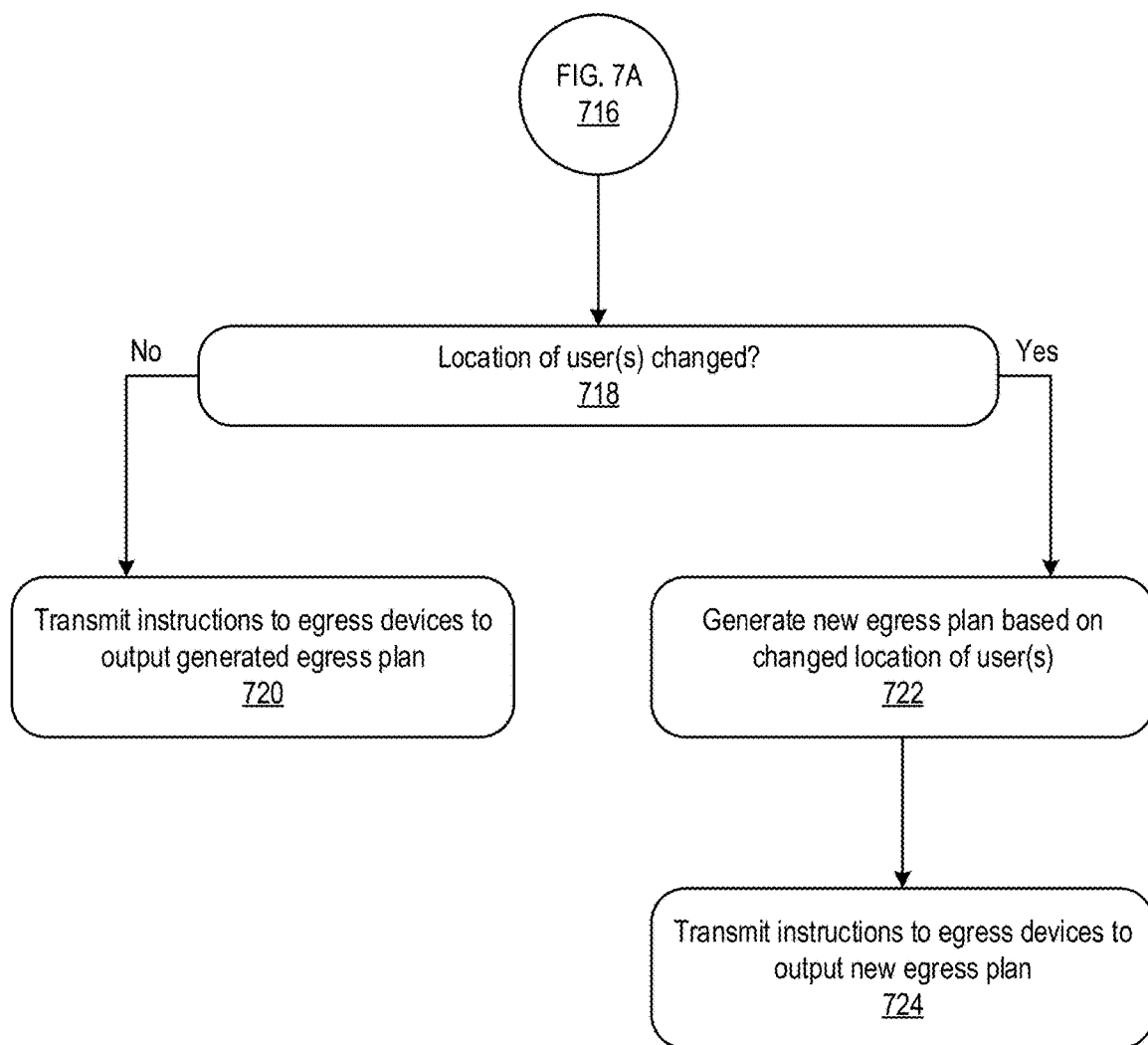

FIGS. 7A-B is a flowchart of a process 700 for generating real-time egress plans, as described in reference to FIG. 4. The process 700 can be performed by a central egress computing system as described herein. One or more blocks in the process 700 can also be performed by any one or more of the egress devices, user computing device, or other computing systems described herein. For simplicity and by way of example, the process 700 is described as being performed by one of the egress devices in the building.

Referring to the process 700 in both FIGS. 7A-B, blocks 702-710 can be performed before an emergency is detected in the building. Blocks 712-724 can be performed once an emergency is detected. In some implementations, blocks 702-710 can also be performed in real-time in response to an emergency being detected.

In 702, the egress device can determine a current location of the user using the techniques described herein. The egress device can generate an egress plan for the user based on the current location of the user in 704, also using the techniques described throughout this disclosure. The egress device can determine whether the user is identified in another location in 706. For example, the egress device can receive an indication of user movement from one or more sensors or other egress devices positioned in the building. If the user is not identified in another location (e.g., the egress device determines that the user is still proximate to the location of the egress device), then the egress device can perform block 710, described below. If the user is identified in another location, then the egress device can update the egress plan for the user based on the user's new location in 708. In some implementations, as described herein, the egress device can transmit the egress plan that was generated in 704 to another egress device that is proximate to the new location of the user. The egress device that is proximate to the new location of the user can then update the egress plan based on the user's new location in 708.

Next, in 710, the egress device can identify whether there are additional users in the building. If additional users are detected using the techniques described herein, then blocks 702-710 can be repeated for each of the additional users. In other words, egress plans can be dynamically generated and updated in real-time based on current locations of the additional users. In some implementations, the blocks 702-710 can be simultaneously performed for each user in the building. For example, one or more egress devices can generate and update egress plans for the users in the building at a same time.

If no additional users are identified in the building in 710, the egress device can detect an emergency in the building in 712, as described throughout this disclosure. The egress device can also detect current locations of the user(s) in the building relative to a location of the emergency in 712. The techniques described throughout this disclosure can be implemented to perform block 714.

The egress device can notify egress devices proximate to the user(s) locations in 716. In other words, the egress device may only notify egress devices that are closest to the current locations of users in the building. The egress device can send a notification that the emergency was detected. The notification can include location information about the emergency. The notification can also include instructions that instruct the egress devices to output an emergency signal to the users. For example, the egress devices can be instructed to emit a visual, audio, or light signal that can indicate to the users that the emergency was detected.

The egress device can also determine whether the location of the users changed in 718. If the location of the users did not change, then the egress device can instruct the other egress devices proximate to the users' locations to output the generated egress plan for each of the respective users in 720.

If the location of any of the users did change, then the egress device can generate a new egress plan for each of the users whose location changed (722). The new egress plan can be based on the changed location of the user. In some implementations, the egress device can transmit instructions to the egress device proximate to the changed location of the user, wherein such instructions instruct the egress device proximate to the user to generate a new egress plan for that user.

In 724, the egress device can transmit instructions to the egress devices proximate to the changed location(s) of the user(s) that instruct such egress devices to output the new egress plan(s). In scenarios where the egress devices proximate to the changed locations of the users generate the new egress plans, such egress devices can automatically output the new egress plans without receiving instructions from the egress device.

Figure 8:
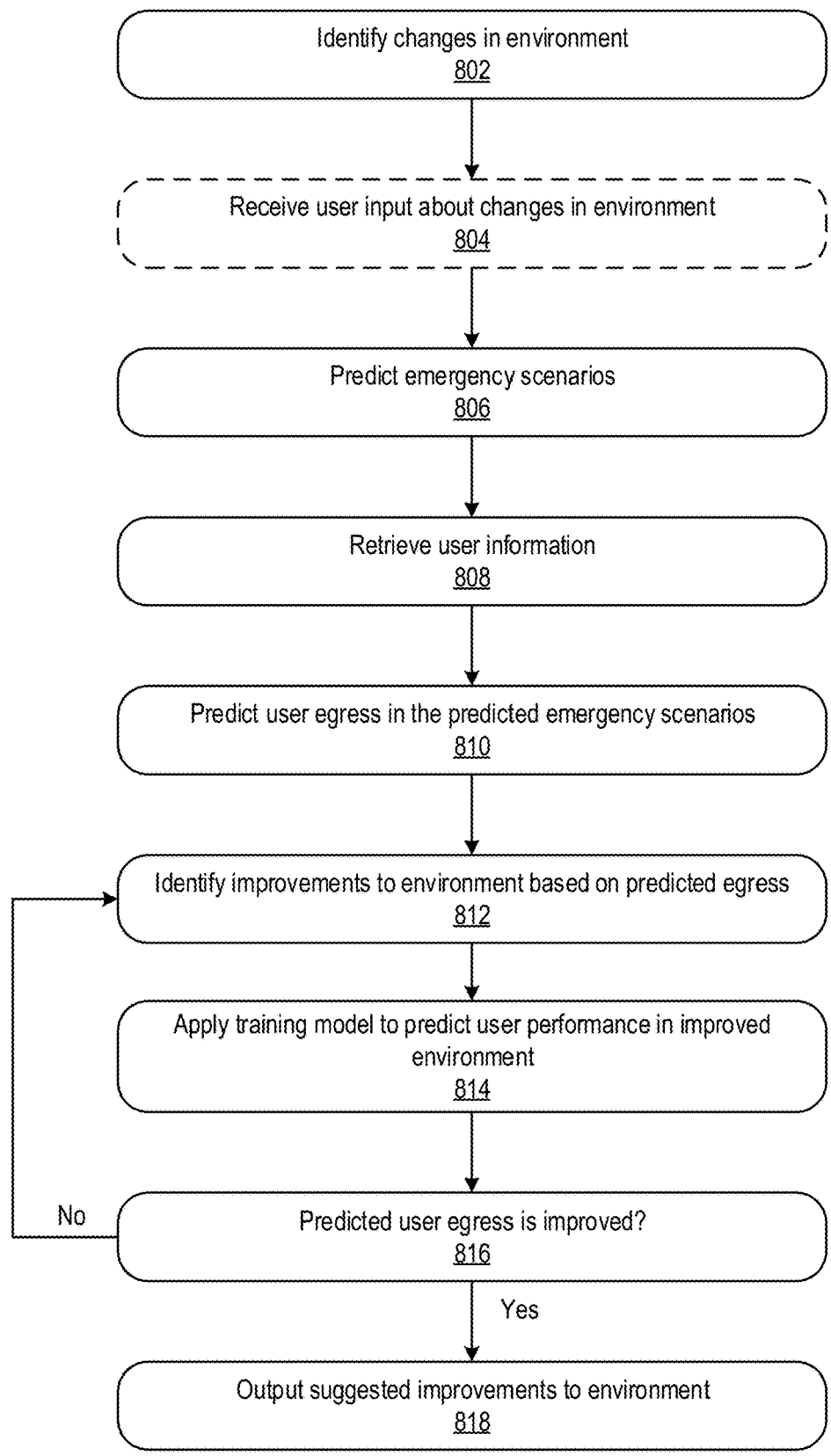
FIG. 8 is a flowchart of a process for determining building improvement suggestions, as described in reference to FIG. 2G.

FIG. 8 is a flowchart of a process 800 for determining building improvement suggestions, as described in reference to FIG. 2G. The process 800 can be performed by a central egress computing system as described herein. One or more blocks in the process 800 can also be performed by any one or more of the egress devices, user computing device, or other computing systems described herein. For simplicity and by way of example, the process 800 is described as being performed by the central egress computing system.

In 802, the central egress computing system can identify changes in an environment of the building. As described throughout this disclosure, these changes can include new users entering the building, users exiting the building, changes in furniture layout, changes in room layout, construction, renovation, installation of new components, maintenance to existing components, changes to the building's structure, damage caused by previous emergencies, changes in egress devices, sensors, and/or other safety technology in the building, etc. The changes in the environment can be detected by sensors and/or egress devices positioned throughout the building. The detected changes can then be transmitted to the computing system, which can identify what types of changes have been detected.

The computing system can alternatively or additionally receive user input about changes made to the environment in 804. For example, the input can be received in the mobile application 101 described herein. The input can also be received from other devices, systems, data stores, and/or applications in communication with the central egress computing system. The input can be received from a building resident. The input can also be received from a construction worker, home or building developer, electrician, plumber, or other technician or relevant stakeholder.

The computing system can predict emergency scenarios in 806. Based on the identified changes in the environment and/or the user input about changes in the environment, the computing system can determine what type of emergencies may occur in the building. The computing system can employ predictive analytics, AI, and/or ML algorithms and methods to determine a likelihood that certain emergencies may arise in the building. For example, if the computing system identifies that one or more egress devices do not function properly because their power sources have not been upgraded, replaced, or charged, the computing system can determine that should an emergency occur, there may be more chaos in egressing. As another example, if the computing system identifies that a piece of furniture has been moved to a new location that blocks a central egress route, then during an emergency, it can be more likely that users may egress more slowly from the building. As yet another example, if the computing system identifies that the electrical wiring has not been updated or checked over an extended period of time, the computing system can determine that the electricity is more likely to short circuit and cause an electrical fire in the building. As demonstrated herein, the computing system can predict a plurality of different types of emergency scenarios that may arise in the building.

The computing system can also retrieve user information in 808, as described throughout this disclosure. Using the user information, the computing system can predict how each user may egress in the predicted emergency scenarios (810). The computing system can assess whether each user's egress would be significantly altered in the predicted emergency scenarios.

Accordingly, the computing system can identify improvements that can be made to the environment in 812. For example, if a user's egress is significantly slowed down by placement of furniture along the user's egress route, then the computing system can determine that the furniture should be moved to a different location. As another example, if an egress device has no battery and the egress device is likely one that would be used in the predicted emergency scenarios, the computing system can generate a suggestion that the battery in the egress device be replaced. Without this egress device functioning properly, users in the building may not be appropriately instructed on how to exit the building calmly, quickly, and safely. On the other hand, if the egress device is not functioning but is located in a zone or room that has a functioning egress device, then the computing system may not generate a suggestion instructing the users in the building to immediately change or replace the battery in the egress device.

Once the computing system identifies improvements that can be made to the environment, the computing system can apply a training model to predict whether user performance would improve in the predicted egress scenarios when the improvements are implemented in the environment (814). In other words, the computing system can determine whether replacing the battery in the egress device described above would actually help the user quickly, safely, and calmly egress from the building. As another example, the computing system can determine whether moving furniture out of a particular egress route would actually affect users' ability to quickly and safely egress from the building.

The computing system can determine whether the predicted user egress would improve in 816. If the predicted user egress would not improve, the blocks 812-816 can be repeated. For example, the computing system can identify other improvements that can be made to the environment and apply the training model to determine whether these other improvements would affect or improve user egress. In some implementations, the computing system may not repeat blocks 812-816. Instead, the process 800 can stop once the computing system identifies that the improvements may not improve the users' predicted egress. In some implementations, the computing system may not repeat blocks 812-816 because there may be no additional improvements that can be made to the building. Thus, the process 800 may stop.

If the predicted user egress would improve, then the computing system can output the suggested improvements to the environment in 818. As described throughout, the suggested improvements can be outputted in the mobile application 101. The suggested improvements can be outputted to one or more devices or relevant stakeholders. For example, if the suggested improvements pertain to updating the building's structure or changing electrical components, the suggested improvements can be transmitted to devices of relevant construction workers and/or electricians.

In some implementations, the computing system can output an importance associated with implementing the suggested improvements. For example, changing a battery of an egress device that is likely not going to be used during an emergency can be a lower priority improvement. Changing electrical wiring to avoid an electrical fire can be deemed a more important improvement to make. The more important or higher priority improvements can be outputted first to devices of the relevant stakeholders. For example, a highest priority improvement, which can reduce risk of an emergency occurring in the building, can be immediately outputted to the devices of the relevant stakeholders. Lower priority improvements can be outputted to the devices of the relevant stakeholders at later times, such as when the high priority improvements are implemented. In some implementations, all the suggested improvements can be outputted to the devices of the relevant stakeholders. The improvements can be sorted from highest priority to lowest priority, which can assist the relevant stakeholders in assessing which improvements to implement and when to implement.

Figure 9A:
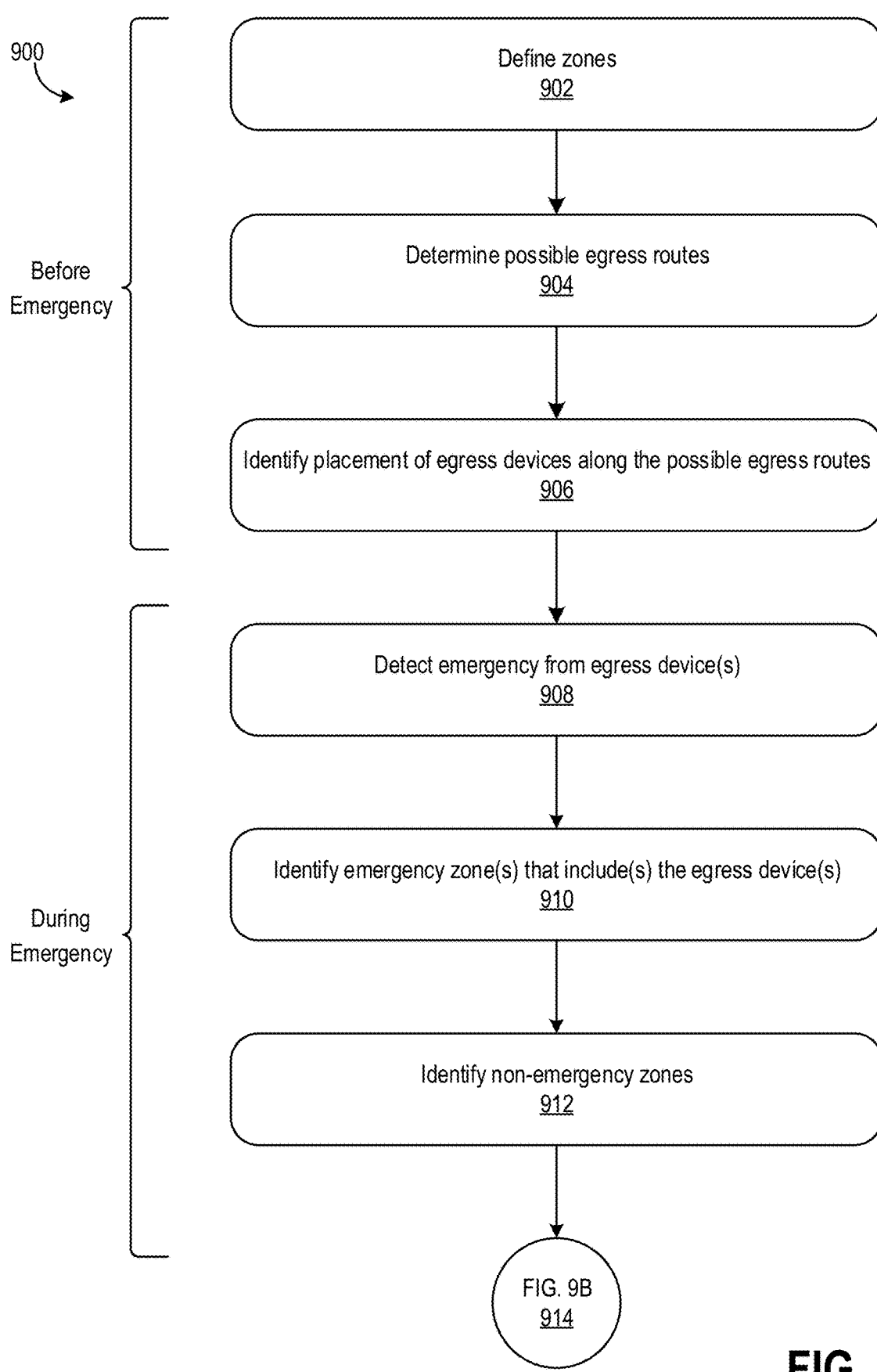
FIGS. 9A-B is a flowchart of a process for installing egress devices in zones in the building and determining egress plans from those zones.
Figure 9B:
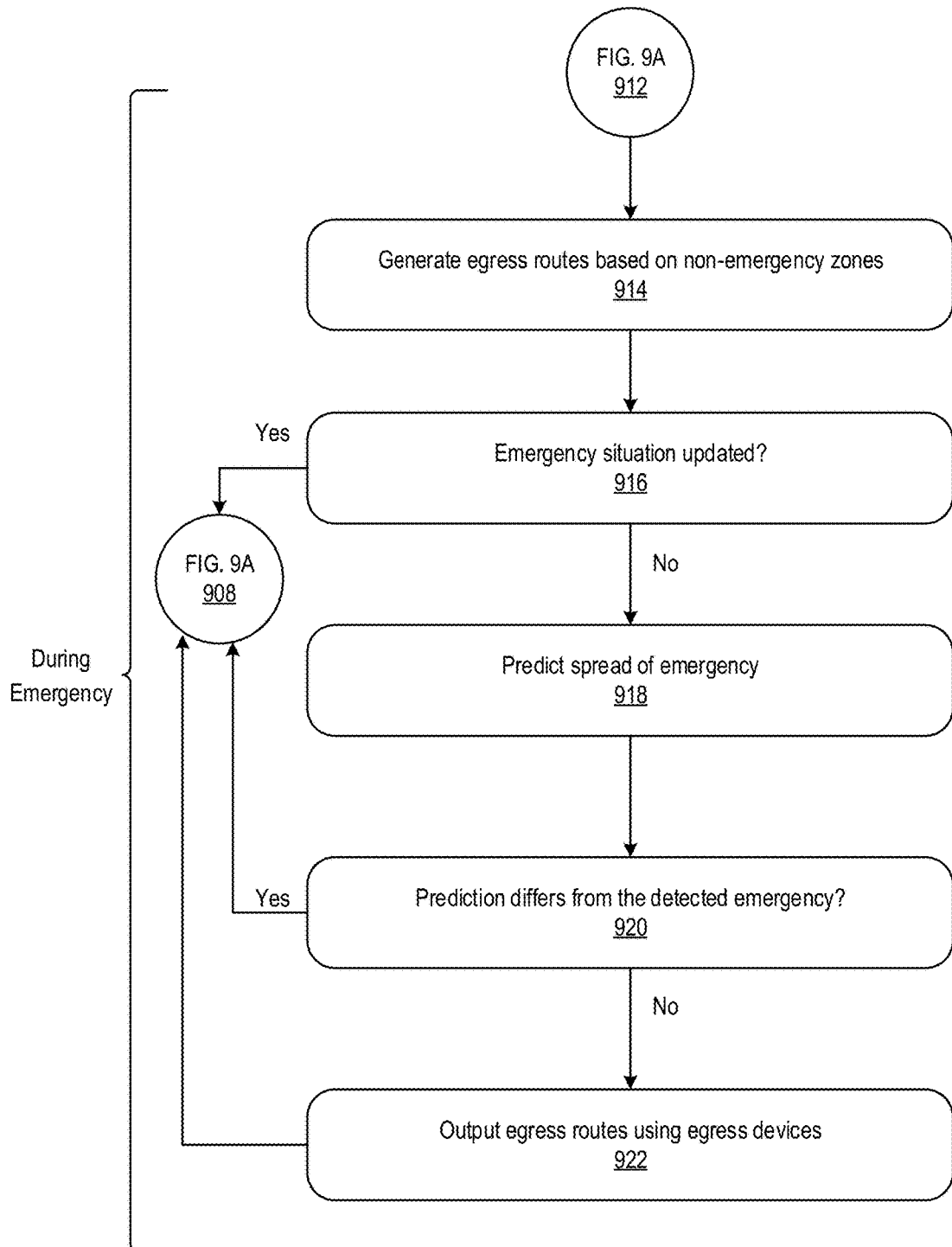

FIGS. 9A-B is a flowchart of a process 900 for installing egress devices in zones in the building and determining egress plans from those zones. Using the process 900, egress devices can be installed in preferred locations in the building so that egress instructions can be easily and directly provided to the users. In other words, egress devices can be installed along egress routes that users would take to exit the building. Egress devices that are installed in locations that are not proximate to the egress routes may not provide the most direct instructions that the users can easily follow. In fact, egress devices that are installed in locations that are farther away from egress routes can cause confusion to the users during the emergency. The process 900 can be performed by a central egress computing system as described herein. One or more blocks in the process 900 can also be performed by any one or more of the egress devices, user computing device, or other computing systems described herein. For simplicity and by way of example, the process 900 is described as being performed by the central egress computing system.

Referring to the process 900 in both FIGS. 9A-B, blocks 902-906 can be performed before an emergency. Blocks 908-922 can be performed in real-time, during an emergency. Before the emergency, the central egress computing system can define zones in the building in 902. The zones can be defined based on a layout of the building. The zones can be defined based on where possible exits exist out of the building. For examples, zones can be defined around doors, stairs, elevators, and/or windows that can be used to exit the building. In buildings with more than one story, zones may not be defined around windows since exiting through the windows can be more dangerous. Zones can also be defined based on rooms and/or units. For example, in some buildings, an apartment unit can be one zone. As another example, each room in a house or apartment can be a zone. As described herein, a zone can also include more than one room. For example, zones can be defined to include portions of multiple rooms in the building. A room can also have multiple zones defined therein.

The computing system can determine how to divide the building into different zones in a variety of ways. For example, the computing system can identify where exits are located in the building. The computing system can identify the exits based on receiving user input indicating the exits and/or receiving images or other sensory data captured by the devices and/or sensors positioned throughout the building. The computing system can then assign a zone to each of the identified exits. As another example, users can indicate preference for zone designations. For example, a user can prefer that each bedroom is a separate designated zone. The user can provide such preferences to the computing system via the mobile application described herein. The computing system can then identify or designate each bedroom as a separate zone. As another example, the computing system can use predictive analytics, AI, and/or machine learning modeling to determine optimal zones for the building. Using such techniques, the computing system can determine where users are likely to move through the building and where an emergency is likely to spread relative to locations of exits from the building. As a result, the computing system can determine optimal zones that may include one or more exits that are likely to be used by users during an emergency. In some implementations, the computing system can receive user input indicating one or more parameters for defining the zones in the building.

The computing system can determine possible egress routes from the defined zones in 904. The possible egress routes can be specific to one or more users in the building, as described throughout this disclosure. The possible egress routes can also be generic and applicable to any type of user that may be in the building. The computing system can determine and/or identify the most likely egress routes that any user would take during an emergency (e.g., exiting from a kitchen straight through a hallway to a front door, exiting from a bedroom on a second floor down a flight of stairs and straight through the hallway to the front door, etc.).

In 906, the computing system can identify placement of egress devices along the possible egress routes. In other words, the computing system can identify optimal locations to install the egress devices in the building. The egress devices can be installed along the possible egress routes that the computing system identified in 904. The computing system can also determine how many egress devices should be located per zone. For example, if one zone encompasses two rooms, the computing system can determine that one egress device should be installed in each of the two rooms. As another example, if one zone is a large open space, the computing system can determine that multiple egress devices should be installed in that zone. More particularly, the computing system can also determine how far apart the egress devices should be placed along the possible egress routes. The computing system can suggest the identified placement of egress devices to users in the building. These suggestions can be presented in the mobile application 101 described herein. The suggestions can also be presented in any other similar interface at user computing devices. The users can then place the egress devices along the possible egress routes. For example, the users can be construction workers or building developers. They can install the egress devices in a new construction before the new construction is available to users. Thus, the egress devices can be preinstalled in the buildings in preferred or optimal locations.

During the emergency, the computing system can detect the emergency from one or more of the egress devices in the building (908). The techniques described throughout this disclosure can be used to perform block 908.

The computing system can identify emergency zone(s) that include(s) the egress device(s) in 910. An egress device that identifies or detects the emergency can be in an emergency zone. An emergency zone can indicate a location in the building where the emergency is currently detected and/or predicted to spread. The emergency zone can also indicate a location in the building that users should stay away from or avoid, especially during egress from the building. The computing system can identify the emergency zones based on determining which egress devices are activated. Devices can be activated when they detect the emergency. Activated devices can transmit a notification of emergency detection to the computing system. Activated devices can also emit audio, visual, and/or light signals (e.g., a fire alarm) upon detecting the emergency. Once the computing system identifies the activated egress devices, the computing system can associate each of the activated devices with their designated zones. Egress devices and zones can be assigned unique identifiers, such as location IDs, that can be used to associate the devices with their respective zones. Thus, the computing system can retrieve the activated egress devices' unique identifiers and associate those identifiers with the respective zones to determine which zones are emergency zones.

The computing system can also identify non-emergency zones in 912. The computing system can determine which egress devices are deactivated and then identify which zones those deactivated devices are associated with. The computing system can also determine that any device that was not identified in 910 can be considered deactivated. Then the computing system can associate the deactivated devices with their corresponding zones. As another example, the computing system can determine that any zone that was not identified as an emergency zone in 910 is a non-emergency zone in 912. Identifying the non-emergency zones can be advantageous to determine which zones can be used as part of egress routes during the emergency. After all, the users should not egress through zones where the emergency is currently located or predicted to spread (e.g., the emergency zones).

Next, the computing system can generate egress routes based on the non-emergency zones in 914. In some implementations, the computing system can select the possible egress routes generated in 904 that pass through the non-emergency zones. In other implementations, the computing system can generate the egress routes using information about the users currently in the building, as described throughout this disclosure. The computing system can also select the possible egress routes generated in 904 and update or modify such routes based on information about the users currently in the building. This can be advantageous to save computing and processing power. This can also be advantageous to reduce an amount of time that may be required to generate egress routes in real-time during the emergency.

One or more of the egress routes generated in 904 may require updating or modifications based on which zones are designated as emergency versus non-emergency. For example, a route generated in 904 can now require users to egress through an emergency zone. The computing system can therefore update this egress route so that the route directs the users through a non-emergency zone rather than the emergency zone. If the route cannot be updated to direct the users through a non-emergency zone, then the computing system may generate a new egress route that avoids the emergency zone all together. In some implementations, generating the new egress route can save computing and processing power. This is because the computing system may not be required to spend time and computation resources determining whether pre-generated egress routes are still viable options for egress. Instead, the computing system can quickly generate new egress routes based on current conditions in the building during the real-time emergency.

The computing system can determine whether the emergency situation has updated in 916. The computing system can receive periodic and/or continuous updates from sensors and/or egress devices positioned throughout the building. The updates can include information such as a current spread of the emergency, an increase in levels of smoke in one or more zones or rooms, an increase in temperature in one or more zones or rooms, a new location of one or more users in the building, whether the emergency has been put out or otherwise stopped, etc.

If the emergency situation changed (e.g., updated), then blocks 908-916 can be repeated. In other words, the computing system can determine which zones should now be considered emergency zones and which ones should now be considered non-emergency zones. Once the computing system makes this determination, egress plans can be generated and/or updated/modified accordingly. So long as the emergency situation evolves in real-time, the computing system can continuously update the zone identifications and egress plans. This can be advantageous to ensure that the most up-to-date egress routes can be provided to users so that they can safely and quickly egress from the building while avoiding the emergency zones.

If the emergency situation did not change, the computing system can predict a spread of the emergency in 918. In other words, the emergency is the same as it was previously detected in 908. Therefore, the zone identifications of 908 may not need to be changed or updated. The computing system can then predict where the emergency will spread in the building, using the techniques described throughout this disclosure. The computing system can predict which zones may become emergency zones at one or more different times during the projected spread of the emergency. By predicting the spread of the emergency, the computing system can more accurately predict which zones users should avoid when egressing from the building.

The computing system can determine whether the predicted spread differs from the detected emergency in 920. The computing system can receive real-time updates of the emergency from sensors and/or egress devices positioned throughout the building. The real-time updates can indicate unexpected changes in the emergency, such as a sudden temperature increase, a window blowout, damage to building structure, a sudden and fast spread of the emergency, etc. Sometimes, these real-time updates can differ from the predicted spread. Therefore, if the prediction differs, the blocks 908-920 can be repeated. Optionally and additionally, the computing system can train, using predictive analytics, AI, and/or ML techniques, on the difference between the predicted spread and the real-time updates. Based on the training, the computing system can more accurately predict spreads during subsequent emergencies.

If the prediction does not differ from the detected emergency, then the computing system can output the egress routes using the egress devices (922). In some implementations, egress devices in emergency zones can be configured to output alerts that such zones are not part of the egress routes. The egress devices in the emergency zones can therefore notify users to stay away from such zones. If users are detected to be located within the emergency zones, the egress devices located therein can be configured to provide advisement that guides the users back to the egress routes in the non-emergency zones.

In some implementations, the computing system can also assign a confidence value to the predicted spread. The confidence value can indicate that the computing system's prediction model accurately predicted the emergency spread. Therefore, during subsequent emergencies, the computing system can use the same or similar prediction modeling to more accurately predict the spread of such emergencies. The training described herein can be advantageous to reduce prediction modeling errors as well as improve placement of egress devices and prediction of possible egress routes.

FIGS. 9C-D depict installation of egress devices in zones in the building as described in reference to FIGS. 9A-B. FIG. 9C depicts setting up zones in the building and predicting possible egress routes (e.g., refer to blocks 902-904 in FIGS. 9A-B). Time=0 can be a time before an emergency occurs in the building. As shown, there are multiple alternative exits out of the building. Some of the alternative exits can include windows. Other alternative exits can include doors. The building is divided into multiple zones A-N. As described in reference to the process 900 in FIGS. 9A-B, the zones A-N can encompass multiple rooms and/or alternative exits. In the example building layout in FIG. 9C, there are 34 zones. Some of the zones include alternative exits. Other zones may not include alternative exits. As mentioned throughout, the additional or fewer zones can be defined in the building.

Now that the zones A-N have been defined, the central egress computing system can determine possible egress routes A-N. The possible egress routes A-N can pass through multiple different zones that have been defined in the building. Multiple possible egress routes can be determined for a single alternative exit. In the example of FIG. 9C, the computing system determined 11 possible egress routes from a potential location of a user in the building. The computing system can determine additional or fewer possible egress routes from the potential location of the user in the building. The computing system can also determine possible egress routes from one or more other potential locations of users in the building.

FIG. 9D depicts installation of the egress devices along the possible egress routes (e.g., refer to block 906 in FIGS. 9A-B). In this example of the building, egress devices A-N have been installed or placed along the possible egress routes from the potential location of the user in the building. In some implementations, the central egress computing system can aggregate all possible egress routes and determine which of those possible egress routes may be more popular. The egress devices A-N can then be placed along the more popular possible egress routes. As shown in FIG. 9D, the egress devices A-N have been installed in each of the zones A-N in the building. At least one egress device is installed in each zone and proximate to or along the possible egress routes. In some implementations, one or more zones can include one or more additional egress devices.

Figure 9E:
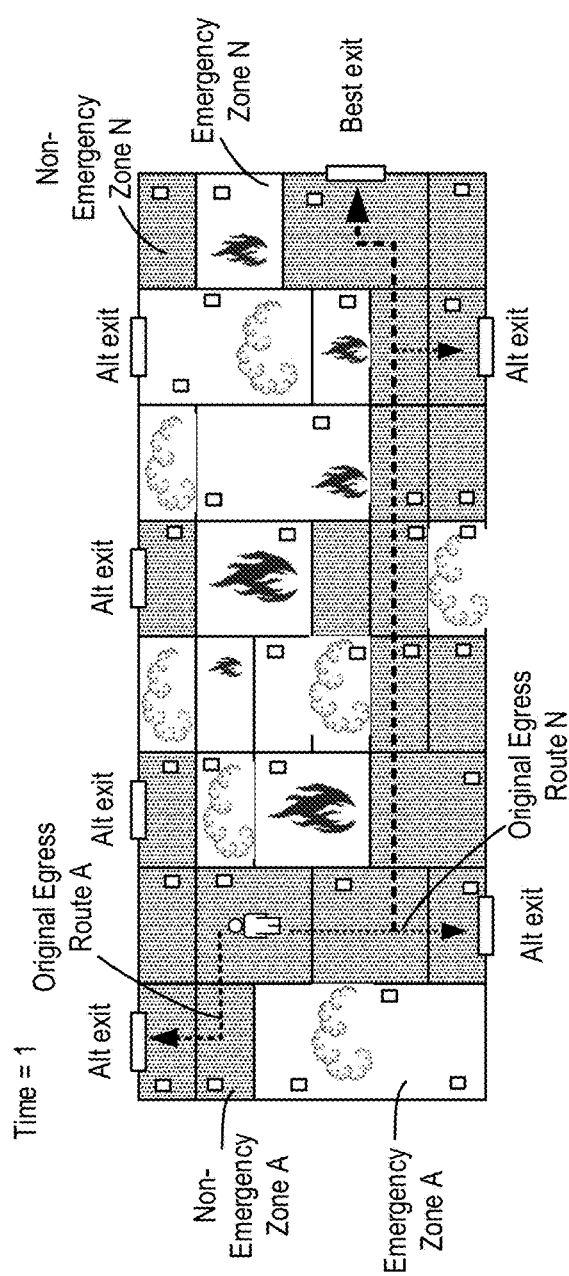
FIGS. 9E-F depict generation of egress routes from the installed egress devices as described in reference to FIGS. 9A-D.
Figure 9F:
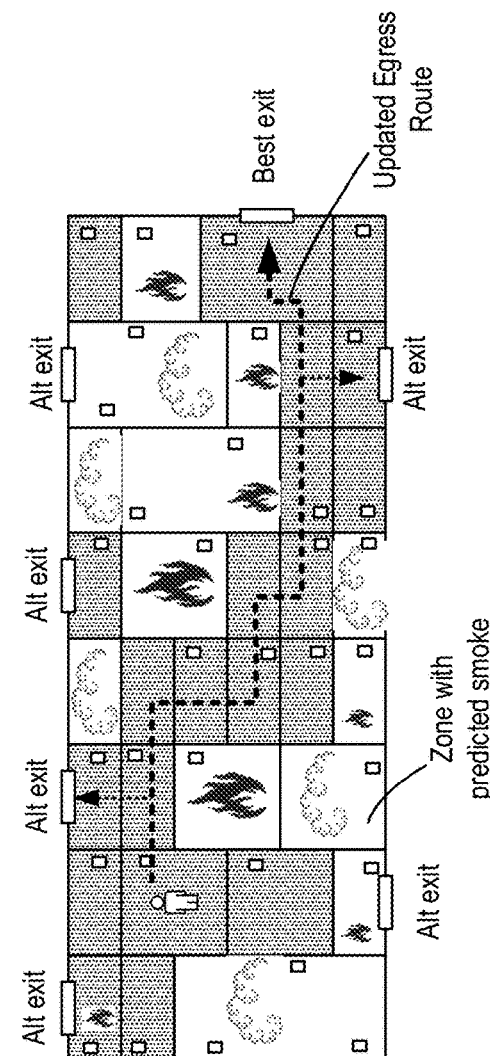

FIGS. 9E-F depict generation of egress routes from the installed egress devices as described in reference to FIGS. 9A-D. FIG. 9E depicts generation of egress routes based on zones that are designated as non-emergency zones (e.g., refer to 908-914 in FIGS. 9A-B). At time=1, an emergency can be detected in the building, as described in reference to the process 900. Zones where the emergency is detected (e.g., where egress devices are activated) can be designated as emergency zones A-N. As shown in FIG. 9E, emergency zones A-N are solid-filled zones. Zones where the emergency has not been detected (e.g., where egress devices are deactivated) can be designated as non-emergency zones A-N. As shown in FIG. 9E, non-emergency zones A-N are patterned zones. The central egress computing system can generate or select original egress routes A-N that avoid the emergency zones A-N and only go through the non-emergency zones A-N. In this example, the computing system identified 4 original egress routes A-N that the user can take from the user's current location to egress from the building. These original egress routes A-N were previously determined as shown in FIGS. 9C-D. Moreover, only one of the original egress routes A-N can be identified as the best exit out of the building during the particular emergency.

As described in reference to the process 900 in FIGS. 9A-B, the computing system can also predict where the emergency may spread over time. Based on such predictions, the computing system can update the original egress routes A-N and/or select an optimal or best egress route for the user to take. The updated egress route can direct the user through zones that likely will not be affected by the emergency.

FIG. 9F depicts generation of updated egress routes based on changes in the emergency situation (e.g., refer to 908-920 in FIGS. 9A-B). As mentioned above, the computing system can predict where the emergency may spread by or at time=2. Zones that had been identified as non-emergency zones at time=1 (e.g., refer to FIG. 9E) may now be identified as emergency zones at time=2 (e.g., refer to FIG. 9F), even if the emergency has not actually spread to those zones yet, based on predictions of where the emergency will spread. Any original egress routes A-N that would go through the zones now identified as emergency zones may not be selected for user egress. Accordingly, the computing system can update and/or select an updated egress route that the user can use to egress from the building, wherein the updated egress route instructs the user to exit through zones that are still identified as non-emergency zones. As described in reference to the process 900, prediction of the emergency's spread, identification of emergency and non-emergency zones, and updating and selection of egress routes can be continuously performed by the central egress computing system so long as changes in the emergency situation are detected.

Figure 10A:
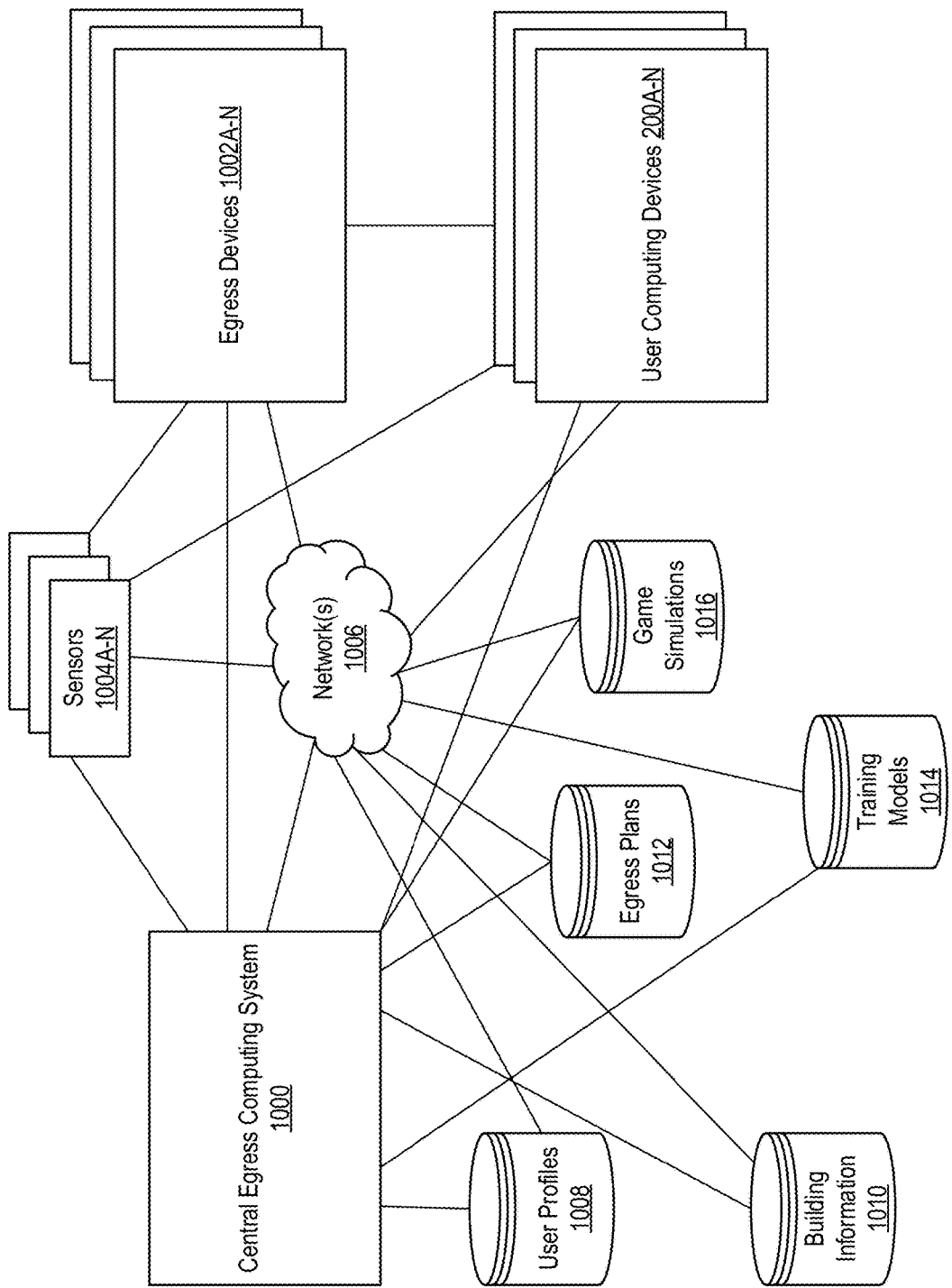
FIG. 10A is a system diagram of components used for performing the techniques described herein.

FIG. 10A is a system diagram of components used for performing the techniques described herein. A central egress computing system 1000, egress devices 1002A-N, user computing devices 200A-N, and sensors 1004A-N can be in communication (e.g., wired and/or wireless) over network(s) 1006. The central egress computing system 1000 can be remote from a building and in communication with components in the building, such as the sensors 1004A-N, egress devices 1002A-N, and user computing devices 200A-N. In some implementations, the computing system 1000 can be one of the egress devices 1002A-N and/or one of the user computing devices 200A-N. The computing system 1000 can also monitor components of different buildings, thereby performing the techniques described herein for each of the buildings that are monitored. In some implementations, the computing system 1000 can be located within the building and configured to monitor components of just that building.

As shown in FIG. 10A, the components can be in communication with each other rather than just through one component, such as the central egress computing system 1000. This mesh network can be advantageous to ensure that any of the egress devices 1002A-N, the user computing devices 200A-N, and the central egress computing system 1000 can perform the techniques, methods, and processes described throughout this disclosure.

Furthermore, the mesh network can be advantageous to ensure that if one or more of the components described herein becomes disconnected from other components, the other components can still function and communicate with each other. For example, if the central egress computing system 1000 loses communication with one or more of the components (e.g., the computing system 1000 is engulfed in flames), the other components can continue to communicate with each other, generate egress plans, transmit updates about a current emergency situation, etc. Moreover, in situations where the computing system 1000 loses communication with the other components, one of the egress devices 1002A-N and/or user computing devices 200A-N can be designated as a central hub to facilitate communication between the different components. The new central hub can be randomly designated. The new central hub can also be pre-configured to be designated as such in the event that communication is lost with the computing system 1000. One or more other components can also be pre-configured to be designated as backup central hubs. This can be advantageous to ensure that communication may be continuously maintained between the components described herein to provide seamless and real-time instructions and guidance to users during an emergency situation.

The central egress computing system 1000, egress devices 1002A-N, and user computing devices 200A-N can also be in communication via the network(s) 1006 with one or more different data stores. The data stores can include user profiles 1008, building information 1010, egress plans 1012, training models 1014, and game simulations 1016. In some implementations, one or more of the data stores described can be combined into fewer data stores.

The user profiles data store 1008 can be configured to store information associated with building users. As described throughout, information associated with full-time or frequent building users can be stored in and retrieved from the user profiles data store 1008. In some implementations, information associated with guests, infrequent users, or temporary users may not be stored in the data store 1008. In some implementations, information associated with guests, infrequent users, and temporary users can be stored in the data store 1008 for a threshold period of time. Once the threshold period of time passes, the information associated with such users can be deleted from the data store 1008.

The building information data store 1010 can store information about the building, such as the building's structure, components, most recent or latest updates, construction, or renovations, furniture layouts, room layouts, and/or floorplans. The data store 1010 can also store suggested improvements for the building and an emergency risk level for the building.

The egress plans data store 1012 can store egress plans/ routes that have been generated for the building and/or the users within the building. The data store 1012 can also store updated egress plans, suggestions for safer egress, and suggestions for improved egress plans and planning by the users. The data store 1012 can further include associations between generated egress plans and zones in the building.

The training models data store 1014 can store models and training data used by the components described herein to improve emergency prediction and egress plan generation. One or more different training models can be used. Training models having high confidence values or training models that were used to generate accurate predictions can be stored in the training models 1014 and used in subsequent training. Training models having low confidence values or training models that did not result in accurate predictions can be stored for a threshold period of time before being removed from the data store 1014. For example, if such training models are not improved during the threshold period of time, then they can be removed from the data store 1014. If such training models are improved and therefore increase accuracy in predictions, then they can be maintained in the data store 1014 and used in subsequent predictions and modeling by the components described herein.

The game simulations data store 1016 can be configured to store emergency simulation games that were generated for the users in the building. These games can be stored for a threshold period of time before being removed or deleted from the data store 1016. In some implementations, one or more of the games can be reused and/or modified for different users in the building. As a result, components such as the central egress computing system 1000 may not have to generate new emergency simulation games every time that a user at the user computing devices 200A-N chooses to play the game. This can be advantageous to save computing and processing power to more efficiently provide the users with personalized emergency simulation games.

Figure 10B:
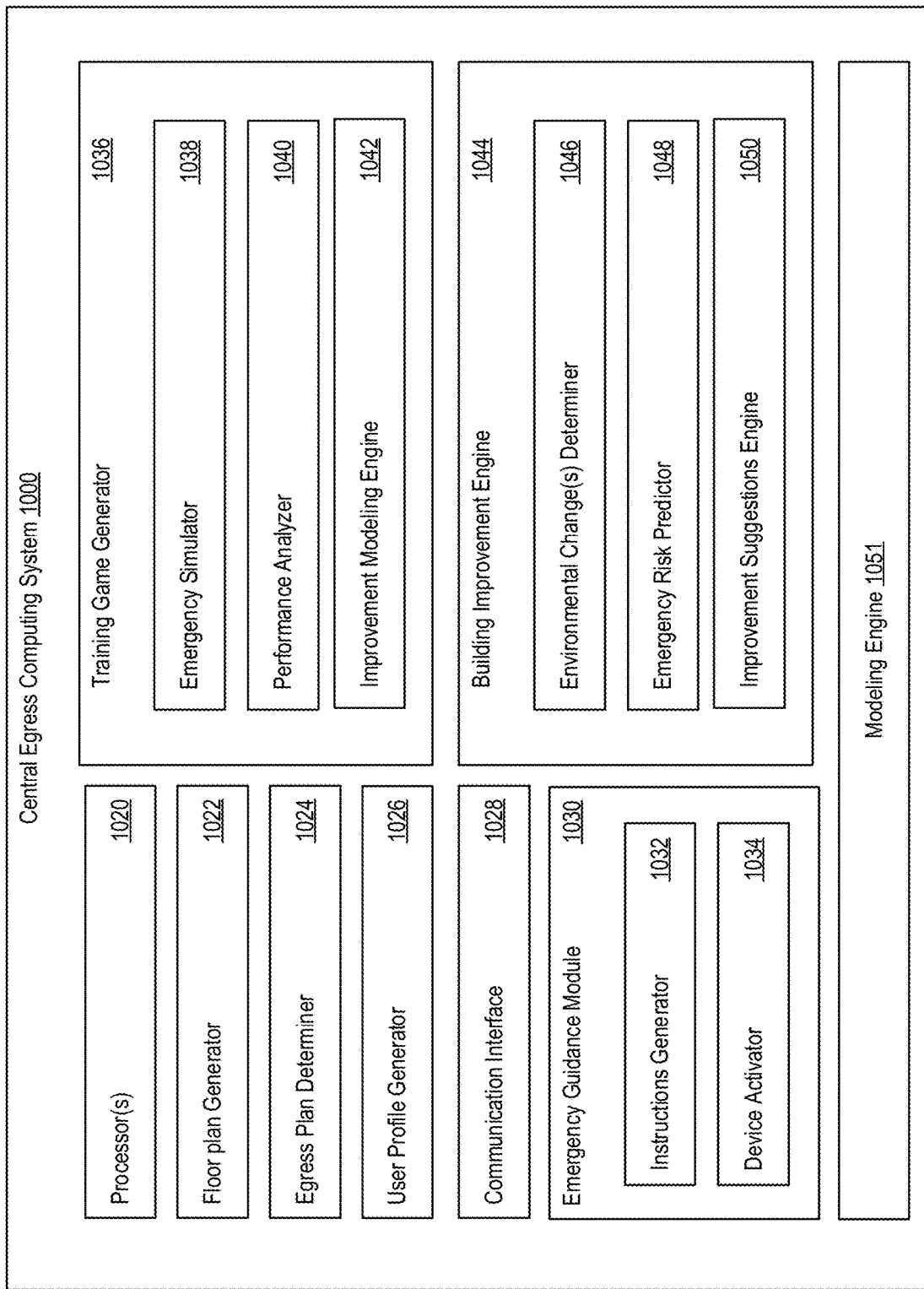
FIG. 10B is a system diagram of a central egress system as described herein.

FIG. 10B is a system diagram of a central egress computing system 1000 as described herein. The computing system 1000 can include processor(s) 1020, floor plan generator 1022, egress plan determiner 1024, user profile generator 1026, communication interface 1028, emergency guidance module 1030, training game generator 1036, building improvement engine 1044, and training model 1051. The processor(s) 1020 can be configured to perform any one or more of the operations described throughout this disclosure. The communication interface 1028 can be configured to provide communication between the central egress computing system 1000 and any one or more other components described herein.

The floor plan generator 1022 can be configured to determine a virtual representation of the building. The generator 1022 can generate a floor plan for the building. The floor plan can include placement and locations of furniture, egress devices and/or sensors. The floor plan can also include room assignments by user. Moreover, the floor plan can include identified zones for the building.

The egress plan determiner 1024 can be configured to generate egress plans/routes before emergencies as well as during emergencies, as described throughout this disclosure. The determiner 1024 can also dynamically update or modify egress plans in real-time. The determiner 1024 can generate plans that are specific to particular users in the building. The determiner 1024 can also generate plans that are generic and applicable to any users in the building. The determiner 1024 can also determine possible egress plans which can be used to identify placement and installation of egress devices in the building.

The user profile generator 1026 can be configured to create user profiles for each user that is detected in the building. The generator 1026 can dynamically modify or update the user profiles based on information received about the user. For example, the generator 1026 can update user profiles based on user input provided at the user computing devices 200A-N. The generator 1026 can also update user profiles based on sensed, real-time information about the users in the building.

The emergency guidance module 1030 can be configured to select egress plans to output to users during an emergency. The module 1030 can be in communication with the egress plan determiner 1022 described above. For example, the egress plan determiner 1022 can select an egress plan that should be used during the emergency. The emergency guidance module 1030 can receive the selected plan from the determiner 1022 and generate output instructions. The module 1030 can include an instructions generator 1032 and a device activator 1034.

The instructions generator 1032 can be configured to generate egress instructions for the selected egress plan. The instructions can be outputted to users in the building to guide the users to safely, calmly, and quickly egress. As described above, different instructions can be generated for each user based on the user profiles. A user that struggled in the emergency simulation games may receive more egress instructions and guidance than a user who easily and quickly completed the emergency simulation games. The instructions generator 1032 can also determine how the egress instructions should be outputted to the users. For example, the generator 1032 can determine that for one user, the instructions should be outputted as visual cues (e.g., lights) by sensors or egress devices in the building. The generator 1032 can determine that for a second user, the instructions should be outputted as read-along instructions at the user's computing device. As another example, the generator 1032 can determine that for a third user, the instructions should be outputted as audible instructions in the user's headphones (e.g., BLUETOOTH, smart technology headphones, or other wearable devices), the user's computing device, and/or egress devices in the building.

The device activator 1034 can be configured to activate one or more devices in the building that can be used for outputting the egress instructions. For example, egress devices and/or user computing devices can be activated. Activating the devices can include generating and transmitting instructions that cause the devices, when executed, to output the egress instructions to the users in the building. Thus, the device activator 1034 can transmit a notification to particular devices to activate. The notification can include the egress instructions generated by the instructions generator 1032.

The training game generator 1036 can be configured to generate the emergency simulation games for the users and determine user performance metrics. The generator 1036 can include an emergency simulator 1038, a performance analyzer 1040, and an improvement modeling engine 1042. The emergency simulator 1038 can generate simulate an emergency scenario in a virtual version of the building. As described herein, the simulator 1038 can simulate the emergency from a current location of the user in the actual building. The simulator 1038 can also simulate the emergency from a different location in the building.

The performance analyzer 1040 can be configured to determine user performance metrics while and/or after the user completes the simulation game, as described throughout this disclosure.

The improvement modeling engine 1042 can be configured to train on the user performance metrics so that the emergency simulator 1038 can generate more simulation games that target weaknesses or other characteristics of the user. The engine 1042 can also be configured to train on the user performance metrics so that the performance analyzer 1040 can more accurately assess user performance, strengths, weaknesses, and determine better suggestions to help the user egress during a real-time emergency. Overall, the training can be advantageous so that the training game generator 1036 can provide training experiences to users that are engaging but also informative to better prepare the users to calmly, safely, and quickly egress from the building during a real-time emergency.

The building improvement engine 1044 can be configured to determine improvements that can be made to the building to reduce risk of emergencies and/or provide users with safer, quicker, and calmer egress during emergencies. The engine 1044 can include an environmental change(s) determiner 1046, an emergency risk predictor 1048, and an improvement suggestions engine 1050. The environmental change(s) determiner 1046 can be configured to receive information about changes in the environment of the building and identify those changes. The determiner 1046 can also classify the changes based on whether they are improvements or problems, related to building structure, related to building components, related to users, etc.

The emergency risk predictor 1048 can be configured to receive the identified and/or classified changes from the determiner 1046. The predictor 1048 can then predict, using AI and/or ML techniques/algorithms, whether the changes make the building more prone to emergencies. The predictor 1048 can determine the likelihood that the building is more at risk to experience one or more different types of emergencies. The predictor 1048 can also assess multiple emergency risk levels or likelihoods for the building based on different types of emergencies that may arise. The predictor 1048 can rank the potential emergency risks from most likely to least likely to occur. The potential emergency risks can also be ranked based on severity of the different types of potential emergency risks. For example, an electrical fire may be less likely than a circuit break, however the amount of damage that can result from the electrical fire can be significantly worse than damage from the circuit break. Therefore, the electrical fire can be ranked as a bigger emergency risk than the potential circuit break. The predicted emergency risks can be outputted to users in the building at the user computing devices, as described herein. The predicted emergency risks can also be provided to construction workers, home builders, or other specialists to bring their attention to issues that may be neglected and require more immediate updating.

The improvement suggestions engine 1050 can be configured to generate suggestions about what improvements can be made to the building. The improvements can be based on the predicted emergency risks. The improvements can also be based on the identified environmental changes. For example, new furniture can be placed in a position that obstructs an egress path. Although the furniture does not create an emergency risk, the furniture may make egressing a little more challenging. Therefore, the predictor 1048 can determine that the furniture should be moved to a different position or location. The predictor 1048 can then generate a suggestion to move the furniture.

The improvement suggestions engine 1050 can transmit the suggestions to user computing devices, as described throughout this disclosure. Moreover, sometimes the engine 1050 can transmit only some suggestions at a time to one or more user computing devices. Suggestions associated with high predicted emergency risks can be transmitted at a first time to one or more computing devices. Suggestions associated with low predicted emergency risks can be transmitted at a second time that is later than the first time. For example, the suggestions associated with low predicted emergency risks can be transmitted after the environmental change(s) determiner 1046 determines that the suggestions associated with high predicted emergency risks have been implemented.

In some implementations, the engine 1050 can transmit high predicted emergency risks to only devices associated with construction workers, home builders, or other specialized technicians who can address those risks by performing maintenance or other upgrades. Low predicted emergency risks, such as changing batteries in an egress device, can then be transmitted to only devices associated with users in the building who may not have specialized knowledge or skills to make major improvements or modifications to the building components and/or structure. Separating transmission of the suggestions based on severity of emergency risk can help ensure that the appropriate stakeholders are notified of the risks and can immediately take action. Transmitting suggestions associated with high predicted emergency risks to general building users (e.g., homeowner, family members) can make the building users paranoid, anxious, uncomfortable, etc. Transmitting these suggestions to general building users may not help these users become more comfortable with addressing emergency situations.

The central egress computing system 1000 can also include a modeling engine 1051. The modeling engine 1051 can be configured to generate training models for one or more of the components described herein using predictive analytics, AI, and/or ML techniques and algorithms. The modeling engine 1051 can also train one or more of the components described in the computing system 1000. The training and model generation can be continuously performed using data that is received in real-time from sensors, egress devices, and/or user computing devices, data that is stored in one or more of the data stores described herein, and/or predictions and analyses that are performed by one or more of the components of the computing system 1000. Continuous training can provide for continuous improvement of the components described herein. Continuous improvement of the components can result in more accurate predictions, determinations, suggestions, and generation of egress plans as well as simulation training games. The more accurate the computing system 1000 is, the more the system 1000 can address different emergency scenarios and types of users to provide more seamless, calm, quick, and safe egress during an emergency.

Figure 10C:
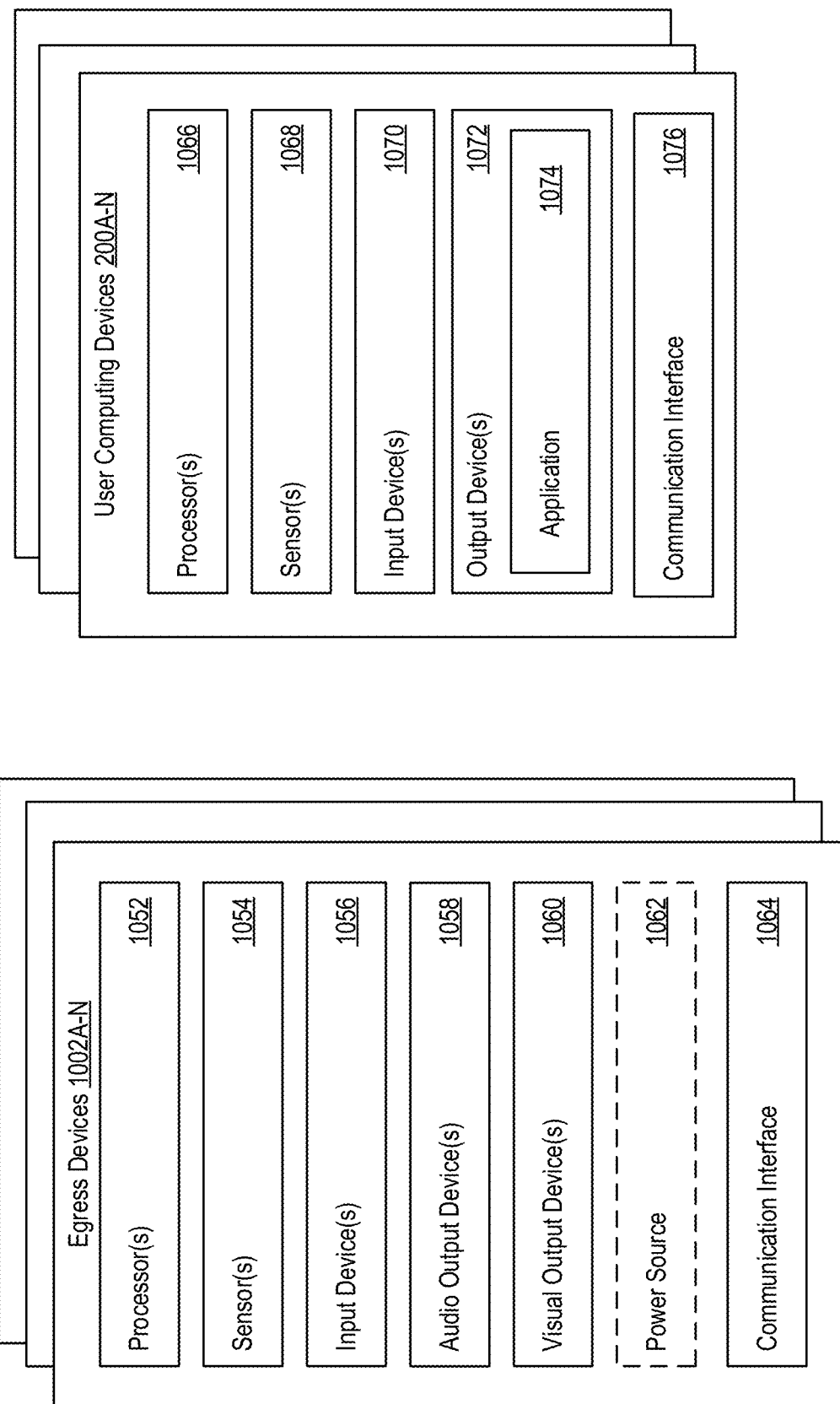
FIG. 10C is a system diagram of egress devices and user devices as described herein.

FIG. 10C is a system diagram of egress devices 1002A-N and user computing devices 200A-N as described herein. The egress devices 1002A-N can include processor(s) 1052, sensor(s) 1054, input device(s) 1056, audio output device(s) 1058, visual output device(s) 1060, a power source 1062, and a communication interface 1064. The sensor(s) 1054 can be configured to detect conditions in the building. In some implementations, the egress devices 1002A-N may be in communication with sensors that are not part of the devices 1002A-N. The egress devices 1002A-N can be in communication with a combination of different types of sensors and/or sensors positioned in different locations throughout the building. The sensor(s) 1054 can be configured to measure or detect temperature, humidity, light, smoke, different types of gases, and/or motion. The sensor(s) 1054 can also be configured to capture image, audio, and/or video data.

The audio output device(s) 1058 can include speakers or a similar audio output device that can be configured to output audible signals in the building. The visual output device(s) 1060 can include lights (e.g., LED), light strips, and/or display screens that can be configured to output visual signals in the building. For example, the visual output device(s) 1060 can emit colored lights that can demonstrate to a user which exits to take out of the building.

The power source 1062 can be optional. The power source 1062 can be a rechargeable or a replaceable battery, solar panels, and/or wired components that can plug into outlets, other devices, or other power sources to provide power to the egress devices 1002A-N.

The user computing devices 200A-N can include processor(s) 1066, sensor(s) 1068, input device(s) 1070, output device(s) 1072, and a communication interface 1076. As described throughout this disclosure, the user computing devices 200A-N can be mobile phones, smart phones, laptops, tablets, computers, and/or wearable devices, including AR/VR devices (e.g., headsets, glasses, gloves, etc.). The sensor(s) 1068 can measure biometric information about the user. For example, the sensor(s) 1068 can track or monitor a user's heartrate, breathing rate, sweat levels, etc. The sensor(s) 1068 can also track or monitor the user's location, movements, and motions.

The output device(s) 1072 can include any one or more of displays, touchscreens, speakers and/or haptic feedback devices. The output device(s) 1072 can also include an application 1074. The application 1074 can be the same as the mobile application 101 described throughout this disclosure. The application 1074 can be displayed/outputted at the user computing devices 200A-N. As described herein, the user can launch the application 1074 by selecting it at their user computing devices 200A-N. The application 1074 can also be automatically launched when, for example, an emergency is detected and egress instructions are to be presented at the user computing devices 200A-N.

Referring to both the egress devices 1002A-N and the user computing devices 200A-N, the processor(s) 1052 and 1066 can be configured to perform one or more of the operations described throughout this disclosure. The input device(s) 1056 and 1070 can include any one or more of displays, touchscreens, keyboards, mice, microphones, or other devices that can be used to receive user input. The communication interfaces 1064 and 1076 can be configured to provide communication with one or more of the components described herein.

Figure 11A:
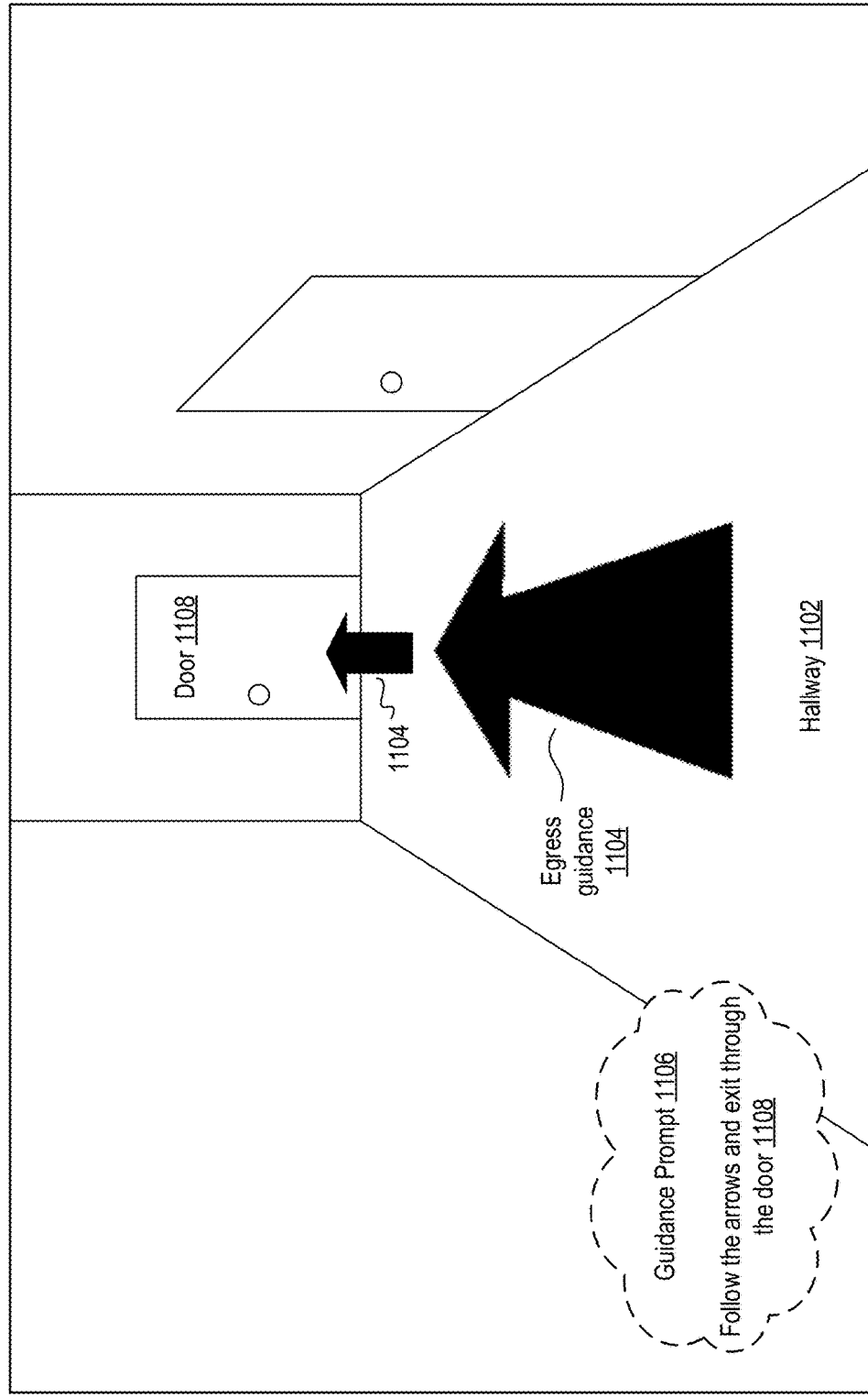
FIGS. 11A-C depict egress guidance via an augmented reality device during an emergency.
Figure 11B:
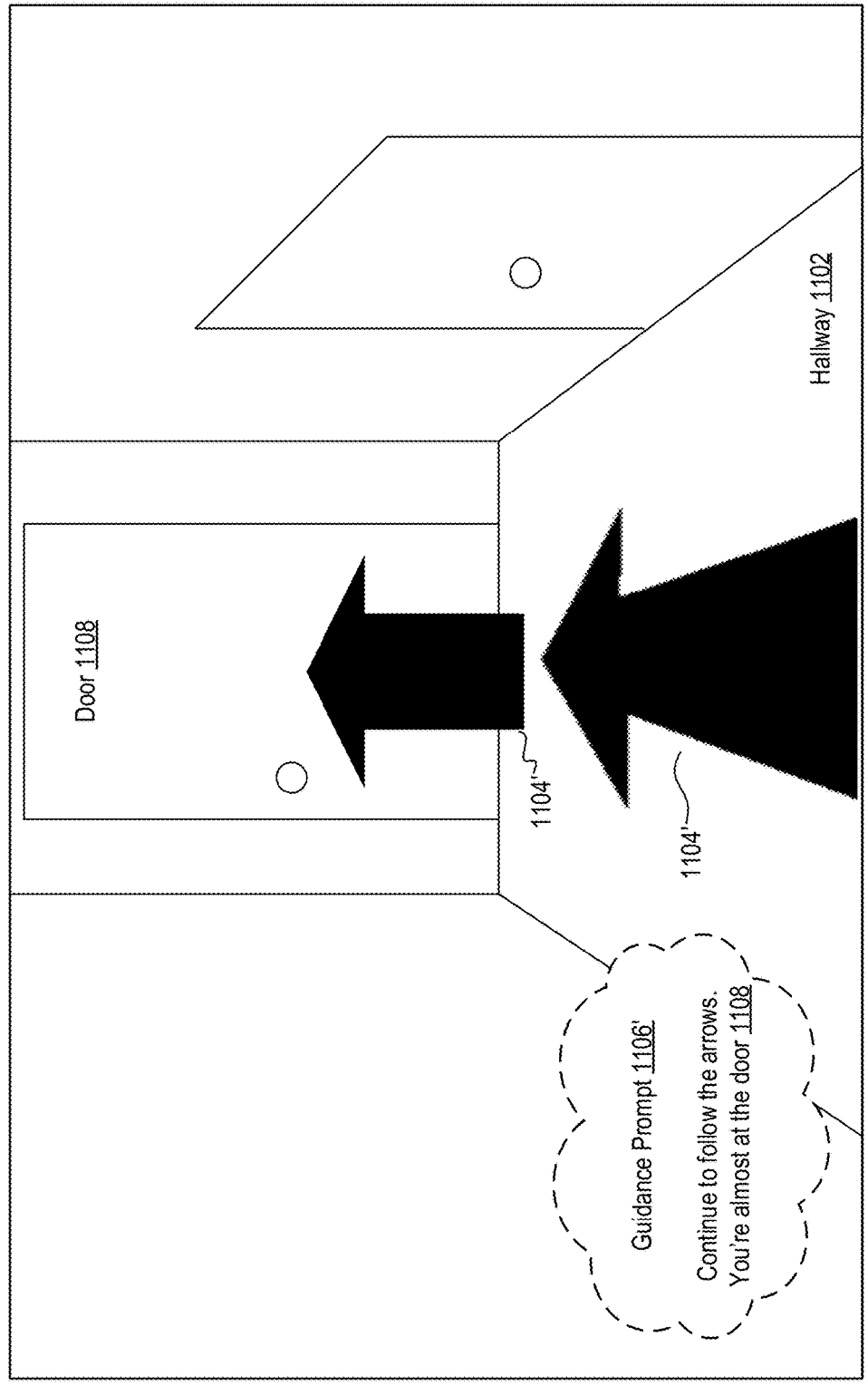
Figure 11C:
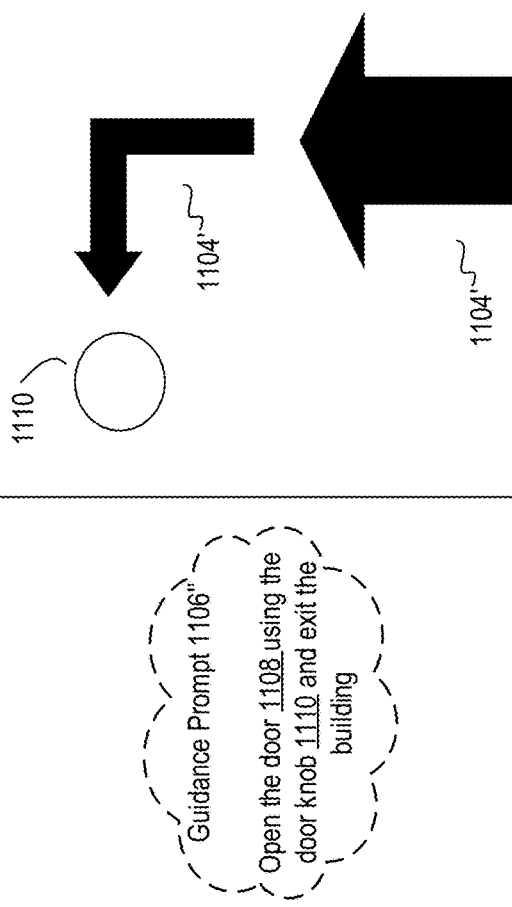

FIGS. 11A-C depict egress guidance via an augmented reality device during an emergency. Egress guidance can be provided to users in a building using augmented reality. Augmented reality can assist the user in understanding where they should go or what they should do during the emergency. With augmented reality, egress guidance, such as instructions and directions, can appear to be projected onto an environment that the user is currently located within. The user can put on an augmented reality device, such as a headset, glasses, goggles, or dongle that attaches to the user's head. The egress guidance can be projected in a graphical user interface (GUI) display 1100 of the augmented reality device. Thus, the egress guidance can appear in front of the user as the user is moving through the environment.

The egress guidance via augmented reality, as described in reference to FIGS. 11A-C, can also be applied to the emergency simulation games 106 previously described. For example, the user can put on the augmented reality device to play the simulation game 106. Egress guidance during the simulation can be presented via the display 1100 of the augmented reality device. Practicing the projected egress guidance before an emergency can be advantageous to make the user more comfortable with the projected egress guidance during an emergency. Therefore, when the user wears the augmented reality device during the real emergency, the user may not be surprised or confused when egress guidance is projected on the display 1100 to overlay portions of the environment that the user is currently located within.

Referring to the figures, FIG. 11A depicts emergency guidance 1104 presented in the augmented reality device GUI display 1100 at time=1. The display 1100 can overlay glass or lens of the augmented reality device that is worn by the user. Therefore, the user can still view the user's surrounding environment through the glass or lens of the device. The display 1100 is merely projected or overlaid on top of the view of the environment.

At time=1 in FIG. 11A, an emergency may already be detected and the emergency guidance 1104 can overlay portions of the environment where the user is currently located. In this example, the user is in hallway 1102. The egress guidance 1104 includes arrows that are projected onto a floor of the hallway 1102 and part of a door 1108. The egress guidance 1104 therefore instructs the user to exit through the door 1108. Moreover, a guidance prompt 1106 can overlay a portion of the display 1100. The guidance prompt 1106 can include textual instructions to help guide the user towards the exit. In this example, the guidance prompt 1106 says, "Follow the arrows and exit through the door 1108."

FIG. 11B depicts emergency guidance 1104' presented in the display 1100 at time=2. At time=2, the user has moved closer to the door 1108. As a result of the user's movement, the guidance 1104' arrows appear larger as the arrows overlay the floor of the hallway 1102 and the door 1108 at the end of the hallway 1102. The guidance prompt 1106' has also been updated. The prompt 1106' says, "Continue to follow the arrows. You're almost at the door 1108."

The larger guidance 1104' indicates to the user that they are moving in the right direction. The larger guidance 1104' can also indicate that the user is approaching an appropriate exit to take to egress. Moreover, as described above, the larger guidance 1104' appears projected on the environment that the user is currently located in.

FIG. 11C depicts emergency guidance 1104" presented in the display 1100 at time=3. At time=3, the user has approached the door 1108. The user can be standing in front of the door 1108. The emergency guidance 1104" now includes larger arrows projected on the door 1108. The guidance 1104" also points towards a door knob 1110, thereby instructing the user to turn the knob 1110 to open the door 1108 and exit. The guidance prompt 1106" can also be updated to say, "Open the door 1108 using the door knob 1110 and exit the building."

As shown in FIGS. 11A-C, the emergency guidance can be updated in real-time to reflect movement of the user in the environment. For example, as the user moves in real-time towards the door 1108, the emergency guidance arrows can progressively expand into larger egress guidance arrows. Moreover, as shown in reference to FIG. 11C, additional egress guidance arrows can populate the display 1100 when the user approaches the door 1108 or other portions of the environment when the user may be required to take some action (e.g., open the door 1108 by turning the door knob 1110, open a window by unlocking a hatch on the window, etc.).

Moreover, the egress guidance arrows and other projected egress guidance can be semi-translucent/transparent so that the user can see the surrounding environment through the projected egress guidance. The egress guidance may be presented in the display 1100 to guide the user without distracting the user from focusing on the environment and a quick and safe egress.

Figure 12:
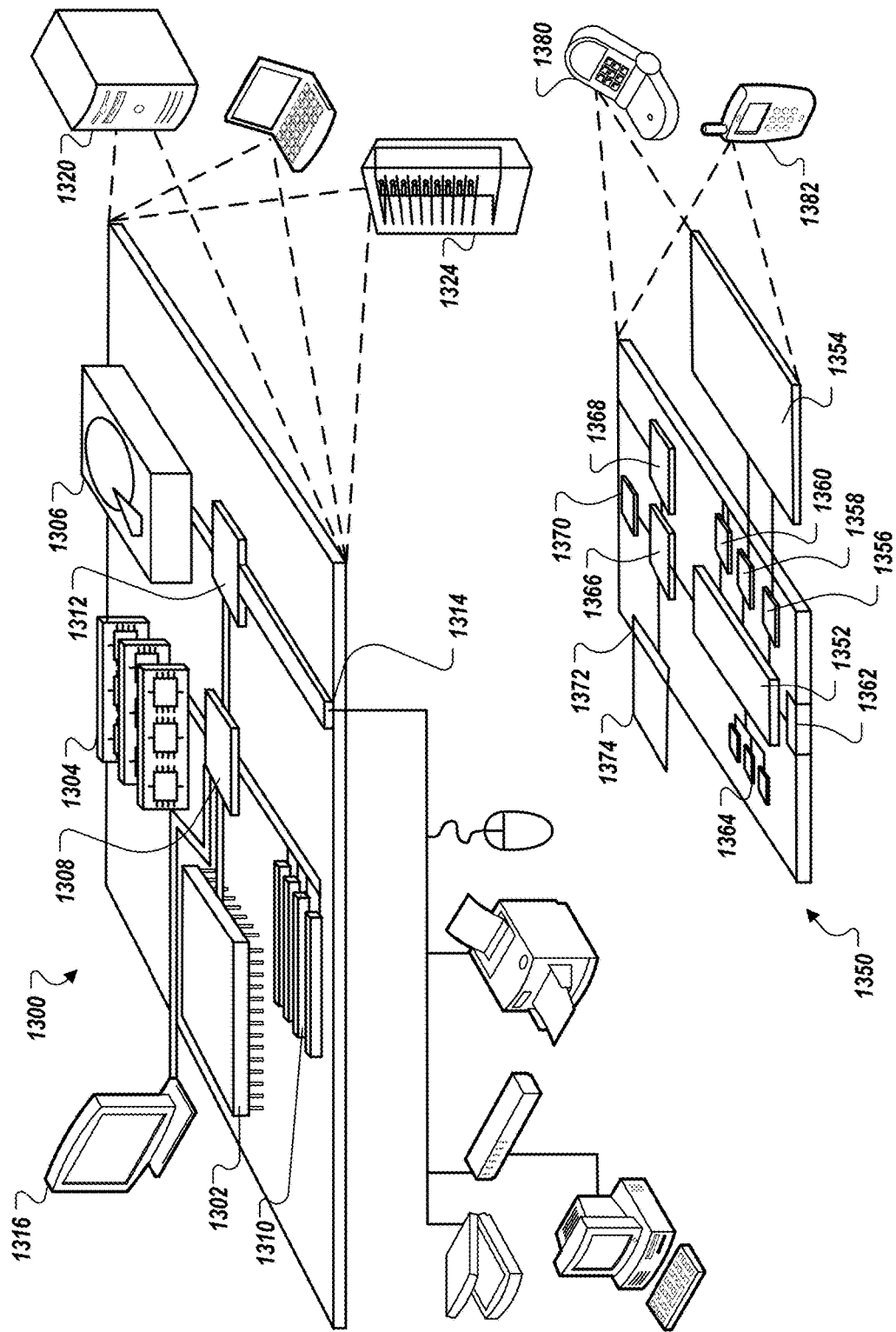
FIG. 12 is a schematic diagram that shows an example of a computing device and a mobile computing device.

FIG. 12 shows an example of a computing device 1300 and an example of a mobile computing device that can be used to implement the techniques described here. The computing device 1300 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 1300 includes a processor 1302, a memory 1304, a storage device 1306, a high-speed interface 1308 connecting to the memory 1304 and multiple high-speed expansion ports 1310, and a low-speed interface 1312 connecting to a low-speed expansion port 1314 and the storage device 1306. Each of the processor 1302, the memory 1304, the storage device 1306, the high-speed interface 1308, the high-speed expansion ports 1310, and the low-speed interface 1312, are interconnected using various busses, and can be mounted on a common motherboard or in other manners as appropriate. The processor 1302 can process instructions for execution within the computing device 1300, including instructions stored in the memory 1304 or on the storage device 1306 to display graphical information for a GUI on an external input/output device, such as a display 1316 coupled to the high-speed interface 1308. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 1304 stores information within the computing device 1300. In some implementations, the memory 1304 is a volatile memory unit or units. In some implementations, the memory 1304 is a non-volatile memory unit or units. The memory 1304 can also be another form of computer-readable medium, such as a magnetic or optical disk.

The storage device 1306 is capable of providing mass storage for the computing device 1300. In some implementations, the storage device 1306 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The computer program product can also be tangibly embodied in a computer- or machine-readable medium, such as the memory 1304, the storage device 1306, or memory on the processor 1302.

The high-speed interface 1308 manages bandwidth-intensive operations for the computing device 1300, while the low-speed interface 1312 manages lower bandwidth-intensive operations. Such allocation of functions is exemplary only. In some implementations, the high-speed interface 1308 is coupled to the memory 1304, the display 1316 (e.g., through a graphics processor or accelerator), and to the high-speed expansion ports 1310, which can accept various expansion cards (not shown). In the implementation, the low-speed interface 1312 is coupled to the storage device 1306 and the low-speed expansion port 1314. The low-speed expansion port 1314, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 1300 can be implemented in a number of different forms, as shown in the figure. For example, it can be implemented as a standard server 1320, or multiple times in a group of such servers. In addition, it can be implemented in a personal computer such as a laptop computer 1322. It can also be implemented as part of a rack server system 1324. Alternatively, components from the computing device 1300 can be combined with other components in a mobile device (not shown), such as a mobile computing device 1350. Each of such devices can contain one or more of the computing device 1300 and the mobile computing device 1350, and an entire system can be made up of multiple computing devices communicating with each other.

The mobile computing device 1350 includes a processor 1352, a memory 1364, an input/output device such as a display 1354, a communication interface 1366, and a transceiver 1368, among other components. The mobile computing device 1350 can also be provided with a storage device, such as a micro-drive or other device, to provide additional storage. Each of the processor 1352, the memory 1364, the display 1354, the communication interface 1366, and the transceiver 1368, are interconnected using various buses, and several of the components can be mounted on a common motherboard or in other manners as appropriate.

The processor 1352 can execute instructions within the mobile computing device 1350, including instructions stored in the memory 1364. The processor 1352 can be implemented as a chipset of chips that include separate and multiple analog and digital processors. The processor 1352 can provide, for example, for coordination of the other components of the mobile computing device 1350, such as control of user interfaces, applications run by the mobile computing device 1350, and wireless communication by the mobile computing device 1350.

The processor 1352 can communicate with a user through a control interface 1358 and a display interface 1356 coupled to the display 1354. The display 1354 can be, for example, a TFT (Thin-Film-Transistor Liquid Crystal Display) display or an OLED (Organic Light Emitting Diode) display, or other appropriate display technology. The display interface 1356 can comprise appropriate circuitry for driving the display 1354 to present graphical and other information to a user. The control interface 1358 can receive commands from a user and convert them for submission to the processor 1352. In addition, an external interface 1362 can provide communication with the processor 1352, so as to enable near area communication of the mobile computing device 1350 with other devices. The external interface 1362 can provide, for example, for wired communication in some implementations, or for wireless communication in other implementations, and multiple interfaces can also be used.

The memory 1364 stores information within the mobile computing device 1350. The memory 1364 can be implemented as one or more of a computer-readable medium or media, a volatile memory unit or units, or a non-volatile memory unit or units. An expansion memory 1374 can also be provided and connected to the mobile computing device 1350 through an expansion interface 1372, which can include, for example, a SIMM (Single In Line Memory Module) card interface. The expansion memory 1374 can provide extra storage space for the mobile computing device 1350, or can also store applications or other information for the mobile computing device 1350. Specifically, the expansion memory 1374 can include instructions to carry out or supplement the processes described above, and can include secure information also. Thus, for example, the expansion memory 1374 can be provide as a security module for the mobile computing device 1350, and can be programmed with instructions that permit secure use of the mobile computing device 1350. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 1364, the expansion memory 1374, or memory on the processor 1352. In some implementations, the computer program product can be received in a propagated signal, for example, over the transceiver 1368 or the external interface 1362.

The mobile computing device 1350 can communicate wirelessly through the communication interface 1366, which can include digital signal processing circuitry where necessary. The communication interface 1366 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication can occur, for example, through the transceiver 1368 using a radio-frequency. In addition, short-range communication can occur, such as using a Bluetooth, WiFi, or other such transceiver (not shown). In addition, a GPS (Global Positioning System) receiver module 1370 can provide additional navigation- and location-related wireless data to the mobile computing device 1350, which can be used as appropriate by applications running on the mobile computing device 1350.

The mobile computing device 1350 can also communicate audibly using an audio codec 1360, which can receive spoken information from a user and convert it to usable digital information. The audio codec 1360 can likewise generate audible sound for a user, such as through a speaker, e.g., in a handset of the mobile computing device 1350. Such sound can include sound from voice telephone calls, can include recorded sound (e.g., voice messages, music files, etc.) and can also include sound generated by applications operating on the mobile computing device 1350.

The mobile computing device 1350 can be implemented in a number of different forms, as shown in the figure. For example, it can be implemented as a cellular telephone 1380. It can also be implemented as part of a smart-phone 1382, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

What is claimed is:

1. A system for training users how to egress a building, the system comprising:
 a user computing device configured to present, at a graphical user interface (GUI) display, an egress safety application having selectable features, wherein one of the selectable features is a training simulation game that simulates an emergency in the building; and
 an egress computing system in communication with the user computing device and configured to:
  receive, from the user computing device, (i) a first user input indicating user selection of the training simulation game at the GUI display and (ii) an identifier associated with the user computing device;
  retrieve, from a database, user information that corresponds to the identifier associated with the user computing device;
  receive, from at least one of the user computing device and sensors positioned throughout the building and proximate a location of a user of the user computing device, a current location of the user in the building;
  receive, from the sensors, building information;
  generate, based on the building information, a virtual floorplan of the building;
  simulate, in the virtual floorplan of the building, an emergency;
  generate, based on the simulated emergency and the user information, an egress plan for the user to egress in the virtual floorplan from the current location of the user;
  present, at the GUI display, (i) the current location of the user in the virtual floorplan and (ii) instructions associated with the generated egress plan;
  start, in response to receiving the second user input, a timer;
  receive, from the user computing device, a second user input indicating movement of the user in the virtual floorplan;
  determine, based on the second user input and the timer, user performance metrics, wherein determining the user performance metrics comprises:
   determining an overall time that it took the user to complete the simulated emergency;
   determining an average heartrate of the user during the overall time;
   determining a quantity of mistakes that the user made while completing the simulated emergency; and
   determining a difficulty level of the simulated emergency based at least in part on the overall time, the average heartrate, and the quantity of mistakes;
  train, based on the user performance metrics, a machine learning model associated with the user;
  determine, using the trained machine learning model, (i) a second simulated emergency for the user and (ii) suggestions to improve an ability of the user to egress the building during a real-time emergency; and
  output, at the GUI display, the user performance metrics, a selectable option to begin the second simulated emergency, and the suggestions to improve the ability of the user to egress the building during the real-time emergency.

2. The system of claim 1, wherein the egress computing system is configured to determine the average heartrate of the user based on indications of a heartbeat of the user that are received from at least one of the user computing device and biometric sensors worn by the user while the user completes the simulated emergency.

3. The system of claim 1, wherein the egress computing system is further configured to:
 correlate, using the trained machine learning model associated with the user, (i) the overall time with (ii) a projected time it may take the user to egress during a real-time emergency in the building, wherein the real-time emergency is similar to the simulated emergency;
 determine, based on correlating (i) with (ii), suggestions to improve a speed at which the user may egress the building during the real-time emergency; and
 output, at the GUI display, the suggestions to improve the speed at which the user may egress the building during the real-time emergency.

4. The system of claim 1, wherein the egress computing system is further configured to:
 continuously receive, from the user computing device, third user input indicating movement of the user in the virtual floorplan; and
 stop, based on the third user input and in response to determining that the user is no longer moving in the virtual floorplan, the timer.

5. A system for determining egress plans in real-time, the system comprising:
 a plurality of egress devices positioned throughout a building, the plurality of egress devices having a plurality of sensors, wherein each of the plurality of egress devices is configured to:
  determine a first location of a first user in the building;
  generate, based on the first location of the first user, a first egress plan that can be used by the first user to exit from the first location out of the building during an emergency;
  receive, from another of the plurality of egress devices, an indication that the first user has moved to a second location in the building;
  update, based on the indication that the first user has moved to the second location in the building, the first egress plan to be used by the first user to exit from the second location out of the building during the emergency;

receive, from another of the plurality of egress devices, an indication that a second user has entered the building at a third location;

generate, based on the third location of the second user, a second egress plan that can be used by the second user to exit from the third location out of the building during the emergency;

detect an emergency in the building;

identify a fourth location of the first user and a fifth location of the second user relative to a location of the detected emergency;

update, based on the fourth and fifth locations, the first and second egress plans to be used by the first and second users to exit from the fourth and fifth locations, respectively;

transmit, to one or more of the plurality of egress devices proximate to the fourth and fifth locations of the first and second users, an indication of the detected emergency and the updated first and second egress plans, wherein the one or more of the plurality of egress devices are configured to output the updated first and second egress plans to guide the first and second users to exit from the fourth and fifth locations out the building, respectively;

identify first and second user computing devices associated with the first and second users, respectively;

transmit, to the first and second user computing devices, the updated first and second egress plans, respectively;

temporarily deactivate, based on receiving indication that the first and second user computing devices are outputting the updated first and second egress plans respectively, features of the first and second user computing devices, wherein the features include at least one of (i) canceling the output of the updated first and second egress plans respectively, (ii) opening a mobile application that can distract the first and second users from focusing on the updated first and second egress plans respectively, and (iii) powering off the first and second user computing devices;

instruct the first and second user computing devices to automatically transmit a notification to emergency response personnel, wherein the notification includes information about the detected emergency; and re-activate, in response to determining that the first and second users are outside of the building, the features of the first and second user computing devices.

6. The system of claim 5, wherein each of the plurality of egress devices is further configured to:

identify when at least one of the first and second users exits the building; and remove, from temporary storage at the egress device, the egress plan associated with the at least one of the first and second users that exits the building.

7. The system of claim 5, wherein each of the plurality of egress devices is further configured to:

identify that at least one of the first and second users is a full-time resident of the building; and store, in a database, the egress plan associated with the at least one of the first and second users that is the full-time resident.

8. The system of claim 7, wherein each of the plurality of egress devices is further configured to:

train a machine learning model associated with the at least one of the first and second users that is the full-time resident; and determine, using the trained machine learning model, one or more improved egress plans for the at least one of the first and second users that is the full-time resident.

9. A method for determining egress plans in real-time, the method comprising:

determining, by a first egress device positioned in a building, a first location of a first user in the building;

generating, by the first egress device and based on the first location of the first user, a first egress plan that can be used by the first user to exit from the first location out of the building during an emergency;

receiving, from a second egress device positioned in the building, an indication that the first user has moved to a second location in the building;

updating, by the first egress device and based on the indication that the first user has moved to the second location in the building, the first egress plan to be used by the first user to exit from the second location out of the building during the emergency;

receiving, from a third egress device positioned in the building, an indication that a second user has entered the building at a third location;

generating, by the first egress device and based on the third location of the second user, a second egress plan that can be used by the second user to exit from the third location out of the building during the emergency;

identifying, by each of the egress devices, first and second user computing devices associated with the first and second users, respectively;

transmitting, by each of the egress devices and to the first and second user computing devices, the updated first and second egress plans, respectively; and temporarily deactivating, by each of the egress devices and based on receiving indication that the first and second user computing devices are outputting the updated first and second egress plans respectively, features of the first and second user computing devices.

10. The method of claim 9, further comprising:

detecting, by the first egress device, an emergency in the building;

identifying, by the first egress device, a fourth location of the first user and a fifth location of the second user relative to a location of the detected emergency; and updating, by the first egress device and based on the fourth and fifth locations, the first and second egress plans to be used by the first and second users to exit from the fourth and fifth locations, respectively.

11. The method of claim 10, further comprising transmitting, by the first egress device and to one or more of a plurality of egress devices proximate to the fourth and fifth locations of the first and second users, an indication of the detected emergency and the updated first and second egress plans, wherein the one or more of the plurality of egress devices are configured to output the updated first and second egress plans to guide the first and second users to exit from the fourth and fifth locations out the building, respectively.

12. The method of claim 9, further comprising:

identifying, by each of the egress devices, when at least one of the first and second users exits the building; and removing, by each of the egress devices, from temporary storage at the egress device, the egress plan associated with the at least one of the first and second users that exits the building.

13. The method of claim 12, further comprising:

training, by each of the egress devices, a machine learning model associated with the at least one of the first and second users that is the full-time resident; and determining, by each of the egress devices and using the trained machine learning model, one or more improved egress plans for the at least one of the first and second users that is the full-time resident.

14. The method of claim 9, further comprising:

identifying, by each of the egress devices, that at least one of the first and second users is a full-time resident of the building; and storing, by each of the egress devices and in a database, the egress plan associated with the at least one of the first and second users that is the full-time resident.

15. The method of claim 9, further comprising instructing, by each of the egress devices, the first and second user computing devices to automatically transmit a notification to emergency response personnel, wherein the notification includes information about the detected emergency.

16. The method of claim 9, further comprising re-activating, in response to determining that the first and second users are outside of the building, the features of the first and second user computing devices.

17. The method of claim 9, wherein the features include at least one of (i) canceling the output of the updated first and second egress plans respectively, (ii) opening a mobile application that can distract the first and second users from focusing on the updated first and second egress plans respectively, and (iii) powering off the first and second user computing devices.

* * * * *